United States Patent
Chan et al.

(10) Patent No.: US 8,581,743 B2
(45) Date of Patent: Nov. 12, 2013

(54) METHOD AND SYSTEM FOR AUTOMATED POWER METER INFRASTRUCTURE

(71) Applicant: Jetlun Corporation, South San Francisco, CA (US)

(72) Inventors: Tat-Keung Chan, South San Francisco, CA (US); Elsa A. Chan, South San Francisco, CA (US)

(73) Assignee: Jetlun Corporation, South San Francisco, CA (US)

( * ) Notice: Subject to any disclaimer, the term of this patent is extended or adjusted under 35 U.S.C. 154(b) by 0 days.

(21) Appl. No.: 13/767,098

(22) Filed: Feb. 14, 2013

(65) Prior Publication Data

US 2013/0154850 A1 Jun. 20, 2013

Related U.S. Application Data

(63) Continuation of application No. 13/623,832, filed on Sep. 20, 2012.

(60) Provisional application No. 61/590,758, filed on Jan. 25, 2012, provisional application No. 61/537,422, filed on Sep. 21, 2011.

(51) Int. Cl.
*G08C 19/20* (2006.01)

(52) U.S. Cl.
USPC . 340/870.03; 713/194; 324/114; 340/870.41; 361/660

(58) Field of Classification Search
USPC ........... 340/870.02–870.03, 870.41; 713/194; 361/660; 324/114
See application file for complete search history.

(56) References Cited

U.S. PATENT DOCUMENTS

| | | | | |
|---|---|---|---|---|
| 7,541,941 | B2* | 6/2009 | Bogolea et al. | 340/870.02 |
| 8,031,650 | B2* | 10/2011 | Petite et al. | 370/320 |
| 2008/0117077 | A1* | 5/2008 | Ratiu et al. | 340/870.02 |
| 2008/0154624 | A1* | 6/2008 | O'Neil | 705/1 |
| 2009/0322556 | A1* | 12/2009 | Cook et al. | 340/870.02 |
| 2011/0254697 | A1* | 10/2011 | Casey et al. | 340/870.02 |
| 2012/0026005 | A1* | 2/2012 | Myoung et al. | 340/870.02 |
| 2012/0229295 | A1* | 9/2012 | Sharma et al. | 340/870.02 |
| 2012/0242499 | A1* | 9/2012 | Ree | 340/870.02 |
| 2012/0268291 | A1* | 10/2012 | Boot et al. | 340/870.03 |
| 2013/0027219 | A1* | 1/2013 | Myoung et al. | 340/870.03 |

* cited by examiner

*Primary Examiner* — Albert Wong
(74) *Attorney, Agent, or Firm* — Richard T. Ogawa; Ogawa P.C.

(57) ABSTRACT

A system for extending the Smart Meter's range to connect to Home Area Networks for energy monitoring and demand response in a variety of locations. The system has a data concentrator with a wireless communicating module configured to transmit and receive information at one or more first frequencies ranging up to 2.4 GHz, and a power-line module configured to transmit and receive information at one or more frequencies ranging from about 100 to 30 MHz. The data concentrator receives power information from one or more Smart Meters and convert the wireless signal to a power-line carrier signal over the existing all three phases of the AC wiring. The system also includes a wireless and power-line carrier bridge that converts the power-line carrier signal back to a wireless signal to connect to various Home Area Network (HAN) devices such as programmable communicating thermostats (PCTs), smart appliances and in-home displays (IHDs).

20 Claims, 95 Drawing Sheets

| Name | Type | Length | Remark |
|---|---|---|---|
| Meter's EUI | ZigBee EUI | 8 Bytes | |
| PanID | Unsigned short | 2 Bytes | Pan ID of ZigBee network. Range is from 0x0001 ~0xFFFE |
| Channel | Unsigned char | 1 Byte | Range is from 11~26 |
| Reserved | Unsigned char | 20 Byte | Reserved for future usage |

FIG. 7

| Name | Type | Length | Remark |
|---|---|---|---|
| Device Name | String | 16 Bytes | Maximum 15 characters |
| Device Address | MAC address | 6 Bytes | |
| Status | Unsigned char | 1 Byte | 0: Disable<br>1: Offline<br>2: Online |
| Reserved | Unsigned char | 50 Byte | Reserved for future usage |

FIG. 9 i.MX28 EXAMPLE COMPONENTS

DCDC Inductor

For best battery life, the DCDC inductor should have a low DC resistance. The current rating of the inductor should be higher than the measured peak current through the inductor, which will be application-specific. The inductor value is recommended to be between 4.7uH and 15uH.

Note that inductors with a higher DC resistance may be used, but may impact battery life.

| Reference Designator | Description | Manufacturer | Manufacturer Part Number |
|---|---|---|---|
| L1 | 15uH, 900mA, 213mOhm RDC | Sumida | CDRH3D28NP-150N |
| L1 | 10uH, 690mA, 18mOhm RDC | Panasonic | ELL4LM100M |
| L1 | 15uH, 500mA, 520mOhm RDC | Nantong Meda (MEDAFA) | MAH 32-150 |

DCDC Output Capacitors

The C36, C37, C52, C53, C60, C61, C67, and C68 output capacitors should have an ESR less than 400mOhms. Ceramic capacitors are recommended (Y5V capacitors should not be used).

24MHz Crystal

| Reference Designator | Description | Manufacturer | Manufacturer Part Number |
|---|---|---|---|
| Y1 | 24MHz 30ppm Crystal | Jing Feng | 24.000MHz Jing Feng Crystal 2x6mm cylinder, +/- 30ppm; CL = 10pF |

32kHz Crystal

| Reference Designator | Description | Manufacturer | Manufacturer Part Number |
|---|---|---|---|
| Y2 | 32kHz 20ppm Crystal | Seiko | VT200FA-6PF20PPM |
| Y2 | 32kHz 20ppm Crystal | Seiko | SSPT7FA-7PF20PPM |

USB Ferrites and ESD Protection

| Reference Designator | Description | Recommended Manufacturer | Manufacturer Part Number |
|---|---|---|---|
| L4, L6 | Ferrite, DCR < 100mOhm, 68 ohms @ 100MHz, 1A | Steward | MI0603J680R-10 |
| L5 | Ferrite, DCR < 400mOhm, 1500 ohms @ 100MHz, 400mA | Steward | HZ0805D152R-10 |
| D4, D5 | ESD Protection Diode | ON Semi. | NZL6V8AXV3T1 |

FIG. 16

NAND FLASH

Important Design Notes
1) The WP# pull-down resistor is required to protect the flash memory from inadvertent writes during power transitions.
2) All CE# and R/B# pins require pull up resistors. Note that the i.MX28 has integrated CE# and R/B# pull-up resistors that must be enabled by OTP.
3) The circuits below show dual-CE NAND flash. If using a single-CE NAND flash, change pins 6 and 10 to NO CONNECT.

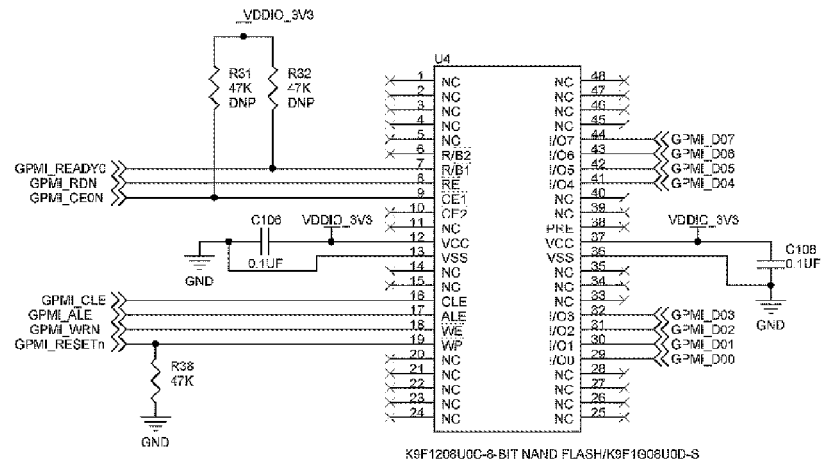

FIG. 33

DEBUG UART TTL
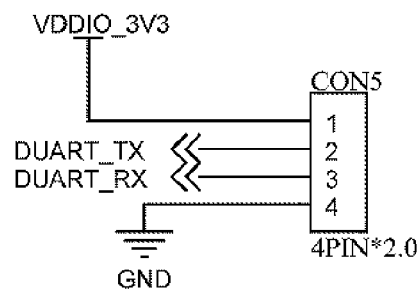
POWER: for zigbee 3.3V
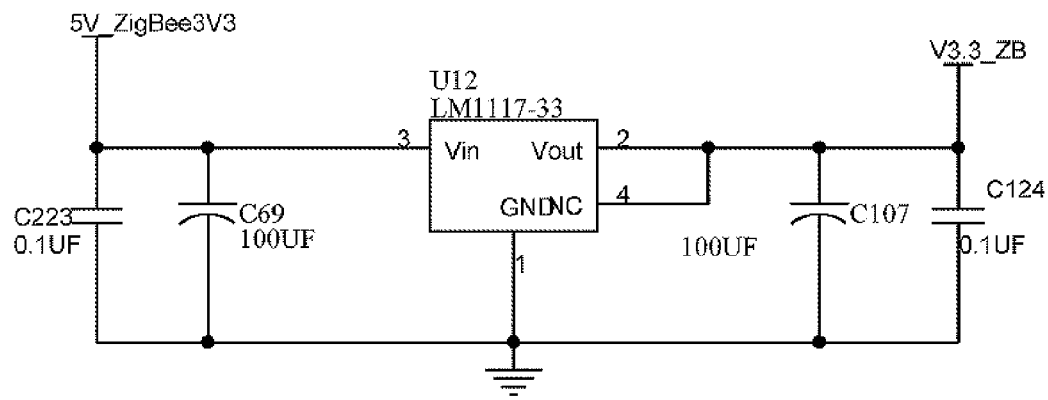
FIG. 41

JTAG

In order to allow debugging on a i.MX28-based device, it is recommended to add JTAG testpoints as shown below. In addition, there are other changes that may be required to support debugging:

1) The C125 0.1uF capacitor on PSWITCH may need to be moved to the other side of R72, the 1K resistor.

USB 2.0 Connectors

Route USB D+ and D- according to the High Speed USB2.0 Design Guidelines. D+ and D- should have a 90 ohm differential trace impedance and the PCB should have a 20 mil minimum spacing between the USB data lines (D+ and D-) and other signal lines.

In order to maximize ESD immunity, the industrial design plastics should expose the USB Connector as little as possible.

The L4, L5, and L6 ferrites are recommended for ESD immunity. Note that any ferrite in series with the USB 5V supply should have a low DCR (<100mOhms) and be rated for 1A.

The D4 Zener Diode is strongly recommended to protect the VDD5V pin of the i.MX28 from damaging overvoltage conditions that can result from USB cable attachments or from ESD events.

USB0: OTG HOST to WIFI

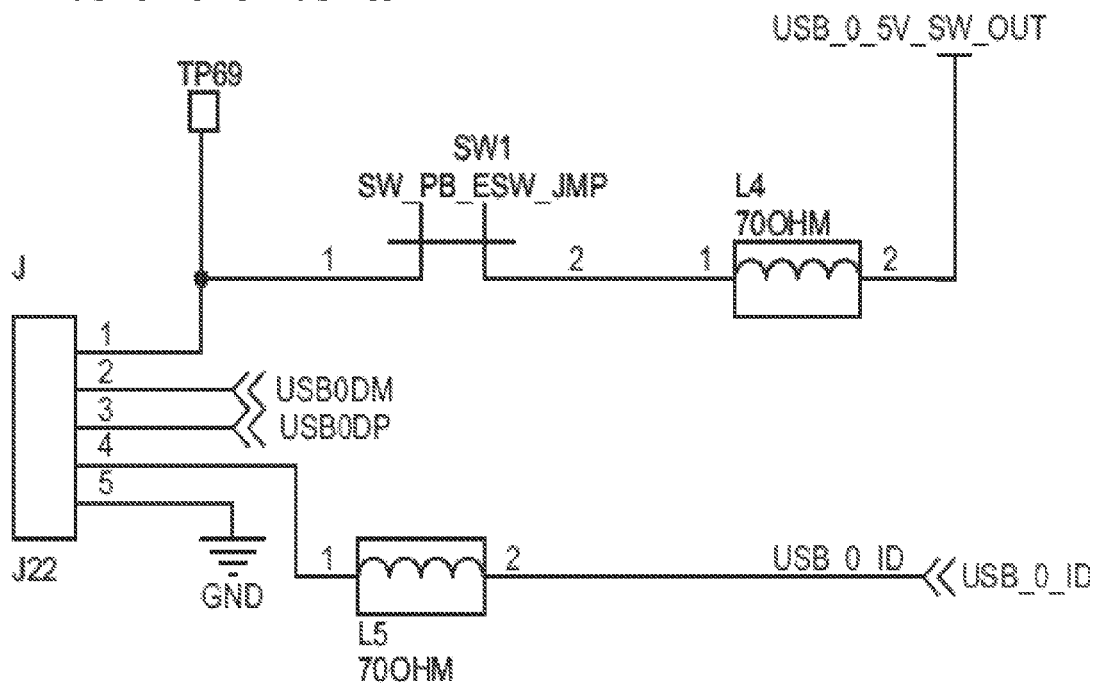

FIG. 46

USB0 Connection Assignments

| On Page Net Name | i.MX28 Pin Assignment | |
|---|---|---|
| USB_0_PWR_EN | AUART2_TX | USB_0_PWR_EN |
| USB_0_OVERCURRENT | AUART1_CTS | USB_0_OC |

USB1 Connection Assignments

| On Page Net Name | i.MX28 Pin Assignment | |
|---|---|---|
| USB_1_PWR_EN | AUART2_RX | USB_1_PWR_EN |
| USB_1_OVERCURRENT | PWM2 | USB_1_OC |

Switch Power Input

5V DC Adapter Supply

USB_5V_SW_IN          5V_USB

RD77715 LED definition
1) Power LED G DS3
2) Zigbee LINK LED DS3 PC3
3) DRCL LEVEL LED DS5 PIO13 G PC4  R
4) DRCL SCHEDLUE  LED DS4GPIO14 G
                              PO5 R

RESET QCA7000
SWITCH ACTIVE LOW

Interface to ZIGBEE

Interface To main board

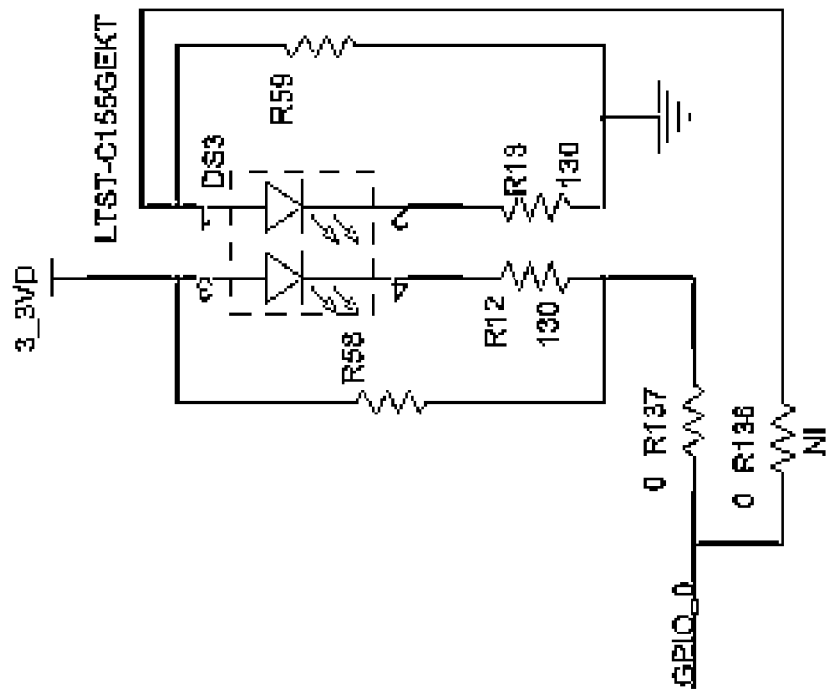
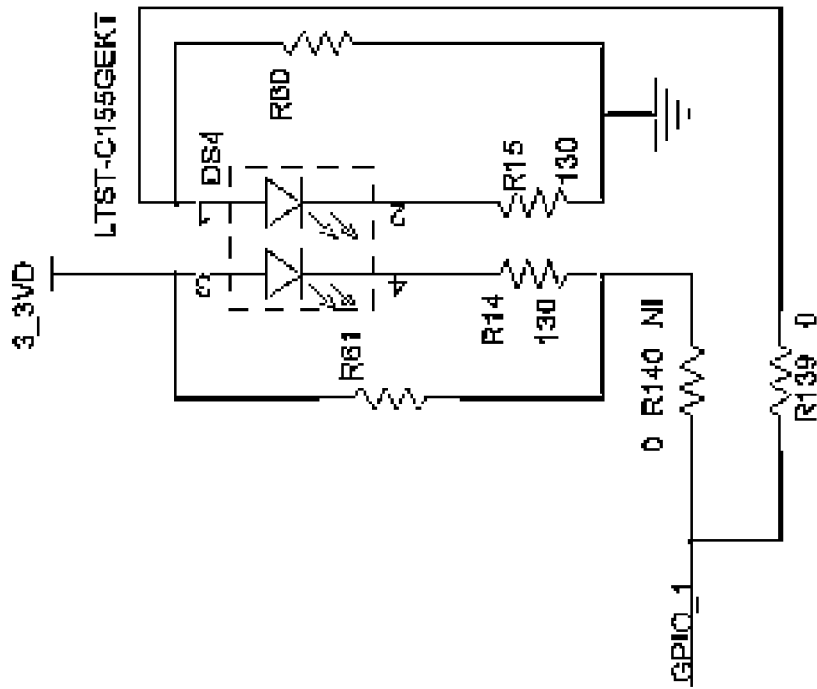
FIG. 85

METHOD AND SYSTEM FOR AUTOMATED POWER METER INFRASTRUCTURE

CROSS-REFERENCE TO RELATED APPLICATIONS

This application is a continuation of, and claims priority to, U.S. Ser. No. 13/623,832 filed Sep. 20, 2012, which claims priority to U.S. Ser. No. 61/590,758 filed Jan. 25, 2012, and 61/537,422 filed Sep. 21, 2011, and hereby incorporated by reference for all purposes.

BACKGROUND OF THE INVENTION

Power utilities all over the world are heavily investing and deploying Smart Meters to enable two-way meter reading. As an extension of automatic meter infrastructure (AMI), power utilities are investing in home area network (HAN) solutions that will enable them to increase the awareness of energy usage among its customers in an effort to be able to charge its customers Time-of-Use (TOU) rates and manage its loads to prevent rolling black outs or brown outs due to peak usage. Wireless is currently the technology of choice among power utilities as the connectivity solution from under the glass of the Smart Meter to the HAN devices in the home. Although wireless is sufficient in most single-family homes, it becomes more challenging due to range and interferences in various environments such as multi-dwellings buildings, rural areas where the Smart Meter is far from the house as well as homes that are built with cement or steel frame.

From the above, it is seen that techniques for improving AMI and how the Smart Meter connects to HAN is highly desirable.

BRIEF SUMMARY OF THE INVENTION

The present invention relates to power meter techniques. In particular, the present invention provides a method and system for extending the automatic meter infrastructure (AMI) for Smart Grid and Demand Response applications in multi-dwelling buildings and rural markets where the Smart Meter is located far away from the individual dwelling or house. More specifically, the present invention relates to the wireless and power-line carrier bridging techniques used to extend an AMI where the Smart Meter cannot connect to Home Area Network (HAN) devices such as in-home displays (IHDs), programmable communicating thermostats (PCTs), and load control switches inside a dwelling or home for power utilities to provide energy monitoring to customers and deploy demand response programs.

As background, conventional Smart Meter technology allows for a wireless connection to a home area network using ZigBee. Each conventional Smart Meter has a digital certificate, commonly called, elliptical curve certification, or "ECC." In typical cases, a HAN device is configured to only a single Smart Meter with associated ECC.

The present invention may be embodied as a wireless and power-line carrier bridge for extending an AMI. The system includes a wireless and power-line carrier bridging data concentrator that connects to a Smart Meter wirelessly and convert the signal to the existing AC wiring in the meter room. The system further includes another wireless and power-line carrier bridge that plugs into a standard AC wall outlet in the individual dwelling or house for converting the power-line carrier signal from the AC wiring to a wireless signal.

In a specific embodiment, the present invention provides a method for processing electrical use from a plurality of power meters. The method includes providing a data concentrator coupled to a power-line to ZigBeebridge and receiving an RX packet from a ZigBee network, which is coupled to at least one power meter. The method includes processing the RX packet to convert the RX packet in to an 802.15.4 ZigBee packet and processing the 802.15.4 ZigBee packet into a ZCL packet. The method includes processing the ZCL packet into a ZigBee packet; processing the ZigBee packet into an 802.3 Ethernet packet and processing the 802.3 Ethernet packet via a power line.

In a specific embodiment, the present invention provides a system for extending the Smart Meter's range to connect to Home Area Networks for energy monitoring and demand response in, for example, a home, buildings, apartments, hospitals, schools, factories, office buildings, industrial area setting and other regions. The system has a data concentrator. The data concentrator has a wireless communicating module configured to transmit and receive information at one or more first frequencies ranging up to 2.4 GHz, and a power-line module configured to transmit and receive information at one or more frequencies ranging from about 100 to 30 MHz. The data concentrator receives energy usage data, pricing, demand response events, and messaging from one or more Smart Meters and convert the wireless signal to a power-line carrier signal over the existing all three phases of the AC wiring. The system also includes a wireless and power-line carrier bridge that convert the power-line carrier signal back to a wireless signal to connect to various Home Area Network (HAN) devices, including but not limited to a programmable communicating thermostat (PCT), smart appliances and in-home display (IHD).

In one or more embodiments, the present invention provides a network infrastructure configured to connect to new smart meters to home area network (HAN) devices to enable remote control of appliances through the AMI. Of course, there can be other variations, modifications, and alternatives.

In an alternative embodiment, the present invention provides a method for converting a meter device into a smart meter. The method includes providing a meter device coupled to a building structure. The meter device comprises a metrology device capable of determining a power usage from at least a pair of powerlines. The metrology device is being coupled to at least the pair of power lines using a coupling device. The meter device comprises a serial port coupled to the metrology device. The method includes transferring an input signal from a serial port from the serial port of the metrology device to an interface device mechanically coupled to the meter device. The interface device comprises a processor device, which is configured to receive the input signal from the serial port. The method also processes the input signal from the serial port from a first format to a second format, which is a power line format in an analog signal or a digital signal. In an example, the power line format is selected from OFDM, FSK, and others.

Numerous benefits are achieved using the present invention over conventional techniques. The present invention maximizes the use of existing AC power lines of a home or building, provides a wireless extension for a smart meter to connect to devices in the home, and provide a backhaul wireless extension to connect to an AMI network. In a preferred embodiment, the present system provides a novel technique to communicate with one or more Smart Meters wirelessly and convert data over the existing AC power lines and revert the signal from the power lines back to a wireless network. In another preferred embodiment, the present system provides a novel technique to communicate with one or more smart meters from one type of wireless network to a power-line network and then to another type of wireless network. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 7 is a simplified diagram of a meter data table according to an embodiment of the present invention;

FIG. 9 is a simplified diagram of a Power-line to ZigBee bridge data table according to an embodiment of the present invention;

FIG. 16 is a simplified diagram listing components of the data concentrator of FIG. 15 according to an embodiment of the present invention;

FIGS. 17-51 are simplified diagrams illustrating circuit diagrams and chip level PO's for components of the data concentrator of FIG. 15 according to embodiments of the present invention;

FIG. 53 through 85 are simplified diagrams illustrating circuit diagrams and chip level I/Os for components of the data concentrator of FIG. 52.

DETAILED DESCRIPTION OF THE INVENTION

The present invention relates to power meter techniques. In particular, the present invention provides a method and system for extending the automatic meter infrastructure (AMI) for Smart Grid and Demand Response applications in multi-dwelling buildings and rural markets where the Smart Meter is located far away from the individual dwelling or house. Techniques related to the field of extending the meter infrastructure into a multi-dwelling and methods of repeating a wireless signal are provided. More specifically, the present invention relates to the wireless and power-line carrier bridging techniques used to extend an AMI where the Smart Meter cannot connect to Home Area Network (HAN) devices such as in-home displays (IHDs), programmable communicating thermostats (PCTs), and load control switches inside a dwelling or home for power utilities to provide energy monitoring to customers and deploy demand response programs. The present invention provides methods and devices configured to use with Smart Metering and particularly to Home Area Networks, combinations of these and the like but it would be recognized that the invention has a broader range of applications.

Figure 1:
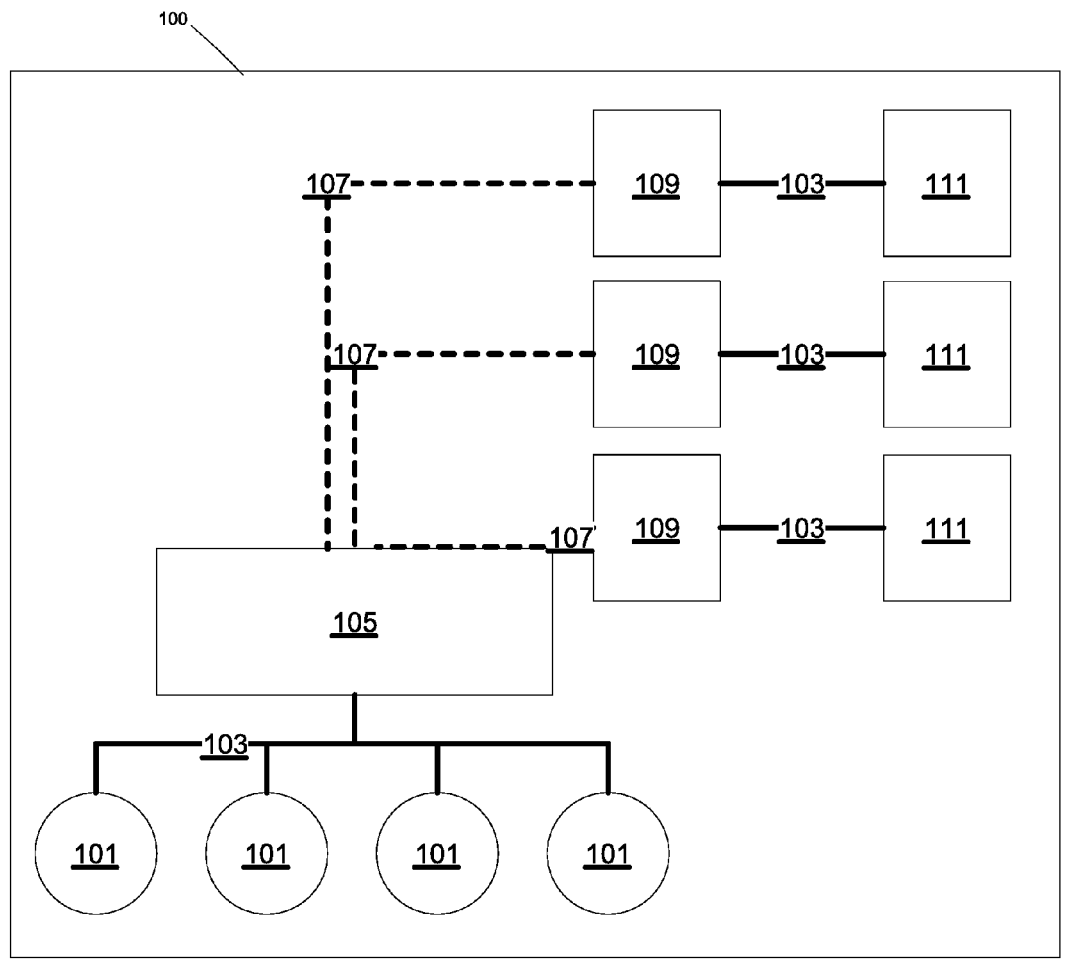
FIG. 1 is a simplified diagram of a system for monitoring power information according to an embodiment of the present invention.

FIG. 1 is a simplified diagram of a system for monitoring power information according to an embodiment in the present invention. This diagram is merely an example, which should not unduly limit the scope of the claims herein. One of ordinary skill in the art would recognize many variations, alternatives, and modifications. As shown, the system 100 comprises one to N wireless smart meters 101 communicating wirelessly 103 to one data concentrator 105. The data concentrator 105 convert the wireless data into a power-line carrier signal 107 and inject the signal into the existing building wiring 107. In each apartment, a bridge 109 converts the power-line carrier signal back to a wireless signal and wirelessly 103 connects to a wireless end device 111 such as a thermostat or in-home display.

In a specific embodiment, the present invention includes the data collection device, which is coupled to each of the power meters in a serial manner from the power meter numbered 1 to the power meter numbered N, and then back to the power meter numbered 1 to the power meter numbered N in a continuous process loop. An example of computer software for the loop can be found below:

```
nIndex=0;
while(1)
{
    If(ConnectMeter(nIndex)
    {
        Read_Store_Metering_Usage(nIndex);
```

```
        Get_Events_Message(nIndex);
    }
    nIndex = (nIndex+1)%MAX_METER_NUMBER;
}
```

Of course, there can be other variations, modifications, and alternatives.

Figure 2:
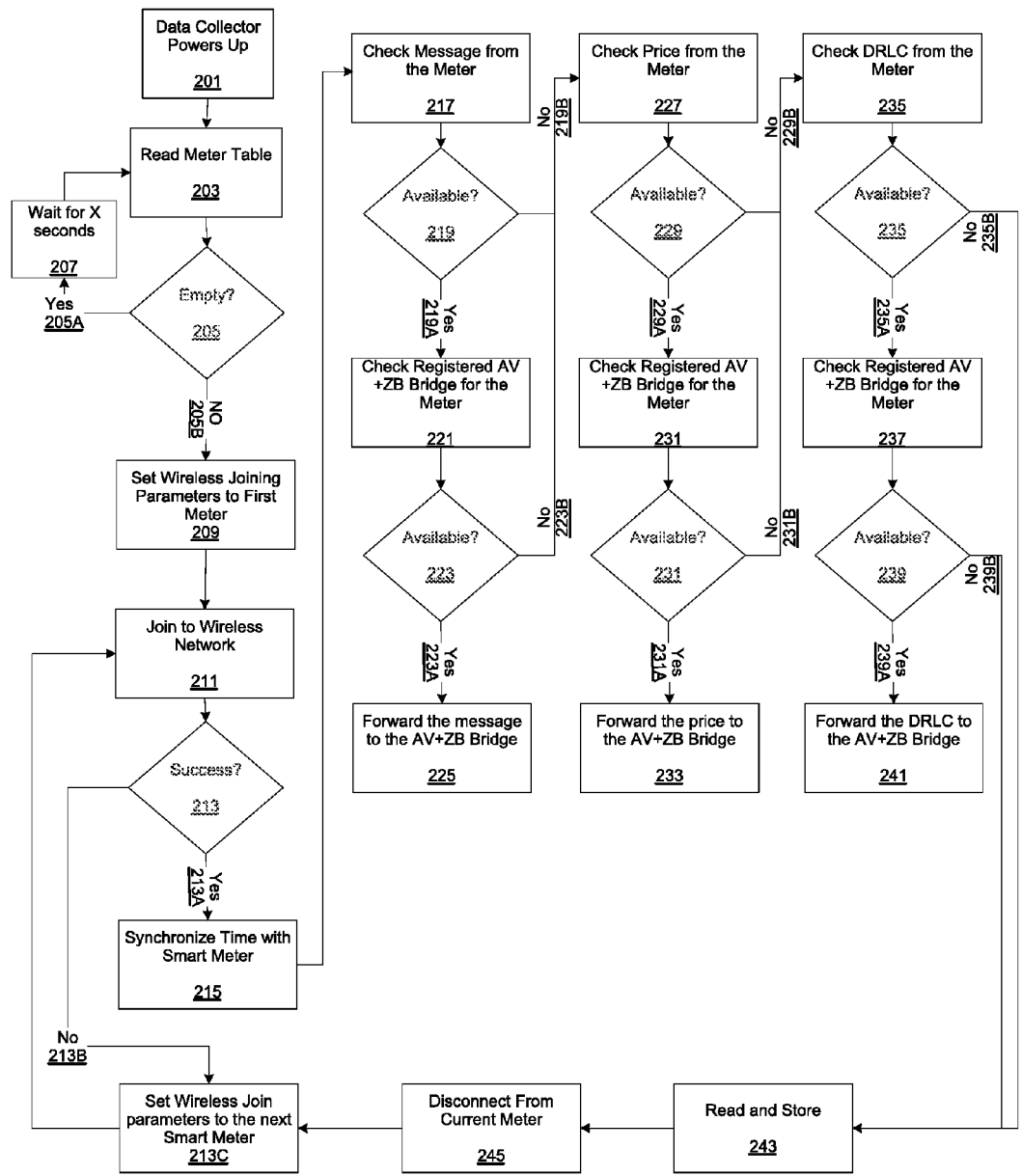
FIG. 2 is a simplified software flow diagram for a system for monitoring power information according to an embodiment of the present invention.

FIG. 2 is a simplified software flow diagram for a system for monitoring power information according to an embodiment in the present invention. This diagram is merely an example, which should not unduly limit the scope of the claims herein. As shown, the simplified software flow diagram starts with the data concentrator 201 powering up, then the data concentrator 201 will attempt to read the meter table 203. If the meter table is empty 205A, the data concentrator 201 will wait for X seconds 207 before attempting to read the meter again 203. If the meter table is not empty 205B, the data concentrator will configure the joining parameters to the first meter 209.

After configuring the joining parameters, the data concentrator will attempt to join the wireless network 211, starting with the first meter. If the data concentrator is not able to join to the first meter 213B, then the data concentrator will configure to join the next meter 213C. The data concentrator will continue to configure to join the X number of meters until it is able to join one. Upon success to join a meter 213A, the data concentrator will synchronize time with the meter 215. Then, the meter will check for usage from the meter 217. If the usage data is available 219A then the data concentrator will check for the registered bridging device for the meter 221. If there is a registered bridging device available 223A, then the data concentrator will forward the usage to the registered bridging device 225. If there is no registered bridging device available 223B, then the data concentrator will check the price signal from the meter 227.

If there is usage from the meter is not available 219B, the data concentrator will check the price signal from the meter 227. If the price signal is available 229A, the data concentrator will check for registered bridging device 231. If there is a registered bridging device available 231A, then the data concentrator will forward the price signal to the registered bridging device 233. If there is no registered bridging device available 233A, then the data concentrator will check the message from the meter 233B. If there is price signal from the meter is not available 229B, the data concentrator will check the DRLC signal from the meter 235. If the DRLC signal is available 235A, the data concentrator will check for registered bridging device 237. If there is a registered bridging device available 239A, then the data concentrator will forward the DRLC signal to the registered bridging device 241.

If there is no registered bridging device available 239B, then the data concentrator will store the information 243, disconnect from the current meter 245 and then automatically configure the join parameters to the next meter 213C to try to join the next wireless network 211.

If there is DRLC signal from the meter is not available 235B, the data concentrator will store the information 243, disconnect from the current meter 245 and then automatically configure the join parameters to the next meter 213C to try to join the next wireless network 211. Those of ordinary skill in the art will recognize other variations, modifications, alternatives.

Figure 3:
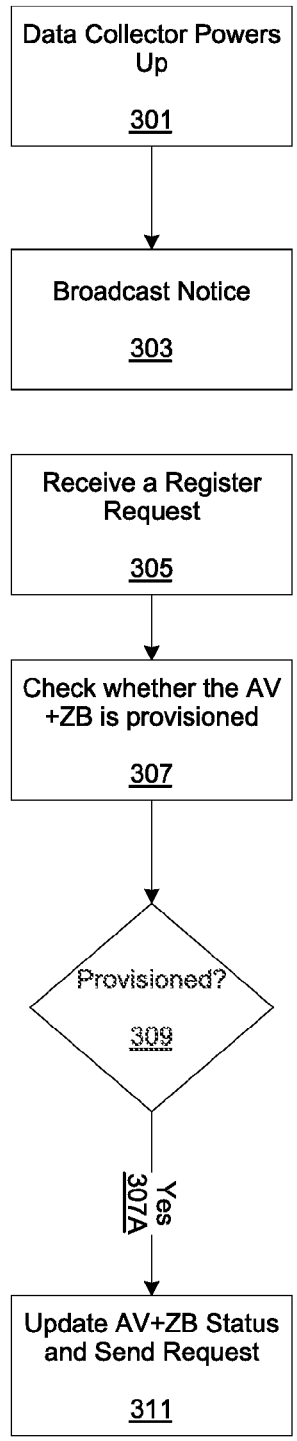
FIG. 3 is a simplified software flow diagram for a system for monitoring power information according to an embodiment of the present invention.

FIG. 3 is a simplified software flow diagram for a system for monitoring power information according to an embodiment in the present invention. This diagram is merely an example, which should not unduly limit the scope of the claims herein. One of ordinary skill in the art would recognize many variations, alternatives, and modifications. As shown, the simplified software flow diagram starts with the data concentrator powering up 301. It will then broadcast notice 303. Once it received a register request 305, it will check whether there is a bridging device provisioned 307. If there is a bridging device provisioned 307A, then it will update the bridging status and send response 311.

Figure 4:
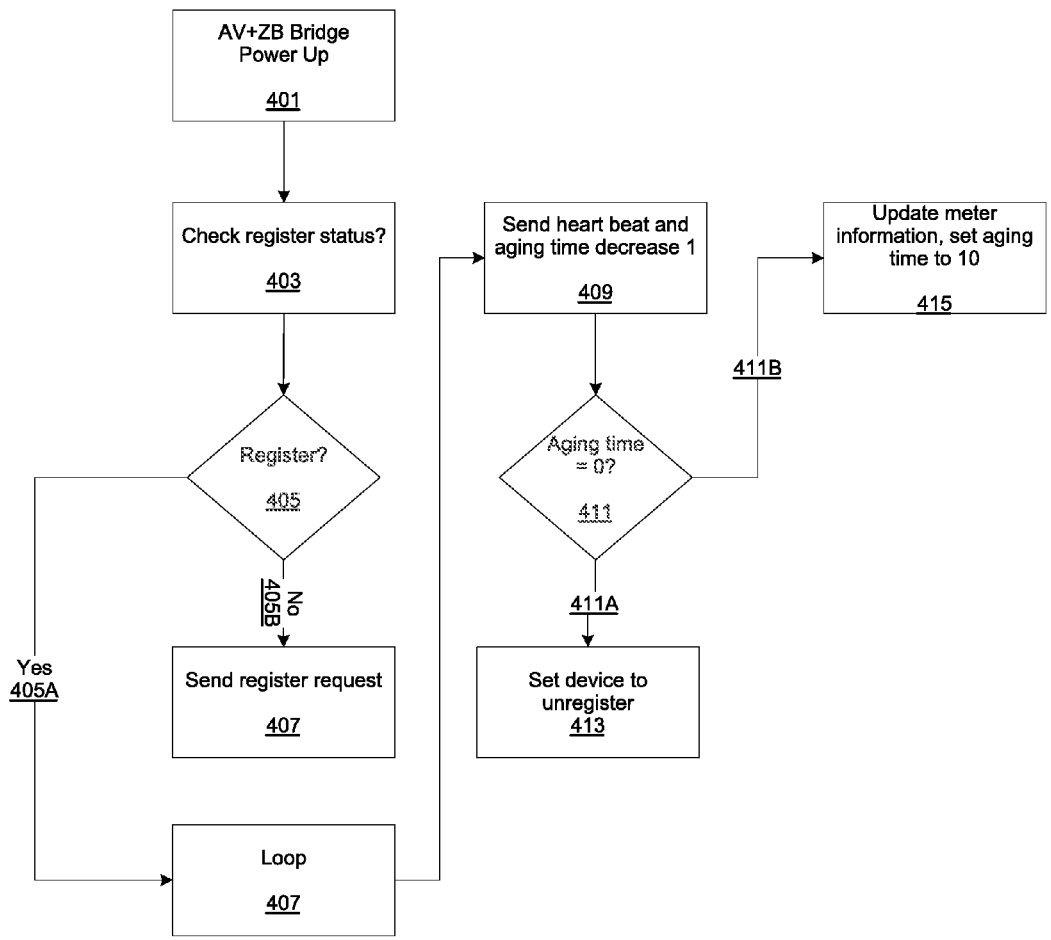
FIG. 4 is a simplified software flow diagram for a system for monitoring power information according to an embodiment of the present invention.

FIG. 4 is a simplified software flow diagram for a system for monitoring power information according to an embodiment in the present invention. This diagram is merely an example, which should not unduly limit the scope of the claims herein. One of ordinary skill in the art would recognize many variations, alternatives and modifications. As shown, the simplified software flow diagram starts with the wireless to power-line carrier bridge powering up 401 and then checking the register status 403. If the register was successful 405A, then the wireless to power-line carrier bridge goes into a loop 407 of continuously sending a heart beat and decrease the aging time by one 409 to the data concentrator. If the aging time is equal to zero 411A, the wireless to power-line carrier bridge will configure to unregister from the data concentrator 413. If the aging time is not zero 411B, the wireless to power-line carrier bridge update the smart meter information and set aging time to ten 415.

Figure 5:
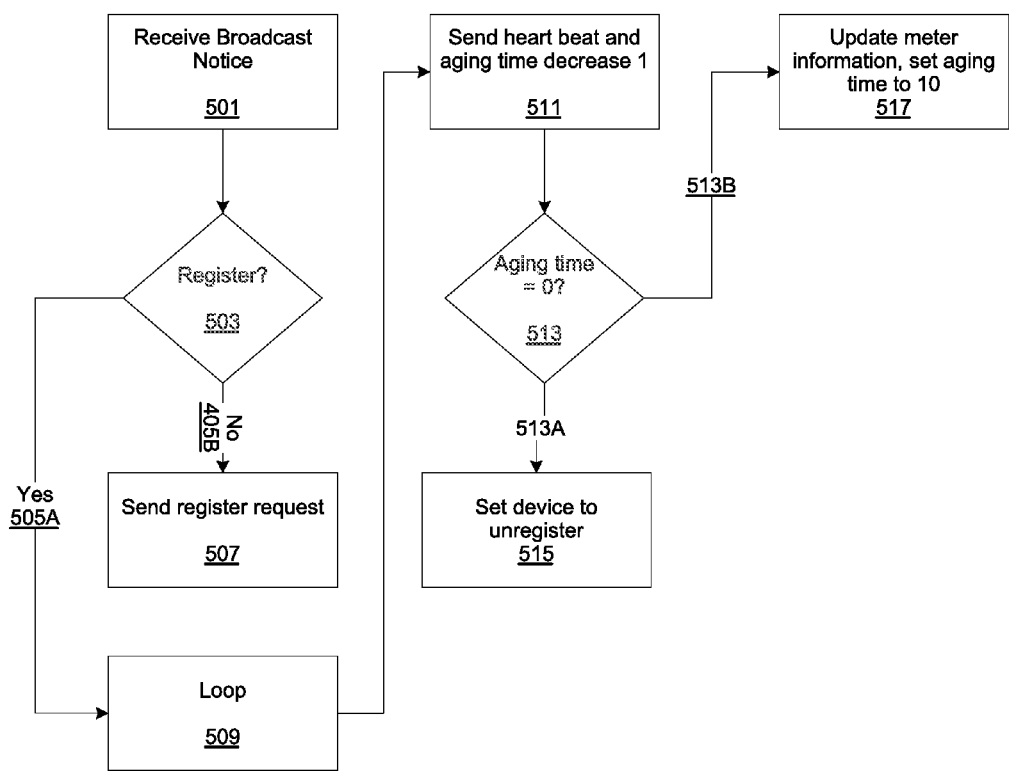
FIG. 5 is a simplified software flow diagram for a system for monitoring power information according to an embodiment of the present invention.

FIG. 5 is a simplified software flow diagram for a system for monitoring power information according to an embodiment in the present invention. This diagram is merely an example, which should not unduly limit the scope of the claims herein. One of ordinary skill in the art would recognize many variations, alternatives and modifications. As shown, the simplified software flow diagram starts with the wireless to power-linecarrier bridge receiving a broadcast notice 501 and then checking the register status 503. If the register was successful 505A, then the wireless to power-line carrier bridge goes into a loop 509 of continuously sending a heart beat and decrease the aging time by 1 511 to the data concentrator. If the aging time is equal to zero 513A, the wireless to power-line carrier bridge will configure to unregister from the data concentrator 515. If the aging time is not zero 513B, the wireless to power-line carrier bridge update the smart meter information and set aging time to ten 517.

Figure 6:
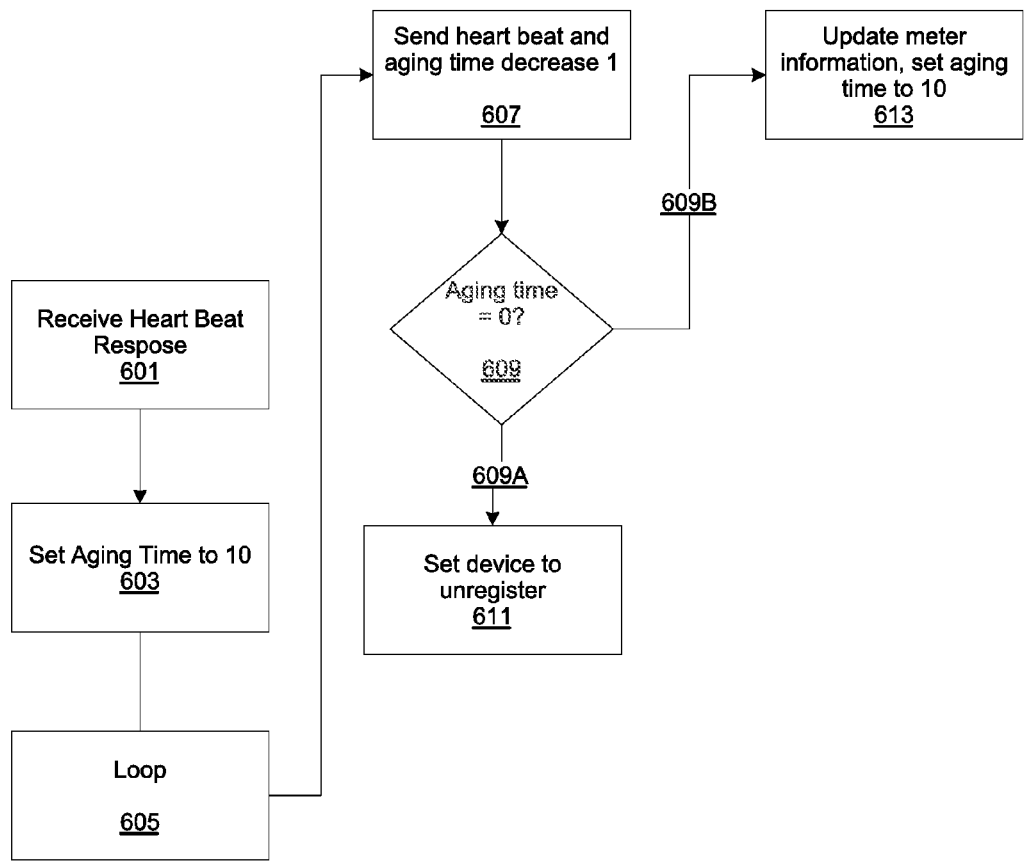
FIG. 6 is a simplified software flow diagram for a system for monitoring power information according to an embodiment of the present invention.

FIG. 6 is a simplified software flow diagram for a system for monitoring power information according to an embodiment in the present invention. This diagram is merely an example, which should not unduly limit the scope of the claims herein. One of ordinary skill in the art would recognize many variations, alternatives and modifications. As shown, the simplified software flow diagram starts with the wireless to power-line carrier bridge a heart beat response 601 and then setting the aging time to ten 603. It then continuously in a loop 605 sends a heart beat and decrease the aging time by one 607 to the data concentrator. If the aging time is equal to zero 609A, the wireless to power-line carrier bridge will configure to unregister from the data concentrator 611. If the aging time is not zero 609B, the wireless to power-line carrier bridge update the smart meter information and set aging time to ten 613.

FIG. 7 is a simplified diagram of a meter data table according to an embodiment of the present invention. This figure illustrates a table summarizing some basic meter unique ID and attributes. As shown, meter unique ID such as meter EUI, Pan ID, Channel ID and Reserved are shown. To these unique ID, a type is given. Length and Remark are also provides, as an example. Other combinations or assignments of the above policies may be made in alternative embodiments of the present invention.

Figure 8:
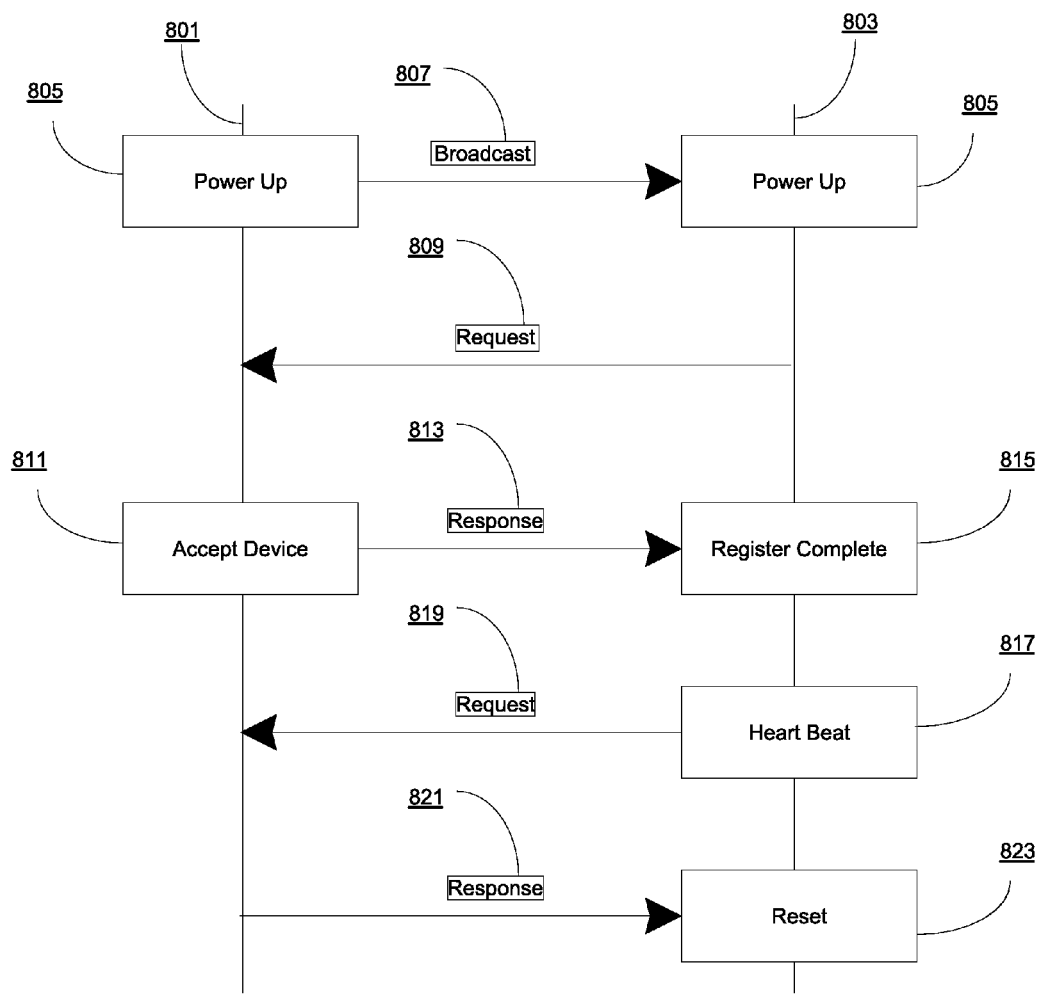
FIG. 8 is a simplified software flow diagram according to an embodiment of the present invention.

FIG. 8 is a simplified software flow diagram of the message flow according to an embodiment in the present invention. This diagram is merely an example, which should not unduly limit the scope of the claims herein. One of ordinary skill in the art would recognize many variations, alternatives and modifications. As shown, the simplified software flow diagram illustrates the message flow between the data concentrator 801 and the wireless to power-linecarrier bridge 803. The flow starts with both the data concentrator 801 and the wireless to power-linecarrier bridge 803 both powering up 805. Then, the data concentrator 801 sends a broadcast notice 807 to the wireless to power-linecarrier bridge 803. The wireless to power-linecarrier bridge 803 then sends a register request 809 to the data concentrator 801. The data concentrator accepts the wireless to power-linecarrier bridge 811 and then sends a response 813 to the wireless to power-line carrier bridge 803. Once the registration is complete 815, the wireless to power-linecarrier bridge 803 creates a heart beat 817 and sends a heart beat request 819 to the data concentrator 801. The data concentrator 801 sends a heart beat response 821 back to the wireless to power-linecarrier bridge 803. Then, the wireless to power-linecarrier bridge 803 resets its heart beat counter 823.

FIG. 9 is a simplified diagram of a Power-line to ZigBee bridge data table according to an embodiment of the present invention. This figure illustrates a table summarizing some basic device information and attributes. As shown, device information such as Device Name, Device Address, Status and Reserved. To this device information, a data type, data length and remark are given as an example. Other combinations or assignments of the above policies may be made in alternative embodiments of the present invention.

Figure 10:
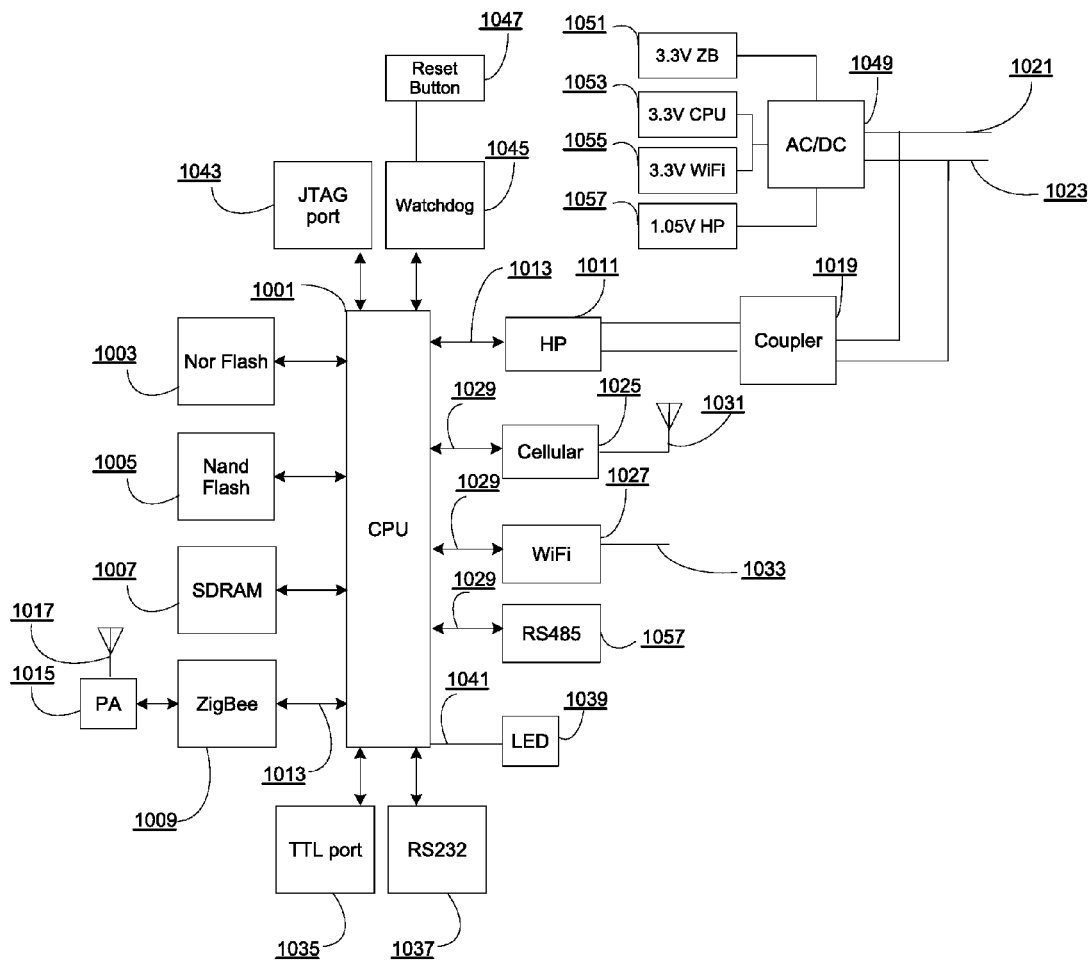
FIG. 10 is a simplified block diagram of a data concentrator according to an embodiment of the present invention.

FIG. 10 is a simplified block diagram of a data concentrator according to an embodiment of the present invention. This diagram is merely an example, which should not unduly limit the scope of the claims herein. One of ordinary skill in the art would recognize many variations, alternatives and modifications. As shown, the data concentrator includes a variety of elements. Such elements include a Central Processing Unit (CPU) 1001 connected to a NOR Flash memory 1003, a NAND Flash memory 1005 and a synchronous dynamicrandom access memory (SDRAM) 1007. The CPU 1001 is coupled to a ZigBee Module 1009 and a HomePlugPower-line Carrier Module 1011 via a universal asynchronous receive/transmitter (UART) or a Serial Peripheral Interface (SPI) bus 1013. The ZigBee Module 1009 is coupled to a power amplifier 1015 that is connected to an antenna 1017. The HomePlugPower-line Carrier Module 1011 is coupled to a signal coupler 1019 that couples the signal onto buildings Line 1 power-line 1021 and neutral 1023. The CPU 1001 is also connected to a cellular module 1025 and a Wi-Fi module 1027 via a Universal Serial Bus (USB) 1029. The cellular module 1025 is coupled to an antenna 1031. The Wi-Fi module is powered by a 5V or 3.3V power 1033. The CPU 1001 is also connected to a TTL serial interface 1035 and a Recommended-Standard S232 (RS232) via a UART 1037. The CPU 1001 is also connected to a number of light emitting diodes (LEDs) 1039 via a General Purpose Input/Output (GPIO) 1041. The CPU 1001 is also connected to a Joint Test Action Group (JTAG) connector 1043 and a watchdog 1045. The watchdog 1045 is then connected to a reset module 1047. The data concentrator 1000 is powered by an AC/DC power supply 1049 that is connected to the building's Line 1 power-line 1021 and neutral 1023 and supplies power to the ZigBee module 1051, the CPU 1053, the HomePlugPower-line module 1055, and the Wi-Fi module 1057. The RS-485 1057, also known as TIA/EIA-485, is connected to the CPU via UART 1029.

Figure 11:
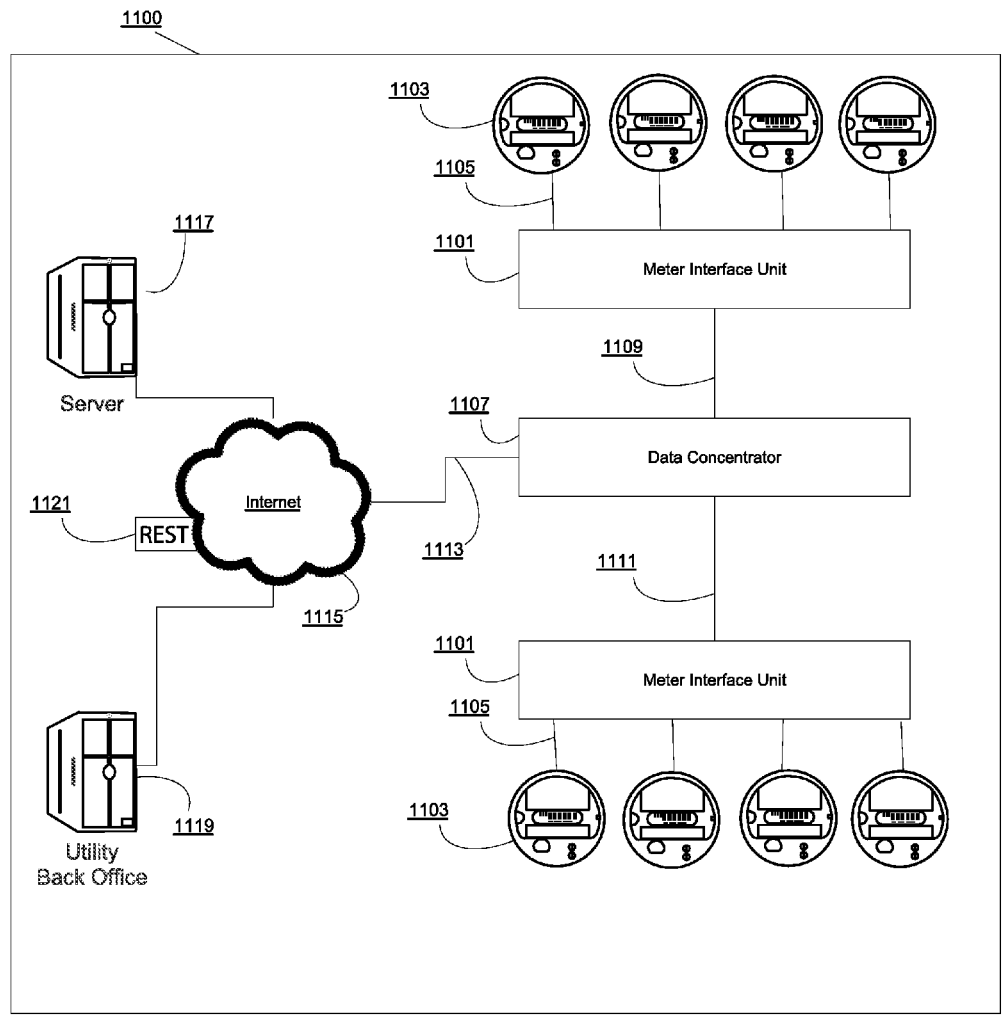
FIG. 11 is a simplified block diagram of a Power-line to ZigBeebridge according to an embodiment of the present invention.

FIG. 11 is a simplified block diagram of a Power-line to ZigBeebridge according to an embodiment of the present invention. This diagram is merely an example, which should not unduly limit the scope of the claims herein. One of ordinary skill in the art would recognize many variations, alternatives, and modifications. As shown, the system 1100 comprises a meter interface unit 1101 that is connected to a bank of meters 1 through N 1103 through a serial or wireless connection 1105. The meter interface unit 1101 then converts the serial or wireless signal to a power-line carrier signal into the existing building power-lines 1109. A Data Concentrator 1107 aggregates all meter data and send the collected information to the internet 1115 over a cellular or wireless connection 1113. The Data Concentrator 1107 will establish a two way communication path to a remote server 1117 or a utility back office 1119 through the internet using a standardized representational statement transfer (REST) interface 1121.

Figure 12:
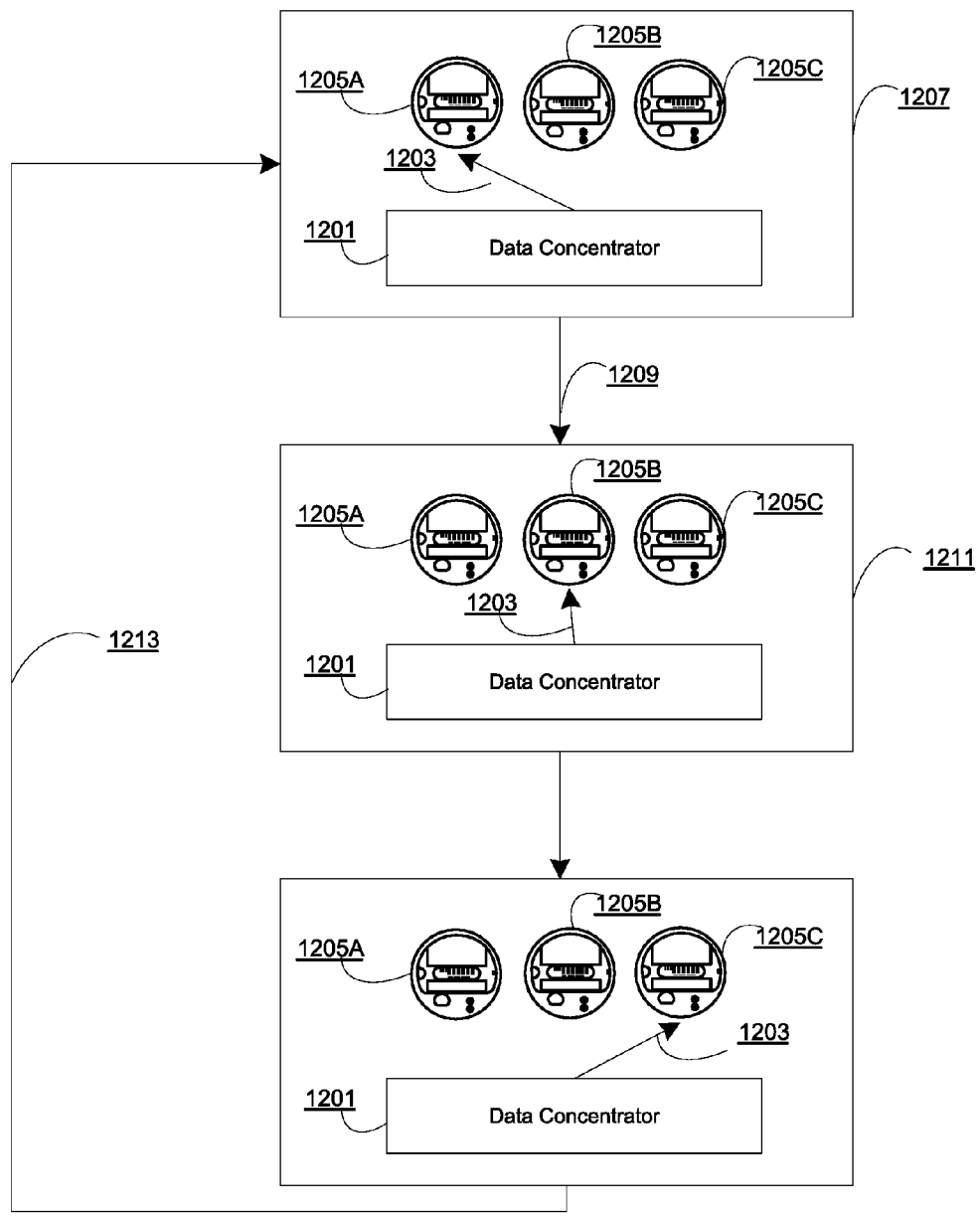
FIG. 12 is a simplified block diagram of a Power-line to ZigBeebridge according to an embodiment of the present invention.

FIG. 12 is a simplified block diagram of a Power-line to ZigBeebridge according to an embodiment of the present invention. This figure can represent a software flow diagram of a system loop according to an embodiment in the present invention. This block diagram is merely an example, which should not unduly limit the scope of the claims herein. One of ordinary skill in the art would recognize many variations, alternatives, and modifications. As shown, the data concentrator 1201 communicates with a series of Smart Meter 1205 1 thru N where N is an integer greater than 1. Step one 1207, the data concentrator 1201 connects to the first Smart Meter 1205A wirelessly 1203. After the data concentrator 1201 connects to the first Smart Meter 1205A and obtains the information required, step two 1209, the data concentrator 1201 disconnects from the first Smart Meter 1205A and step three 1211 wirelessly 1203 connects to the second Smart Meter 1205B. The data concentrator 1201 continues this process to the N number of Smart Meters 1205C. Upon the completion of connecting to the series of Smart Meters, the data concentrator 1201 loops back 1213 to step one 1207 and repeats the process continuously.

Figure 13:
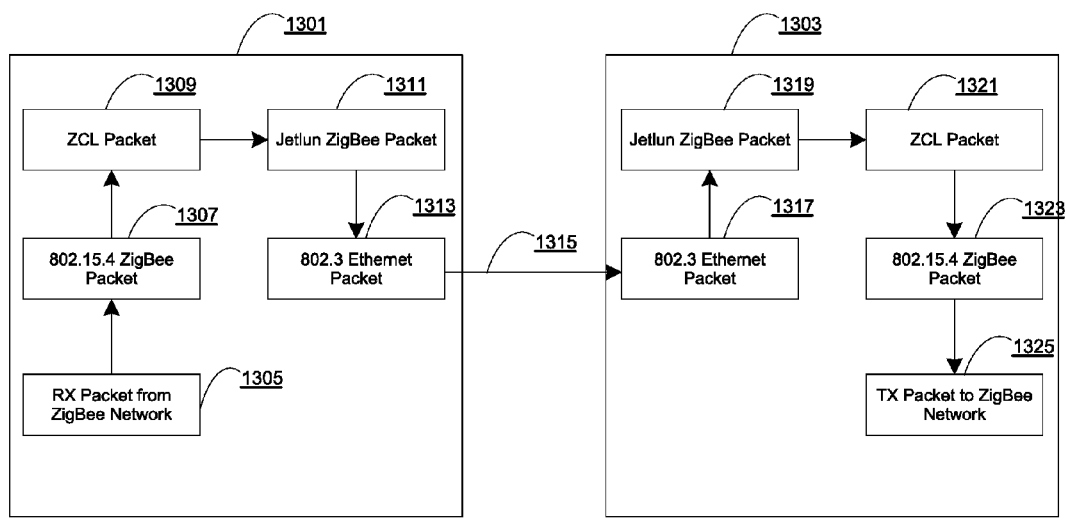
FIG. 13 is a simplified software flow diagram of data processing according to an embodiment of the present invention.

FIG. 13 is a simplified software flow diagram of data processing according to an embodiment in the present invention. This software diagram is merely an example, which should not unduly limit the scope of the claims herein. One of ordinary skill in the art would recognize many variations, alternatives and modifications. As shown, the diagram shows data processing between the data concentrator 1301 and the Power-line to ZigBeebridge 1303. The diagram starts with the data concentrator 1301 receiving a RX packet from the ZigBee Network 1301 receiving a RX packet from the ZigBee Network 1305 and converts it to a 802.15.4 ZigBeePacket 1307. Then, it converts it to a ZCL Packet 1309, which then gets converted to a JetlunZigBee Packet 1311 where it processes it into a 802.3 Ethernet Packet 1313. Once the data is in an Ethernet packet form, it passes the packets via power-line 1315 to the Power-line to ZigBeebridge 1303. The Power-line to ZigBee bridge 1303 takes the 802.3 Ethernet Packet 1317 and converts it back to the JetlunZigBee Packet 1319. That JetlunZigBee Packet converts it to a ZCL Packet 1321 that then, converts it to an 802.15.4 ZigBee packet 1323. Once it is in an 802.15.4 ZigBee Packet, it will transfer the TX Packet to the ZigBee Network 1325.

The JetlunZigBee packet format includes:

| Start Flag | Command | Length | DestShortID | ClusterID | ZCL len | ZCL Data | Endpoint | CRC |
|---|---|---|---|---|---|---|---|---|
| 2 bytes | 1 byte | 2 bytes | 2 bytes | 2 bytes | 1 | N bytes | 1 byte | 1 byte |

The Start Flag comprises 2 bytes filed to indicate start of a new packet. The Command comprises 1 byte filed to indicate it is a ZCL based packet. The Length describes how many bytes of field is included in the DestShortID, ZCL Len, Zcl Data, and Endpoint. The DestShortID describes the destination of the packet to. It is a short address of ZigBee network. The ClusterID defines the ZCL packet belongs to. ZCL Len defines the number of bytes of the ZCL data. The ZCL Data defines the data of ZCL packet. The Endpoint defines which endpoint the ZCL packet belongs to. And the CRC defines the check sum of the packet except fields including start flag and CRC.

Advanced Meter Extension Solution

Millions of Smart Meters have already been deployed around the world. But they are fast becoming outdated and it presents a troublesome and expensive burden for Power Utilities to have to replace the meters again, having just spent billions in upgrade costs. The Present Advanced Meter Extension Solution ("AMES") was developed specifically to help Power Utilities to bridge the meter to the home area network ("HAN") whilst minimizing cost and resources to do so. See, for example, FIG. 14.

AMES is a revolutionary, patent-pending ZigBee and HomePlugPower-line bridging solution. It converts a ZigBee Smart Energy Profile (SEP) 1.1/2.0 signal from the meter, injects it over the existing electrical wires of a building using HomePlugPower-line technology, and then converts that signal back into a ZigBee SEP 1.1/2.0 signal. It offers a secure, reliable and "no-wires" communication link between the meter and the HAN. Although there is technically only one electrical wiring scheme in a given building, each apartment dwelling is segregated from the others through advanced 128-bit AES encryption, so security and privacy is maintained between apartment dwellers.

AMES is designed to be an add-on adapter solution to the existing Smart Meters that are currently being rolled out. It can be used with any third-party meter that embeds ZigBee SEP 1.1/2.0 as the communication link to the HAN. AMES does not rely on any changes or modification to the existing Smart Meter. It includes a 3G backhaul to a Utility Management Platform ("UMP").

AMES can also function as a SEP 1.0/1.1 to 2.0 bridge for Power Utilities that have already deployed ZigBee SEP 1.0/1.1 and need a way to connect to emerging HAN devices that are SEP 2.0 enabled. AMES consists of three basic components: (1) Concentrator; (2) Bridge; and (3) UMP.

The Concentrator is a utility-grade, single-phase meter concentrator that can be installed in the meter closet. It is capable of connecting up to eight (8) ZigBee-based Smart Meters, converting the signal to a HomePlugPower-line signal and then injecting it into the existing electrical wires. The Concentrator also connects to the UMP for network and device management. There are two forms of Meter Concentrators: One for the ANSI North American market and the other for the IEC worldwide market. The technology is the same and the only differentiation is the form factor suited to each market. The ANSI version is housed in a socket-base compartment that installs between the meter socket and the Smart Meter making installation a snap. The IEC version is mounted below the meter terminal cover.

The Bridge is a device to be installed inside a home, and converts the signal from HomePowerPower-line back to a ZigBee wireless signal. The Bridge appears in different form factors. The basic form is that of an Appliance Module, a wall module that also functions as a Smart Plug for direct response programs. A more advanced Bridge is an energy management gateway that not only performs bridging from HomePlug-Power-line to ZigBee, but also acts as the home energy management gateway connecting to the broadband network.

UMP is the network- and device-management server software for AMES. It provides an overview of all devices on the network, details current device network status, and allows for firmware upgrades to AMES and other HAN devices connected to AMES. UMP can be a fully managed to be deployed in a Power Utility's own data center. Integration to a utility back office can be easily achieved through standardized REST API in XML and JSON formats.

Figure 14:
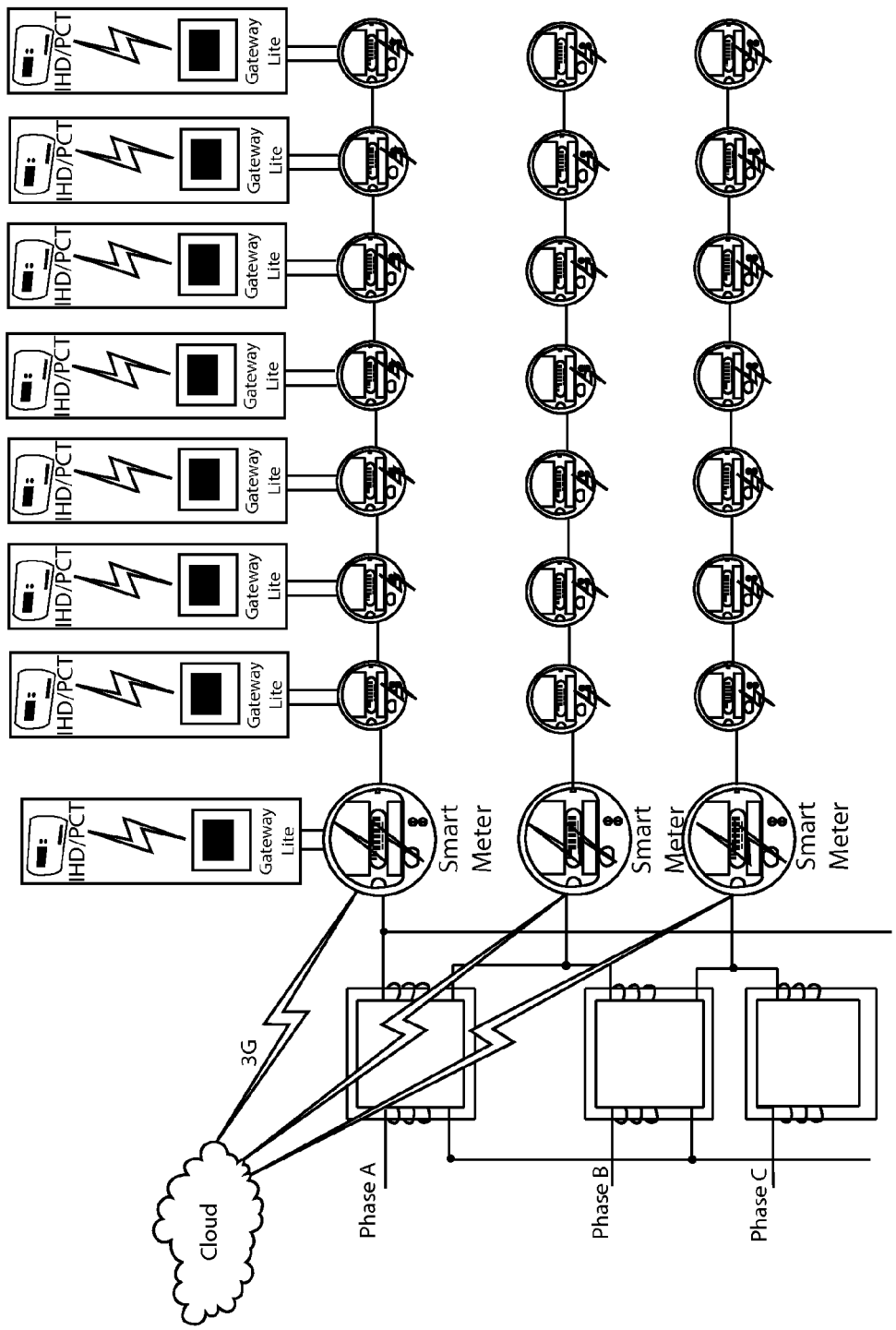
FIG. 14 is a simplified diagram of a system for monitoring power information according to an embodiment of the present invention.

FIG. 14 is a simplified diagram of a system for monitoring power information according to an embodiment of the present invention. This diagram is merely an example, which should not unduly limit the scope of the claims herein. One of ordinary skill in the art would recognize many variations, alternatives and modifications. As shown, the power meter network system includescan include one or more smart meter devices connected in series, parallel, or a combination of both configurations. Each of the smart meter devices can be coupled to an in-home display (IHD) and/or a programmable communicating thermostat (PCT).

These IHD/PCT devices can interact with the one or more smart meters via a gateway interface. The smart meters can be connected to a cloud interface or the Internet via a wired, wireless, 3G, or other electronic communication means. One or more of the smart meters can also be coupled to computer processing units connected in series, parallel, or a combination of both. These computer processing units can be which can be configured to respond to various input/output signals, such as those represented by Phase A, Phase B, Phase C, etc.

The present invention can include a system for monitoring power information. The system can include a power meter bank and a remote data collection device. In an embodiment, the power meter bank can include a plurality of power meter devices numbered from 1 through N, where N is an integer greater than 2. Each of the power meter devices can include a ZigBee transceiver device, which can be configured to communicate the power meter. In an embodiment, the remote data collection device can include a power line communication device, a central processing device, and a ZigBee transceiver. The ZigBee transceiver can be configured to communicate between each of the power meter devices to exchange information between the remote data collection device and any one of the power meter devices.

In a specific embodiment, the remote data collection device can include one or more memories coupled to the ZigBee transceivers. The one or more memories can include a ZigBee network setting information for the ZigBee transceivers for their respective power meter devices. The ZigBee network setting information can include a channel identification information, a PAN identification information, and an optionally extensional PAN identification information. Additionally, each of the ZigBee transceivers can be configured in computer code to a permit joining state and a deny joining state. Furthermore, each of the memories of the remote data collection device can include one or more meter tables. The remote data collection device and each of the power meter devices can be configured to perform a variety of operations.

As an example, the configured operations can include reading a meter table from a memory on the remote data collection device to determine a network connection information. In a specific embodiment, the remote data collection device can provide an interface to the operator to view/add/edit/delete network settings of one or several smart meter devices. The meter table can be stored in a non-volatile memory of the remote data collection device. The configured operations can include setting ZigBee joining information starting with the power meter numbered 1. The remote data collection device can connection to the power meter numbered 1, which can be done via issuing a ZigBee start join request in the ZigBee transceiver of the remote data collection device. A time information can be synchronized between the remote data collection device and the power meter numbered 1. The time information can include reading time status, time of time cluster from meter, or setting the time to the ZigBee transceiver of the remote data collection device.

A check information event can also be performed for the power meter numbered 1. This check can include retrieving information related to any messages, price, demand response and load (DRLC), and other related information to energy/power use. For example, once the ZigBee transceiver of the remote data collection device is connected to a smart meter device, it can send a Get Last Message, Get Scheduled Event, Get Last Price command to the smart meter device. The smart meter device can be configured to respond with the appropriate responses to these commands. If these information events are available, they can be stored and forwarding to a corresponding home device. These home devices can include personal computers, hand held computer devices, home area network (HAN) devices, and the like. HAN devices can include the previously mentioned IHD devices, PCT devices, and the like. The metering data, such as energy usage per home, can be read and stored from the power meter numbered 1. For example, the ZigBee transceiver can issue a global read command to read consumption delivered and receiver from the smart meter device numbered 1.

The configured operations can also include disconnecting from the power meter device numbered 1. In a specific embodiment, this can include restoring a pre-configured link key for the remote data collection device. The pre-configured link key can be a 16 byte hex string which is used for encryption application level packets in the ZigBee network. The Advanced Encryption Standard (AES) can be implemented with the pre-configured link key. The previously mentioned operations can be repeated for the any or all power meter devices. As an example, following the disconnection from the power meter numbered one, these operations can be performed for each of the remaining power meter devices numbered 2 through N. Of course, those skilled in the art will recognize other variations, modifications, and alternatives.

In a specific embodiment, the remote data collection device can be coupled to each of the power meter devices in a serial manner from the power meter device numbered 1 to the power meter device numbered N, then back to the power meter device numbered 1 to the power meter device numbered N in a continuous loop pattern. Also, the remote data collection device can be provided within a spatial vicinity of the power meter bank. The spatial vicinity can be about two meters and less. The previously mentioned power meter bank can be provided in a spatial region of two meters square or less. Also, the power meter devices can each act as a host device.

In a specific embodiment, the system can include a network device configured with a power line network. The power line communication device can be configured to exchange information between the ZigBee transceivers and the network device through the power line network. In a specific embodiment, the system can also include a utility server configured with a power line network coupled to a world wide network of computers. The remote data collection device can be coupled to the utility server via the power line network and can be coupled to the world wide network of computers. The remote data collection device can also be coupled to a wireless network that is coupled to the Internet.

The present invention also includes a method for processing electrical use from a plurality of power meters. In an embodiment, the method can include providing a data concentrator coupled to a power-line to a ZigBee bridge. The method can include receiving an RX packet from a ZigBee network, which can be coupled to at least one power meter. The RX packet can be processed to be converted into an 802.15.4 ZigBee packet. The 802.15.4 ZigBee packet can be processed into a ZCL packet, which can then be processed into a ZigBee packet. The ZigBee packet can be processed into a 802.3 Ethernet packet and the 802.3 Ethernet packet can be processed via a power line. Those of ordinary skill in the art will recognize other variations, modifications, and alternatives.

Figure 15:
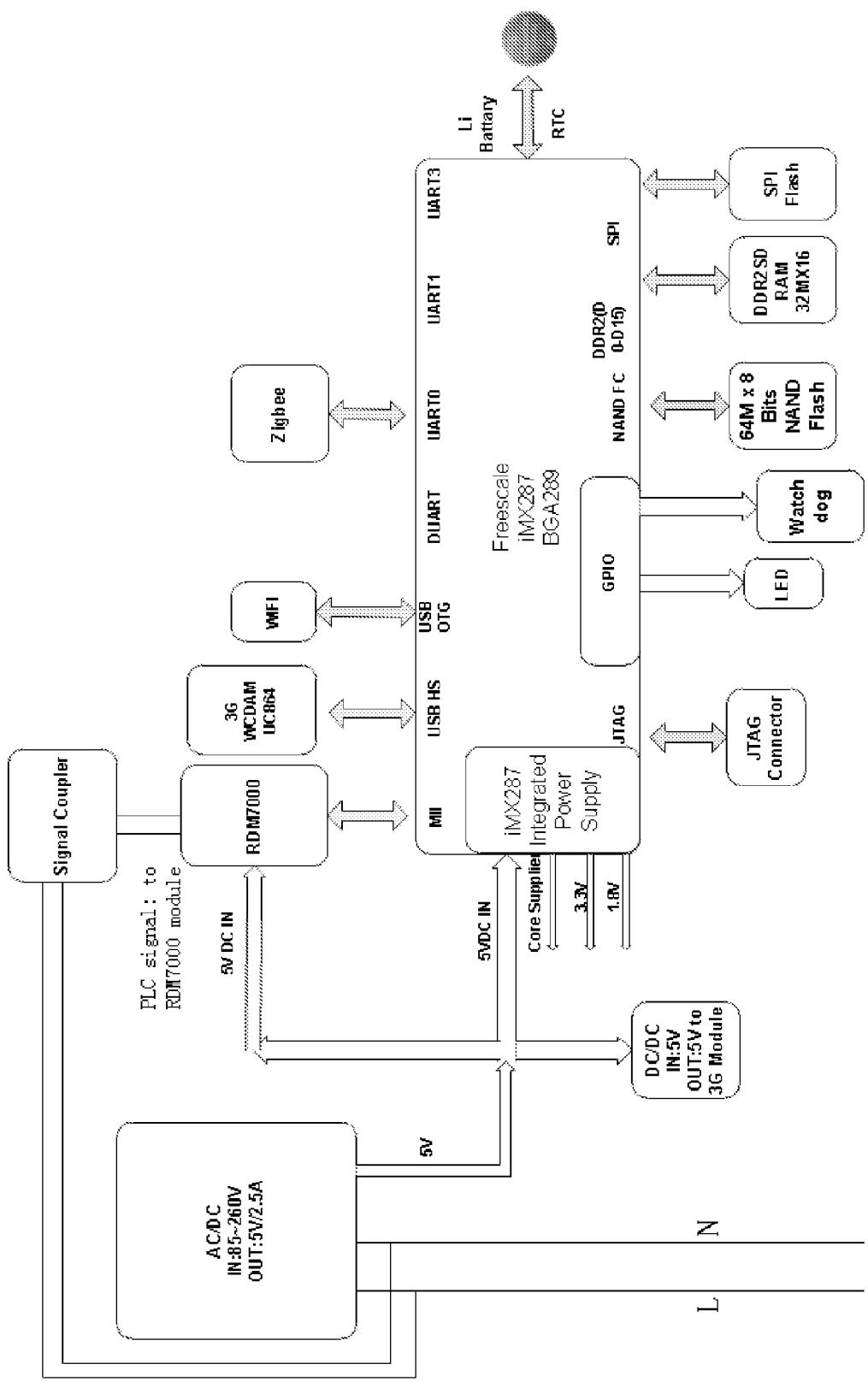
FIG. 15 is a simplified block diagram of a data concentrator, including processor, communication interfaces, and power supply, according to an embodiment of the present invention.

FIG. 15 is a simplified block diagram of a data concentrator, including processor, communication interfaces, and power supply, according to an embodiment of the present invention. This block diagram is merely an example, which should not unduly limit the scope of the claims herein. One of ordinary skill in the art would recognize many variations, alternatives and modifications. This block diagram can represent an LMX28 Collar device or i.MX28 Collar device according to an embodiment of the present invention. Further details regarding individual components shown in FIG. 15 can be found below in the description for FIGS. 16-51.

FIG. 16 is a simplified diagram listing components of the data concentrator of FIG. 15 according to an embodiment of the present invention. This block diagram is merely an example, which should not unduly limit the scope of the claims herein. One of ordinary skill in the art would recognize many variations, alternatives and modifications. As shown, the example component listing includes details for a DCDC Inductor, DCDC Output Capacitors, a 24 MHz Crystal, a 32 kHz Crystal, and a USB Ferrites and ESD Protection.

FIGS. 17 through 51 are simplified diagrams illustrating circuit diagrams and chip level I/O's for components of the data concentrator of FIG. 15 according to embodiments of the present invention. These circuit diagrams show circuit device components according to embodiments of the present invention. In an embodiment, these figures show components of an i.MX28 Collar device or LMX28 Collar device according to an embodiment of the present invention.

Figure 17:
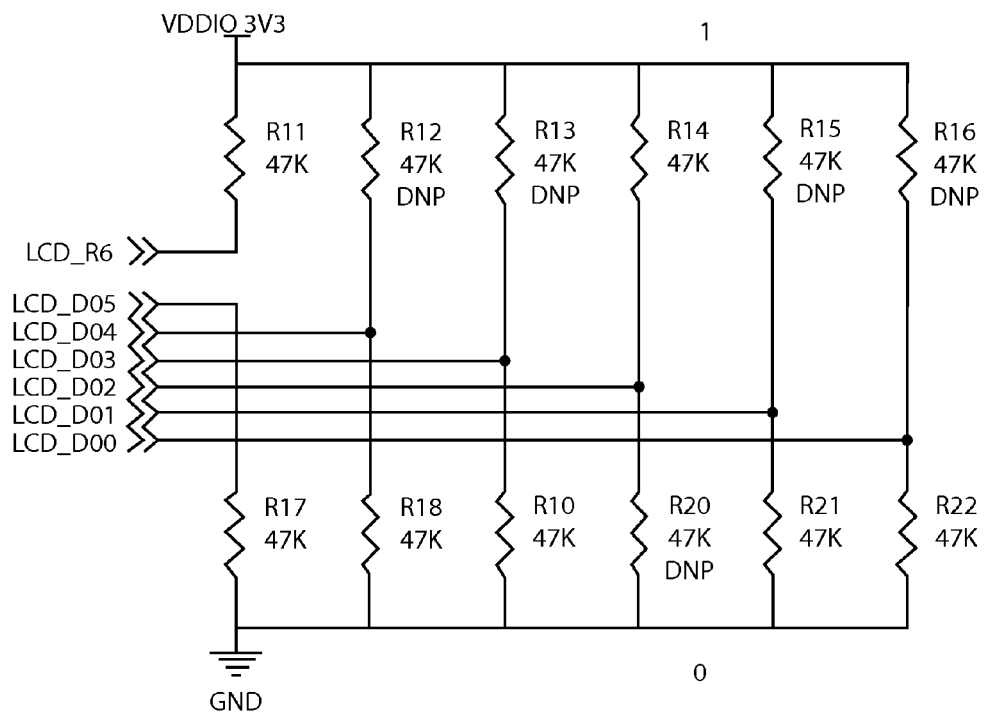

FIG. 17 shows an example of a Bootmode Resistor Selection circuit. This circuit is merely an example, which should not unduly limit the scope of the claims herein. One of ordinary skill in the art would recognize many variations, alternatives and modifications. As shown, the example component listing includes details for a 3.3V resister, a R11 through R22, configuration map.

Figure 18:
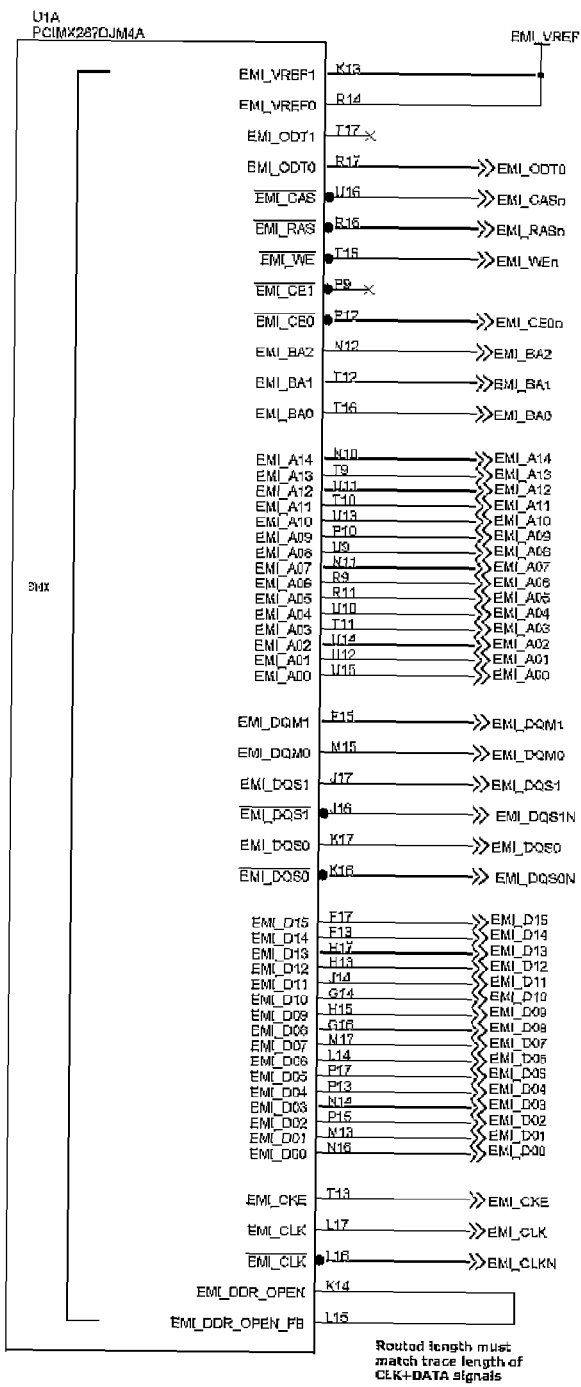

FIG. 18 shows a DDR2 and mDDRcircuit device. This circuit device is merely an example, which should not unduly limit the scope of the claims herein. One of ordinary skill in the art would recognize many variations, alternatives and modifications. As shown, the example circuit device includes an External Memory Interface (EMI) to a double data rate synchronous dynamic random-access memory (DDR2) and a mobile double data rate synchronous dynamic random-access memory (mDDR).

Figure 19:
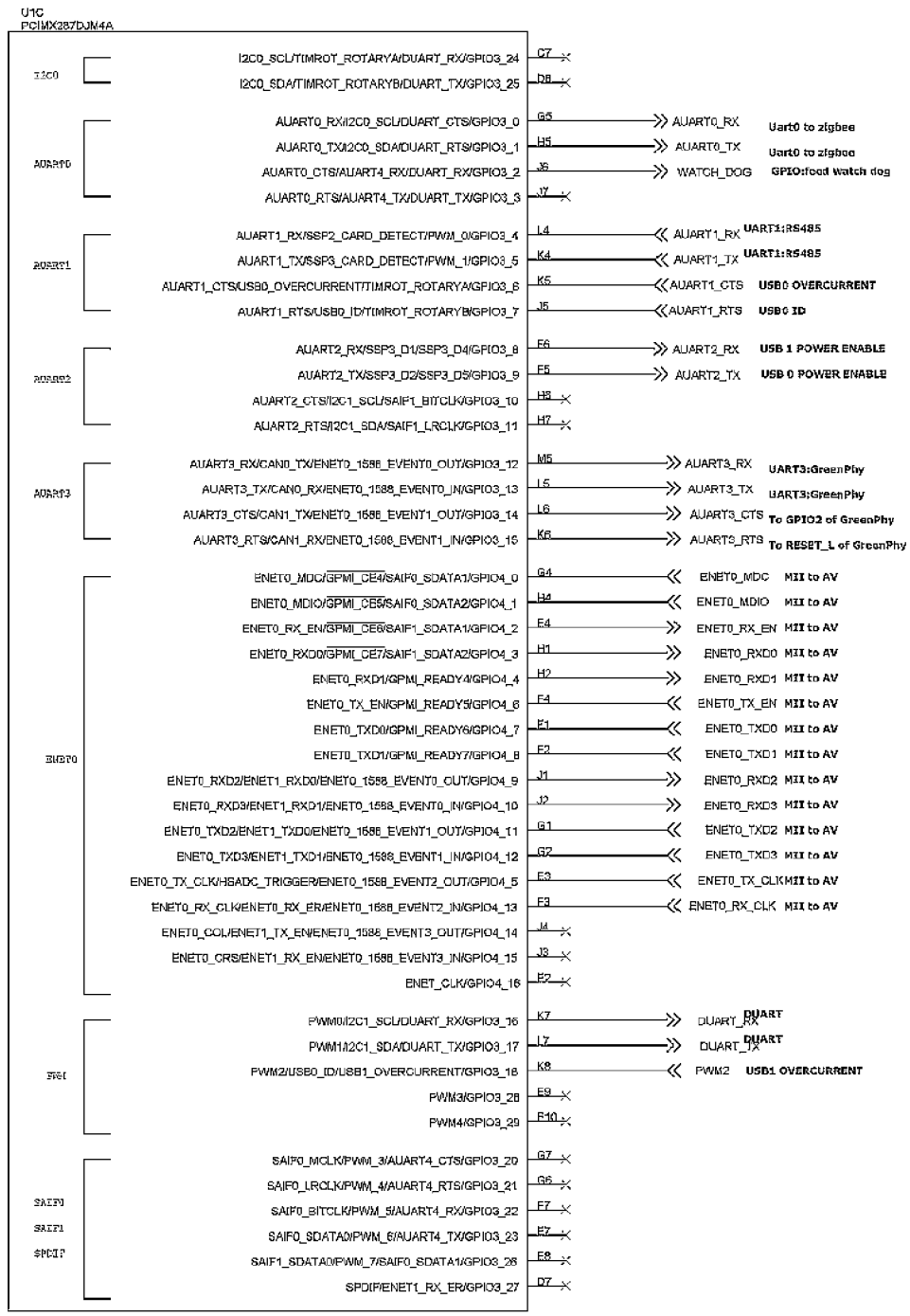

FIG. 19 shows an ENET, UART, PWM, & SAIF0 circuit device. This circuit device is merely an example, which should not unduly limit the scope of the claims herein. One of ordinary skill in the art would recognize many variations, alternatives and modifications. As shown, the example circuit device includes an Ethernet interface, an application Universal Asynchronous Receiver/Transmitter (UART) interface, a debug Universal Asynchronous Receiver/Transmitter (UART), a Password Wireless Modulation (PWM) interface and Serial Audio Interface (SAI).

Figure 20:
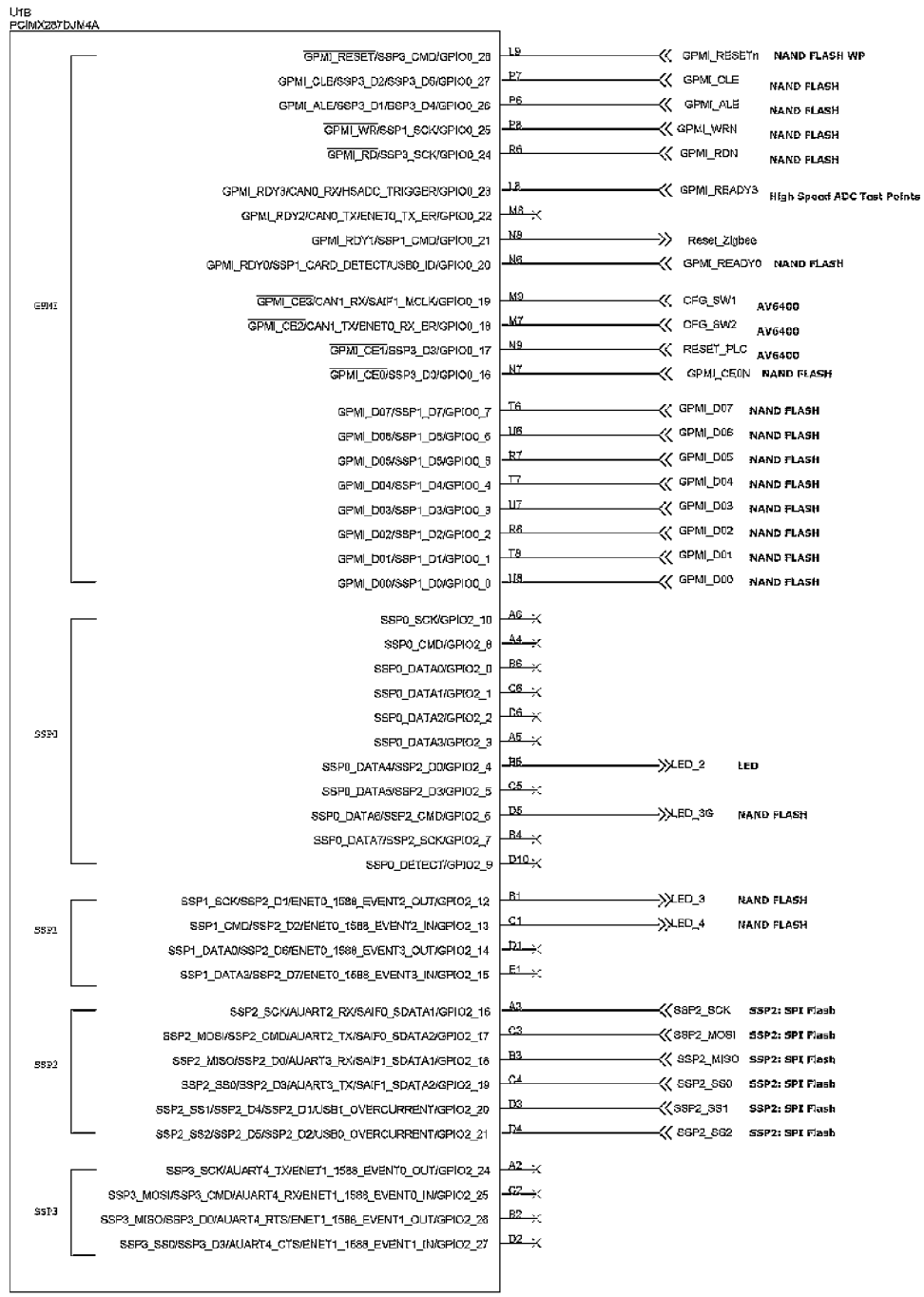

FIG. 20 shows a GPMI & SSP circuit device. This circuit device is merely an example, which should not unduly limit the scope of the claims herein. One of ordinary skill in the art would recognize many variations, alternatives and modifications. As shown, the example circuit device includes a general-purpose media interface (GPMI) to connect to a NAND flash, and a Synchronous Serial Port (SSP) to connect to a HomePlugPowerlineGreenPhy module.

Figure 21:
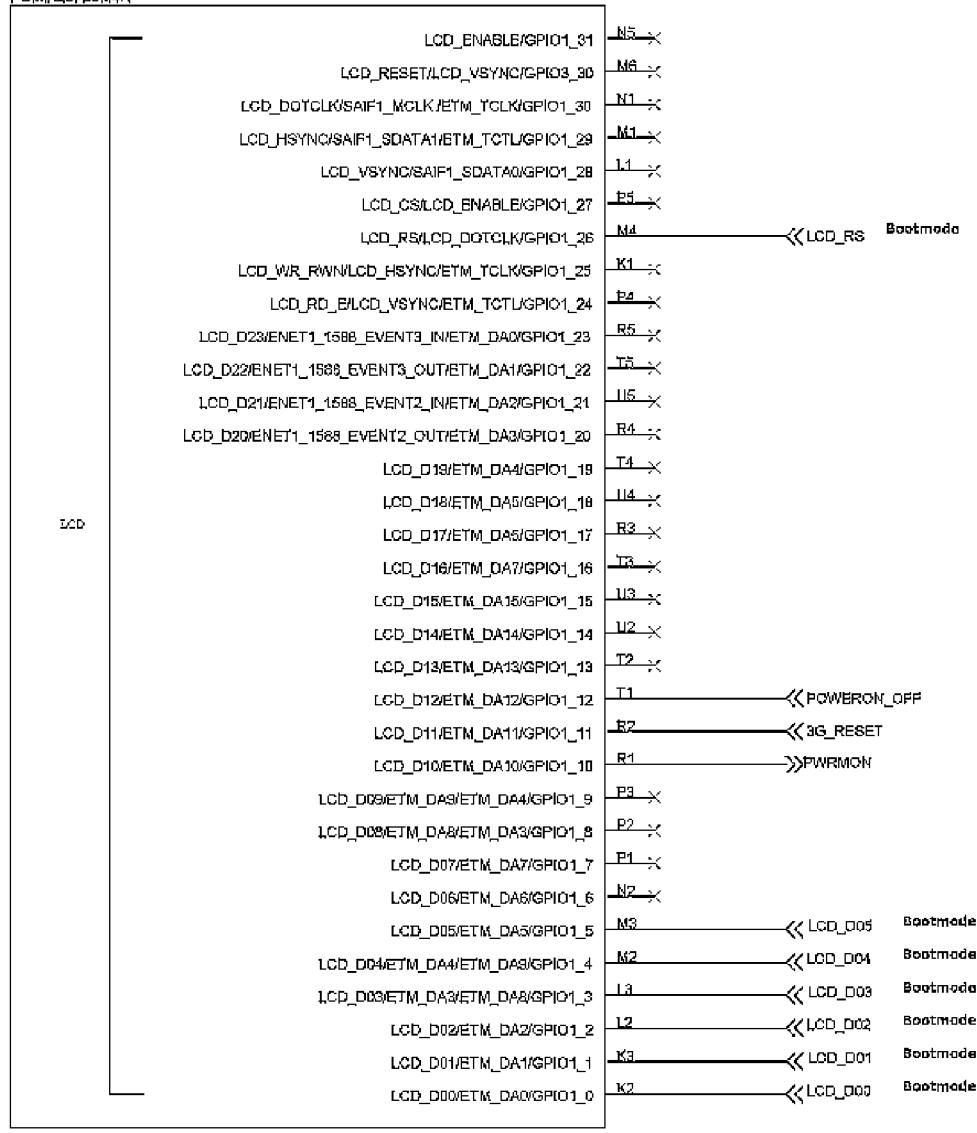

FIG. 21 shows an LCD & SAIF1 circuit device. This circuit device is merely an example, which should not unduly limit the scope of the claims herein. One of ordinary skill in the art would recognize many variations, alternatives and modifications. As shown, the example circuit device is a Liquid Crystal Display (LCD) interface and a Serial Audio Interface (SAI).

Figure 22:
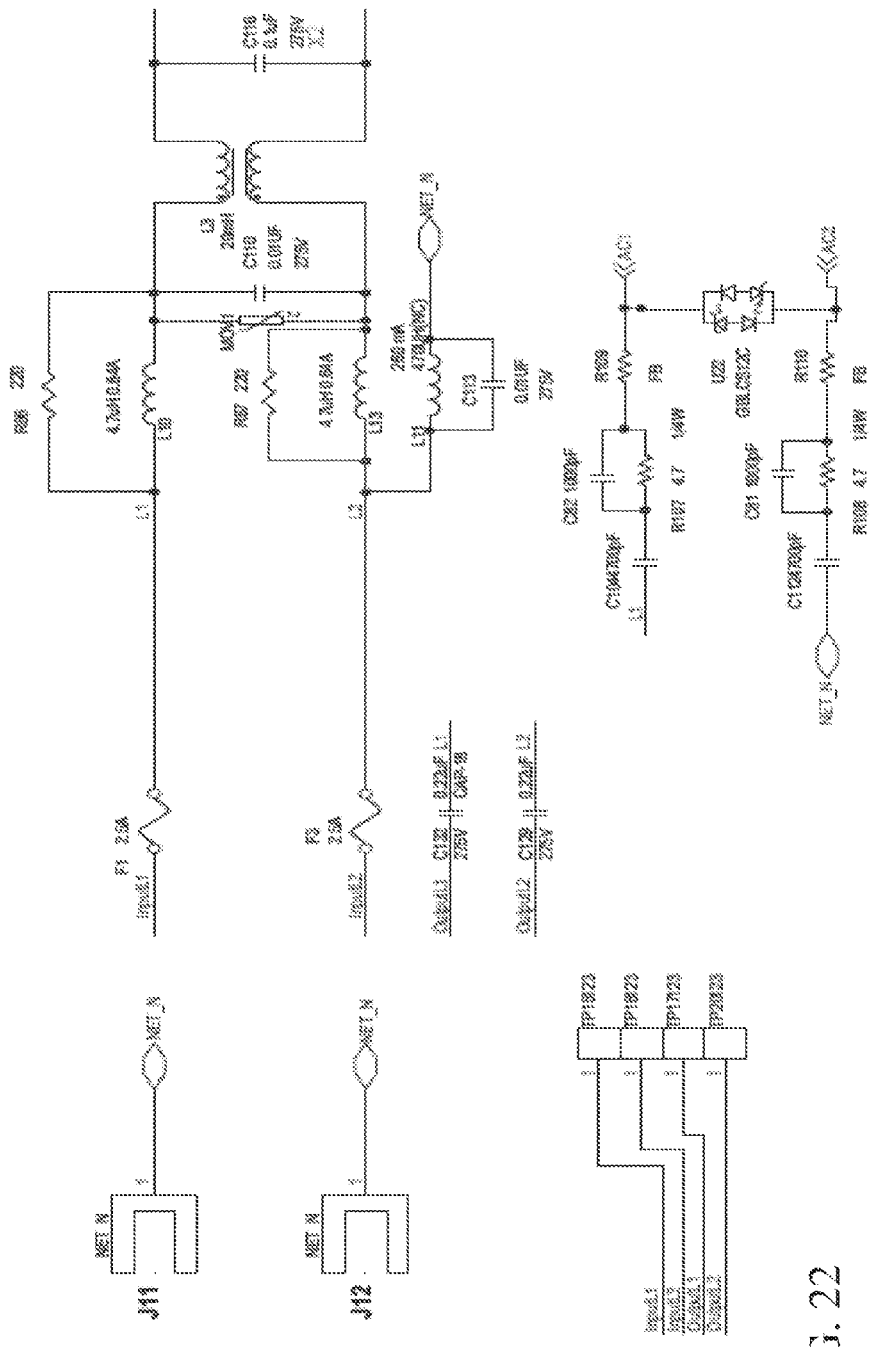
Figure 23:
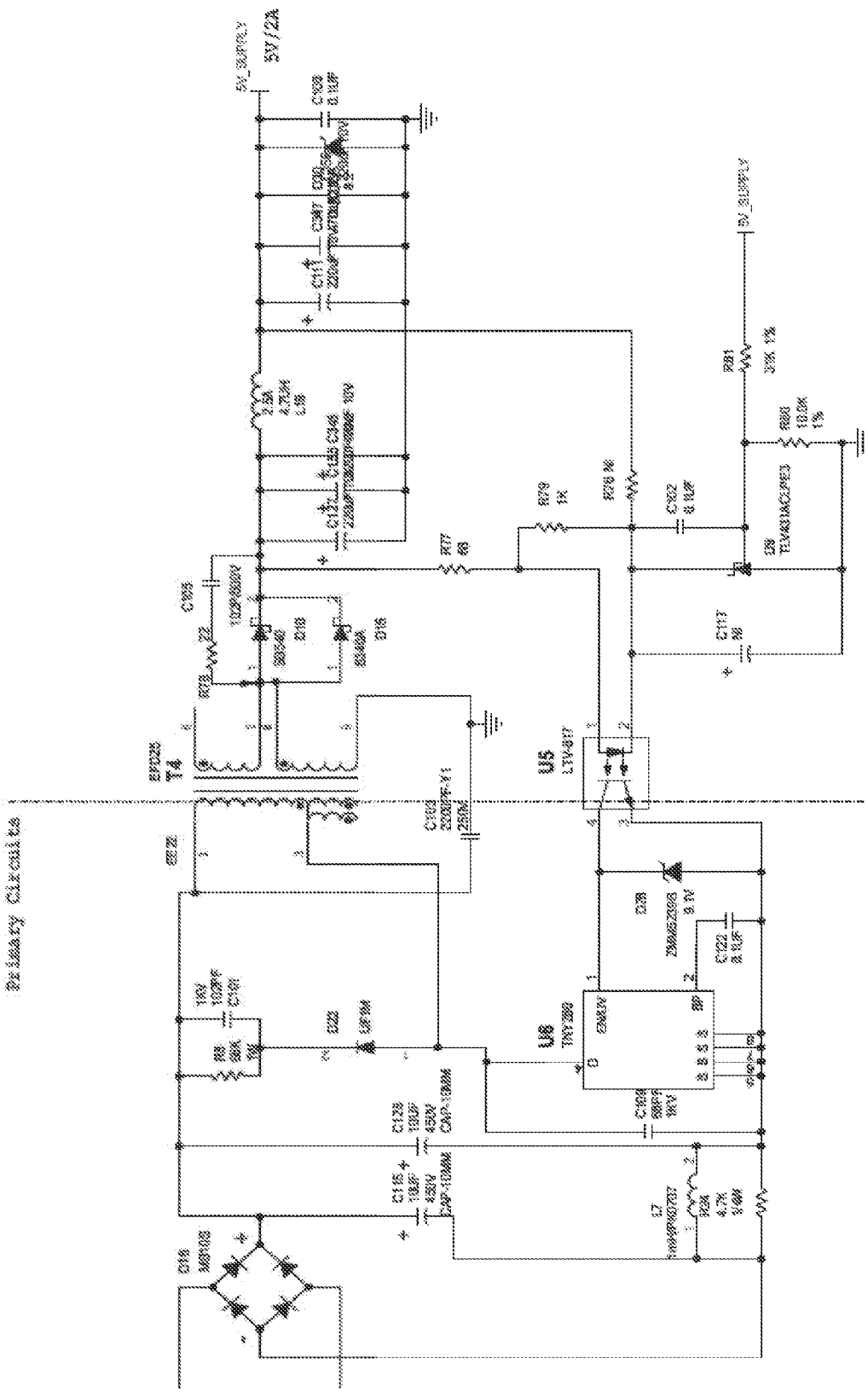

FIGS. 22 and 23 show a circuit configuration including primary and secondary circuits where node 22A of FIG. 22 connects to node 22A' of FIG. 23 and node 22B of FIG. 22 connects to node 22B' of FIG. 23. This circuit configuration is merely an example, which should not unduly limit the scope of the claims herein. One of ordinary skill in the art would recognize many variations, alternatives and modifications. As shown, the example circuit configuration includes a coupling circuit for HomePlugPowerline signal, and a AC to DC converter.

Figure 24:
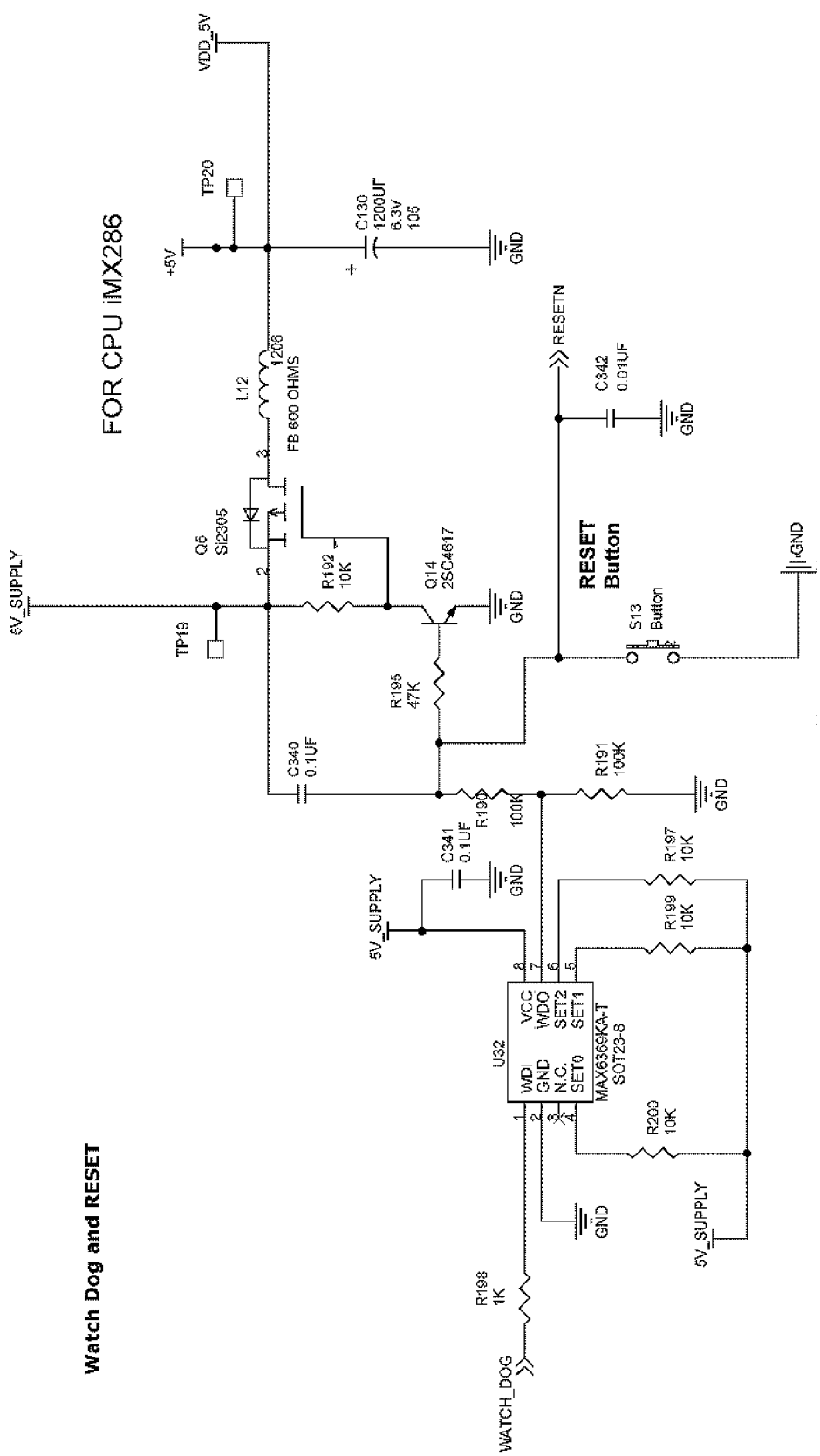

FIG. 24 shows a Watch Dog and RESET circuit. This circuit is merely an example, which should not unduly limit the scope of the claims herein. One of ordinary skill in the art would recognize many variations, alternatives and modifications. As shown, the example circuit includes a watch dog circuit, a reset circuit, and a 5V power input to the central processor unit (CPU).

Figure 25:
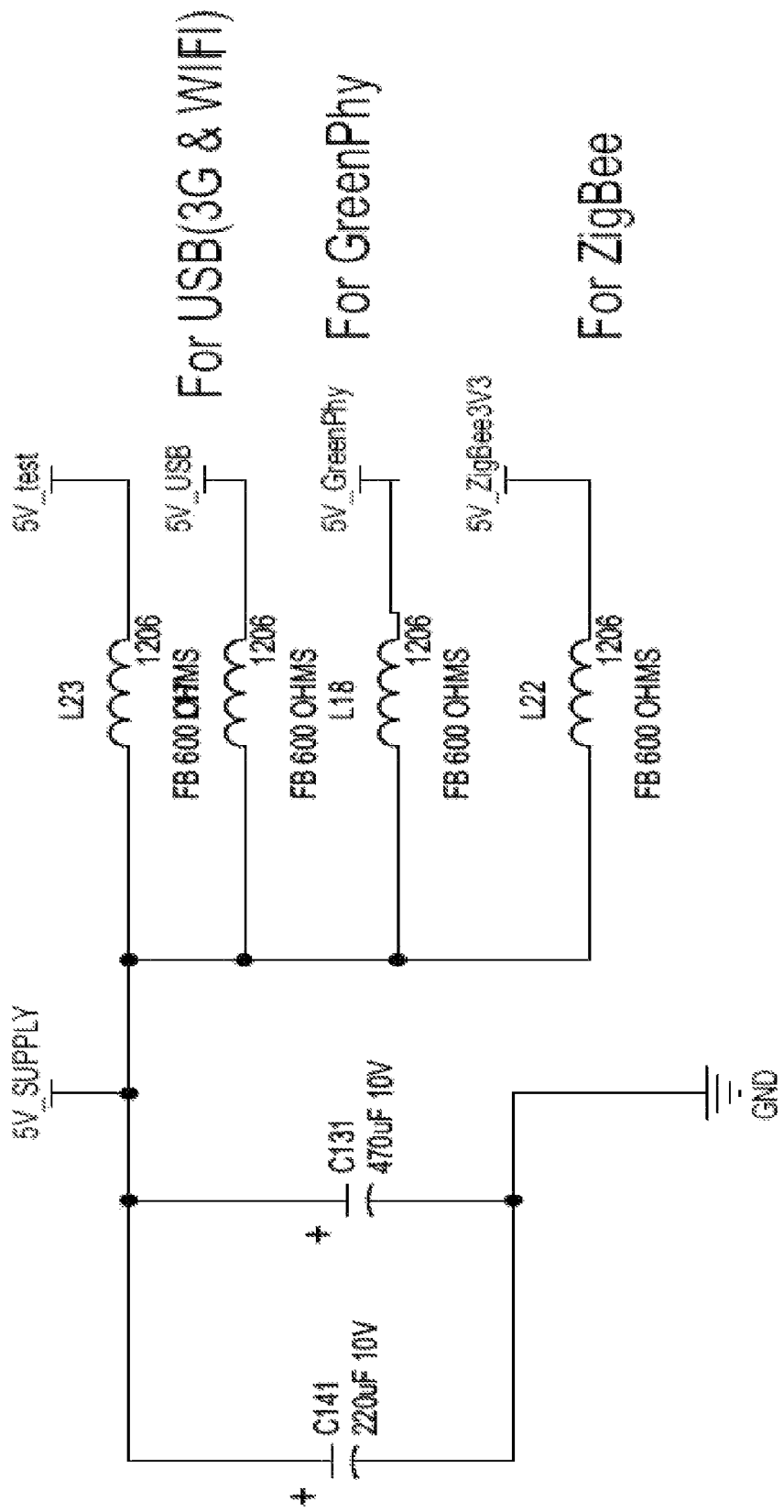

FIG. 25 shows a power regulator circuit including a capacitor and inductors forming voltage supplies for various other components of the present invention. This circuit is merely an example, which should not unduly limit the scope of the claims herein. One of ordinary skill in the art would recognize many variations, alternatives and modifications. As shown, the example circuit includes a 5V power input to the various communications modules including a HomePlugPowerline module, a ZigBee module, a Universal Serial Bus (USB) to WiFi module, and a Universal Serial Bus (USB) to cellular (2G/3G/4G LTE) module.

Figure 26:
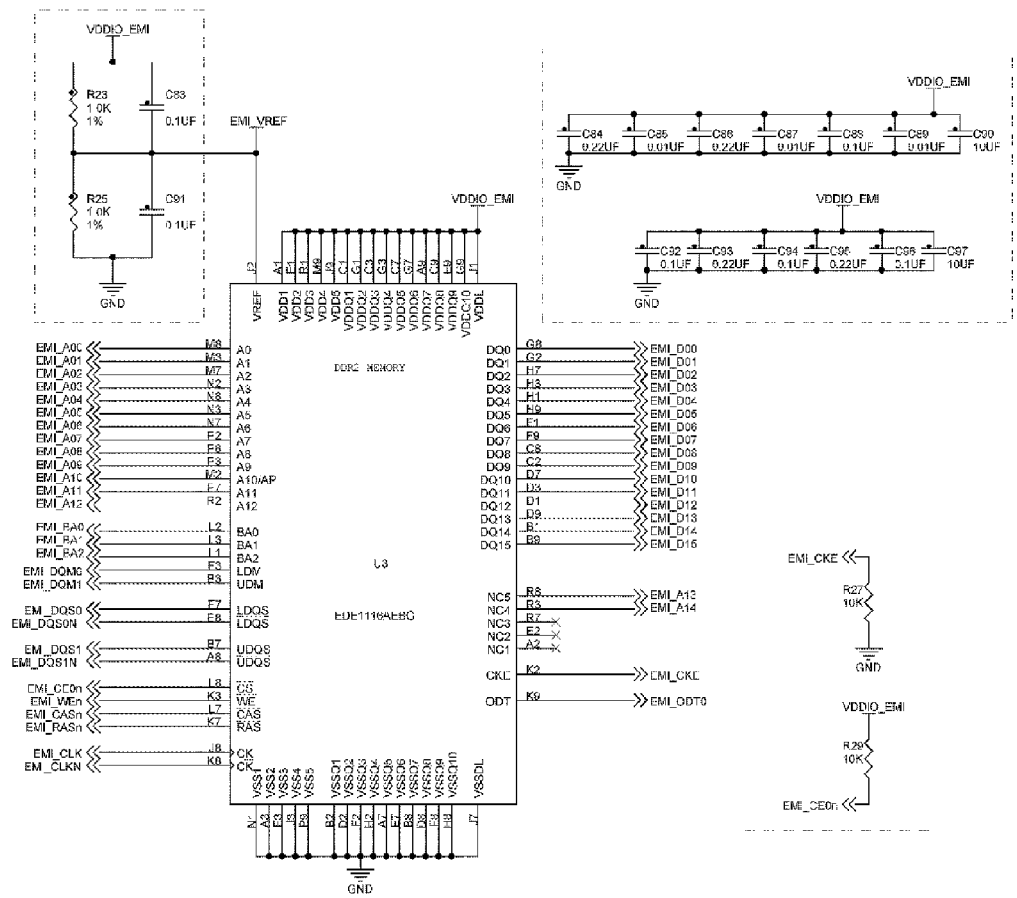

FIG. 26 shows a DDR2 memory device along with related circuit components. This device is merely an example, which should not unduly limit the scope of the claims herein. One of ordinary skill in the art would recognize many variations, alternatives and modifications. As shown, the example device includes capacitors for decoupling the power supply to double data rate synchronous dynamic random-access memory (DDR2).

Figure 27:
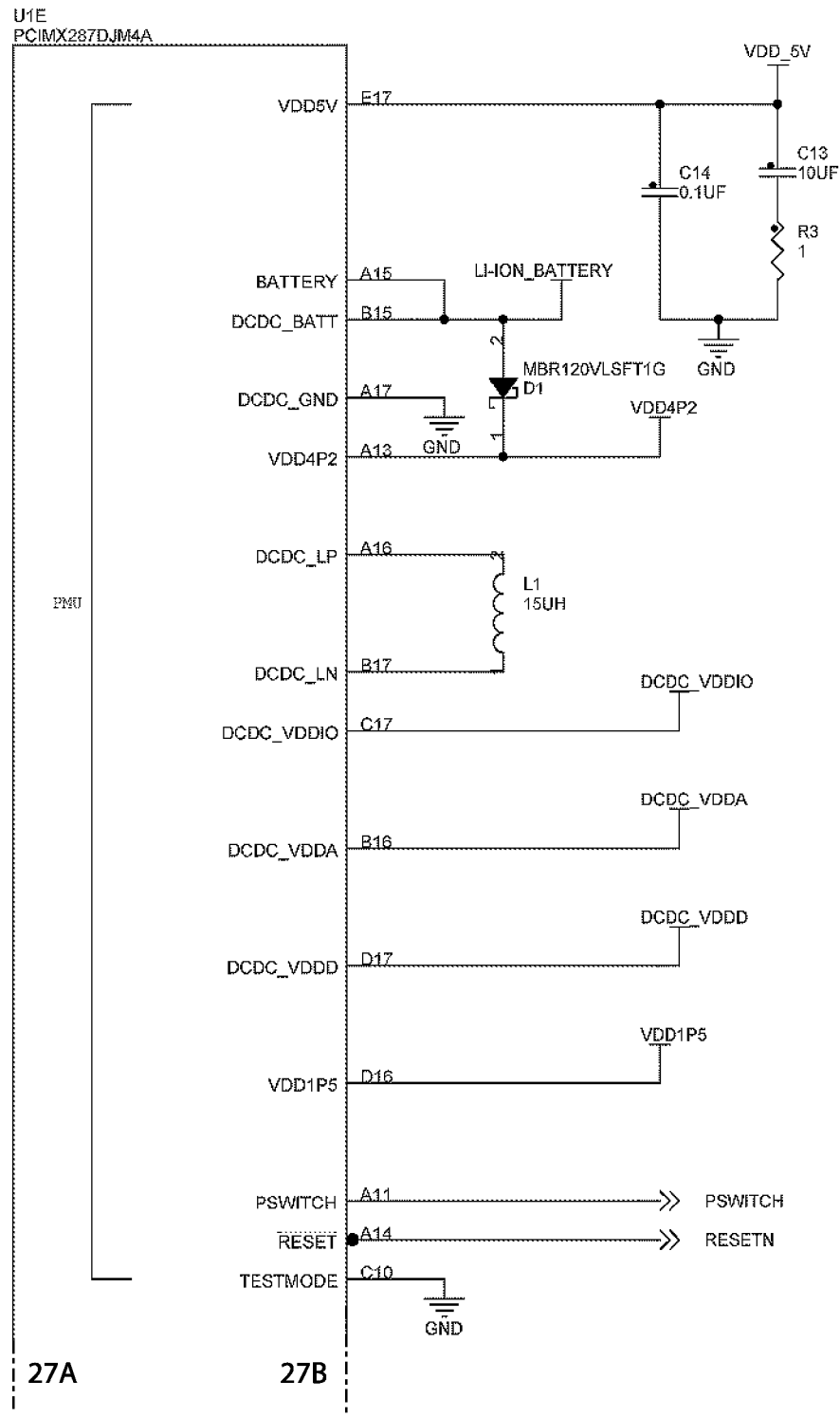
Figure 28:
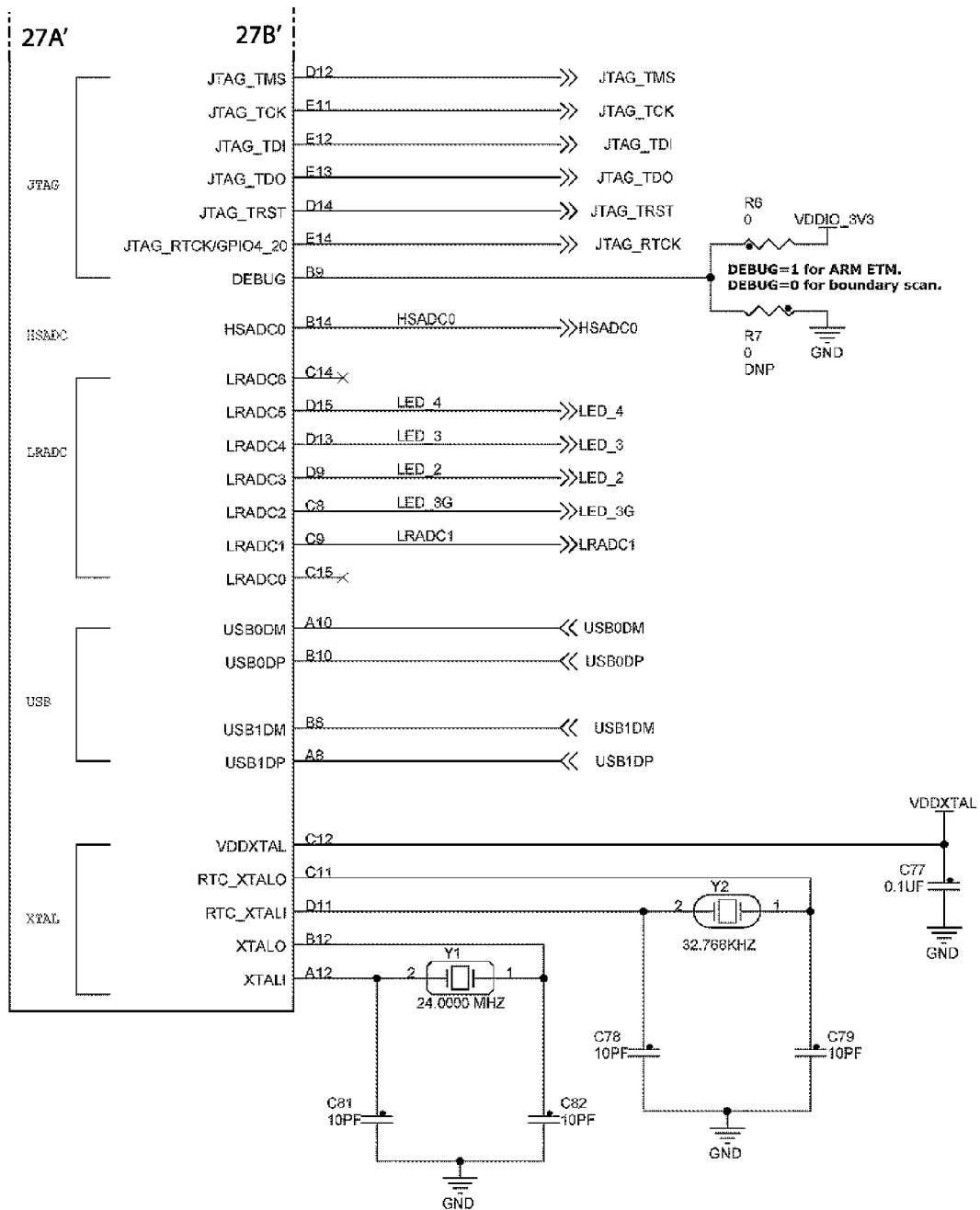

FIGS. 27 and 28 show one of the DC-DC Power Management and Analog circuitswhere node 27A of FIG. 27 connects to node 27A' of FIG. 28 and node 27B of FIG. 27 connects to node 27B' of FIG. 28. This circuit is merely an example, which should not unduly limit the scope of the claims herein. One of ordinary skill in the art would recognize many variations, alternatives and modifications. As shown, the example circuit includes 3.3V power output from and to the central processor unit (CPU).

Figure 29:
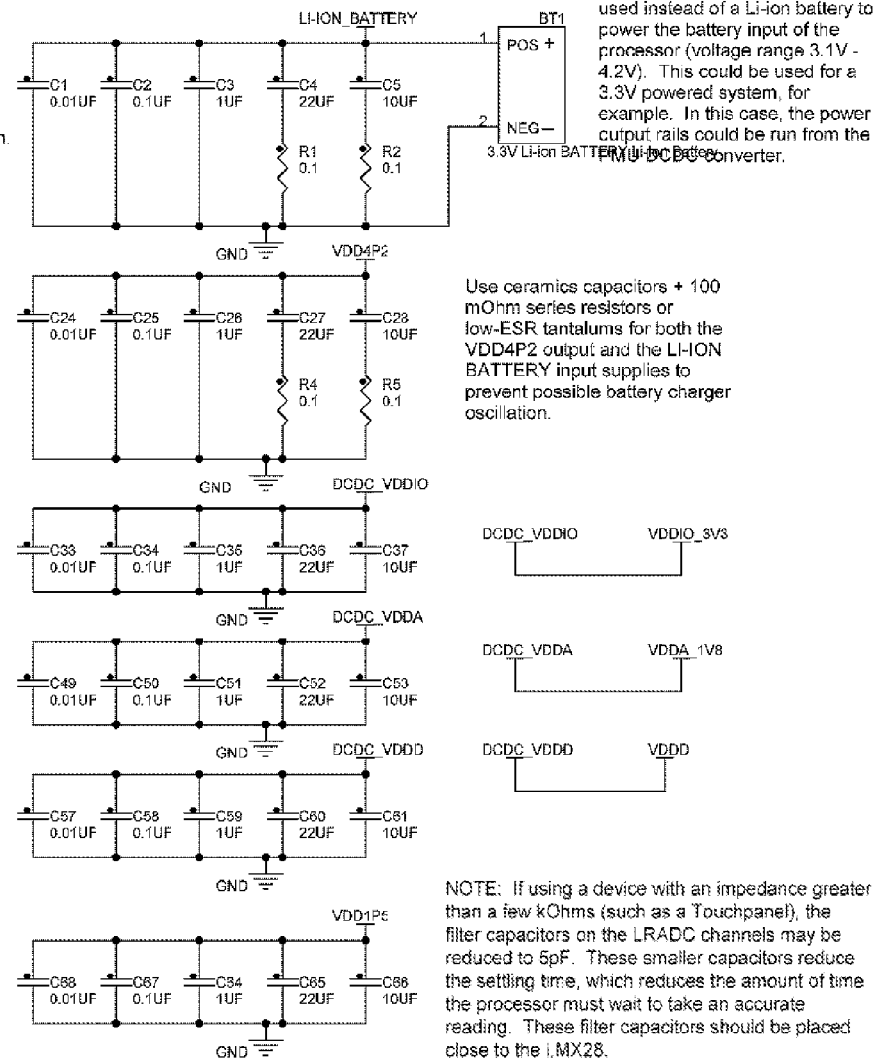
Figure 30:
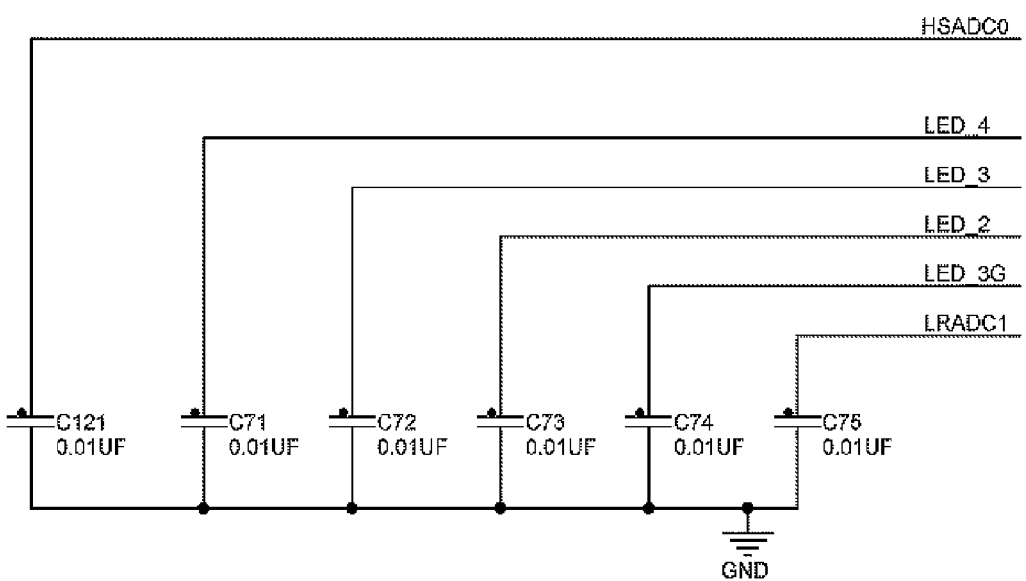

FIGS. 29 and 30 show additional DC-DC Power Management and Analog circuits. This circuit is merely an example, which should not unduly limit the scope of the claims herein. One of ordinary skill in the art would recognize many variations, alternatives and modifications. As shown, the example circuit includes capacitors for power voltage decoupling and a filter capacitor for low resolution analog to digital converter.

Figure 31:
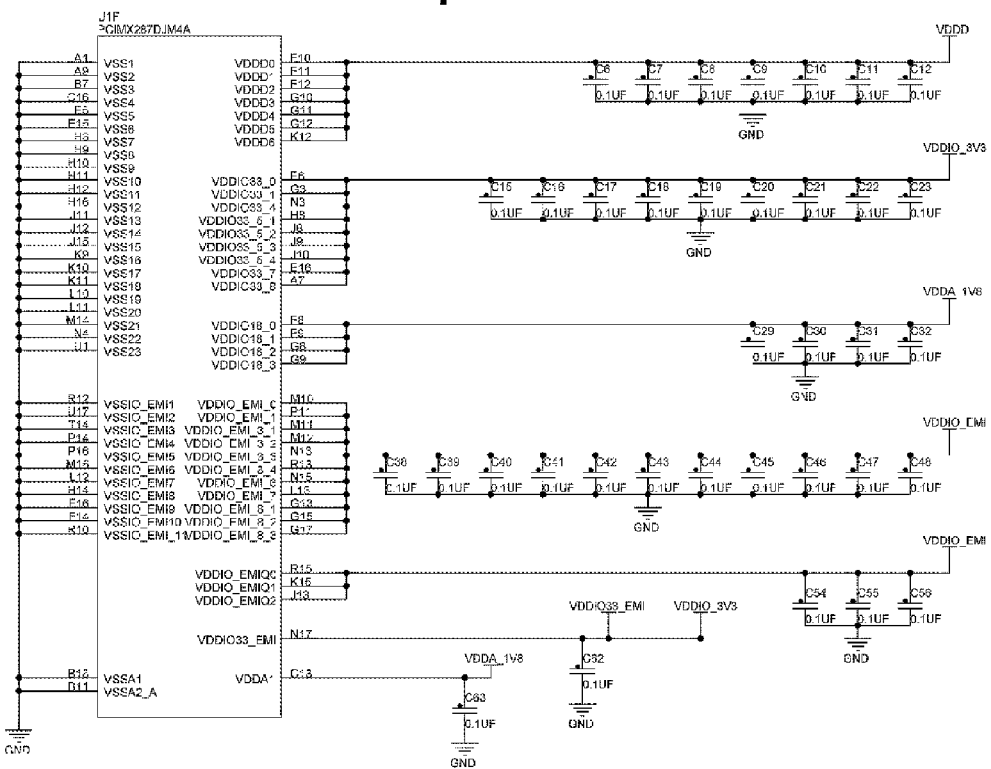

FIG. 31 shows a CPU Power Input circuit. This circuit is merely an example, which should not unduly limit the scope of the claims herein. One of ordinary skill in the art would recognize many variations, alternatives and modifications. As shown, the example circuit includes a 1.2V, 1.8V, 3.3V power input to central processor unit (CPU).

Figure 32:
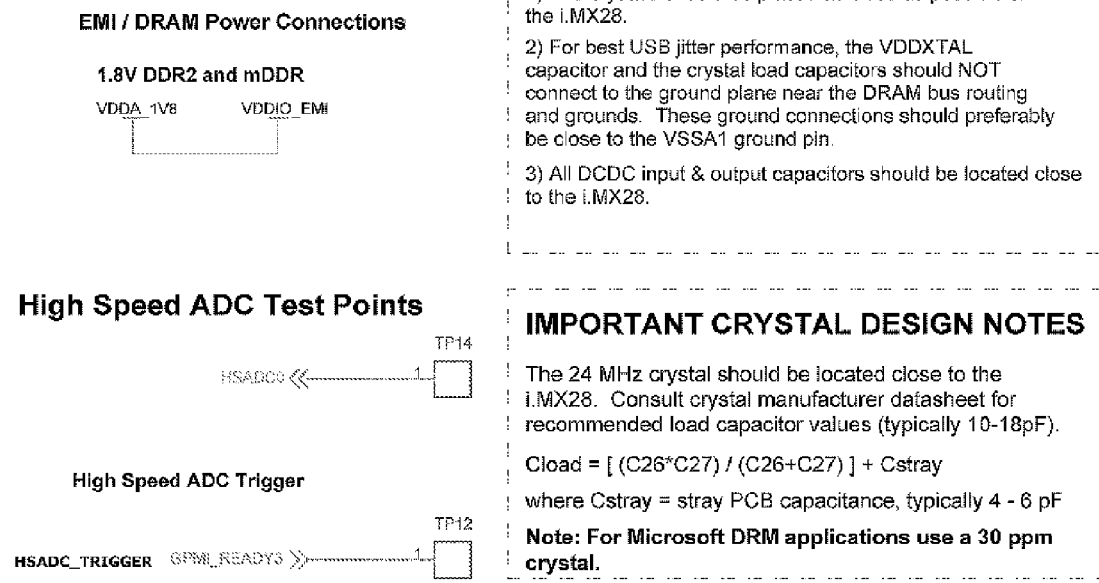

FIG. 32 shows EMI/DRAM Power Connections and High Speed ADC Test Points.

FIG. 33 shows a NAND FLASH circuit. This circuit is merely an example, which should not unduly limit the scope of the claims herein. One of ordinary skill in the art would recognize many variations, alternatives and modifications. As shown, the example circuit includes resisters (R31, R32 and R38), and capacitors for power coupling for the NAND FLASH.

Figure 34:
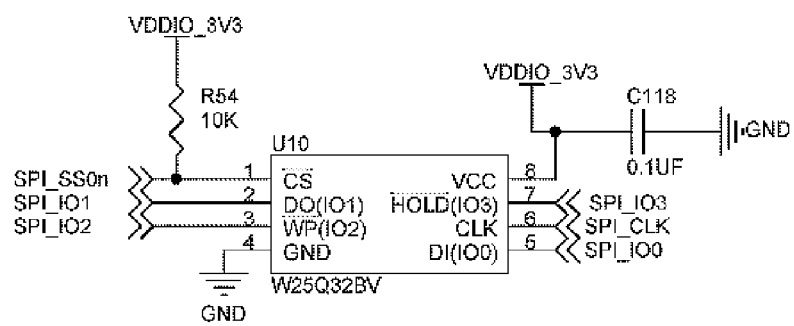

FIG. 34 shows an SPI FLASH circuit along with SPI Flash Pin Assignment Options.

Figure 35:
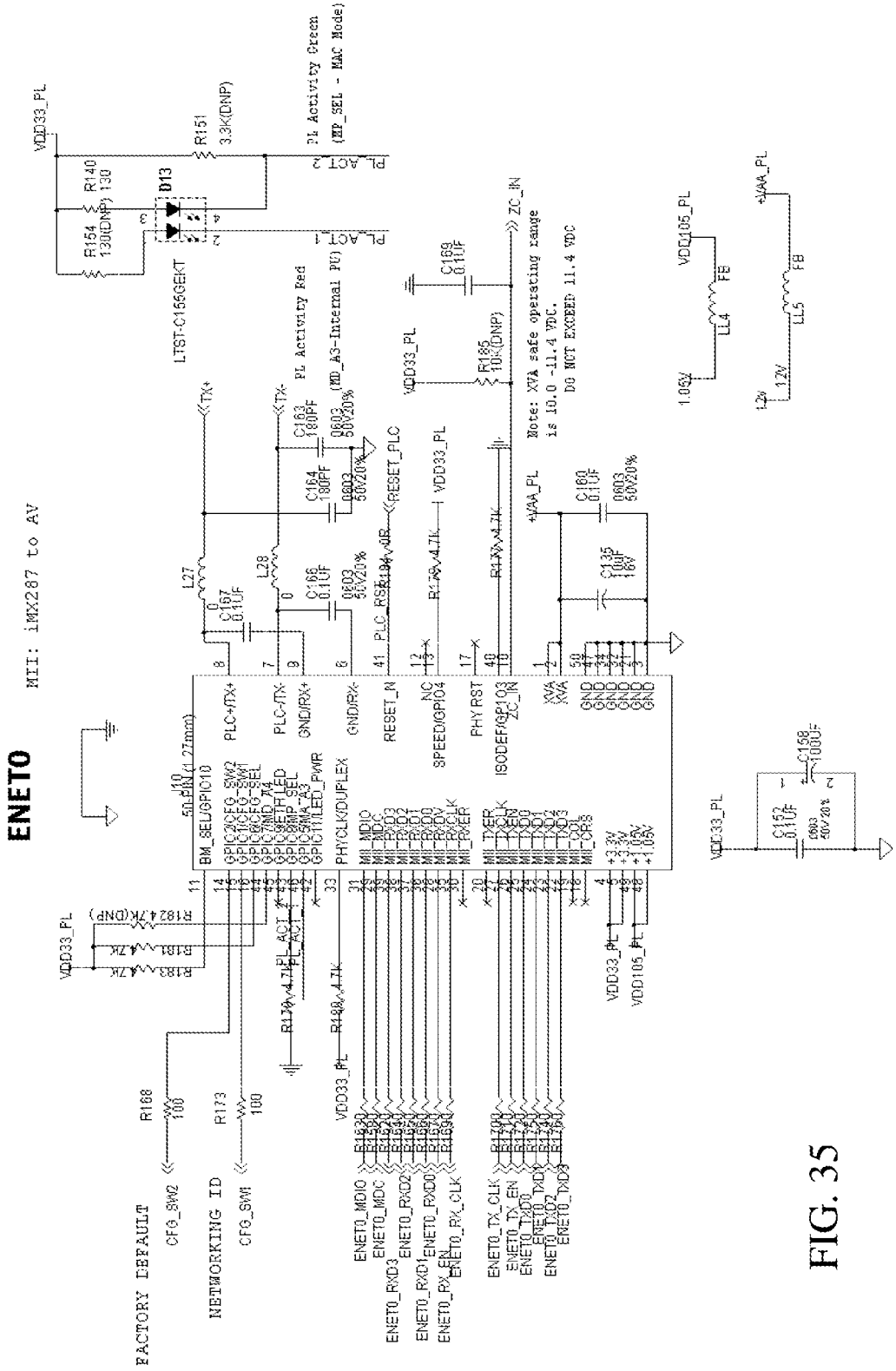

FIG. 35 shows an Ethernet circuit.

Figure 36:
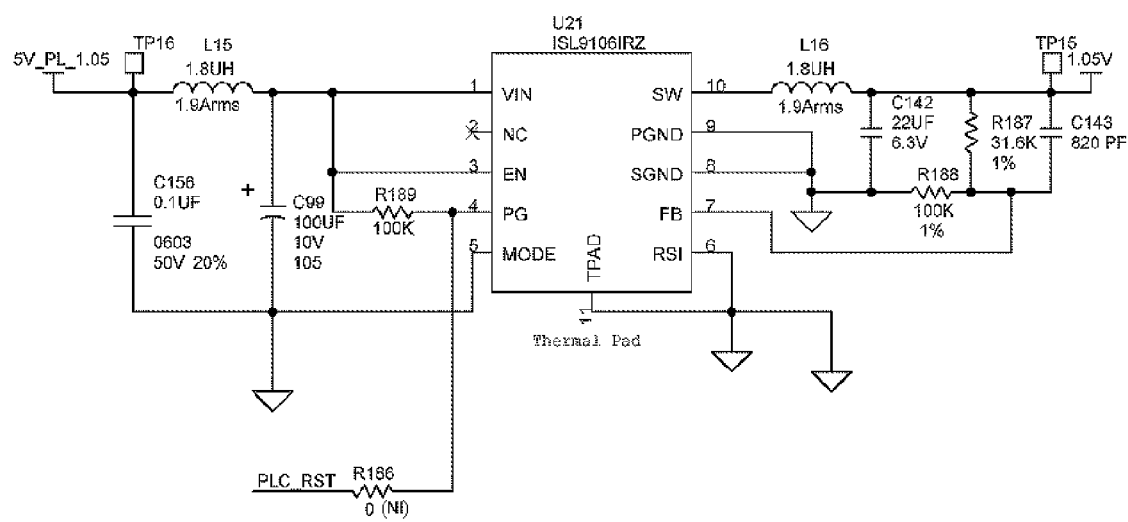
Figure 37:
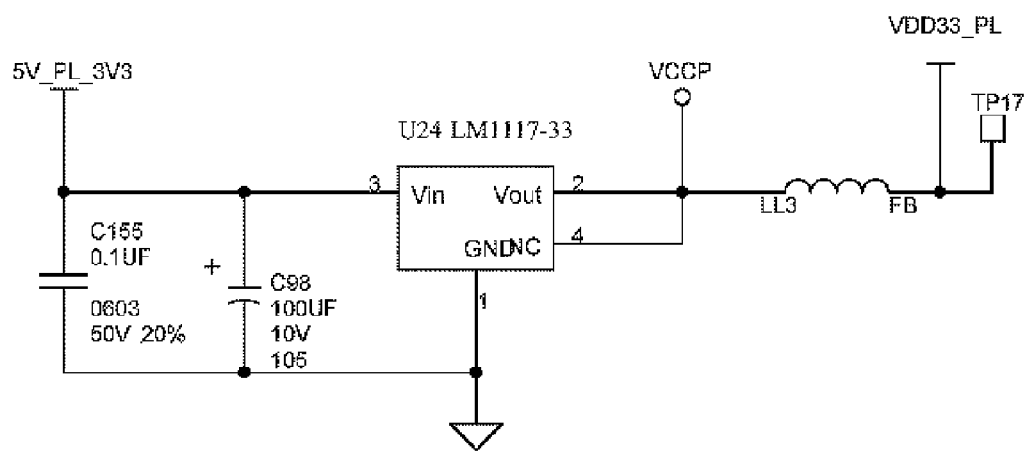

FIGS. 36 and 37 show power circuits related to the Ethernet circuit

Figure 38:
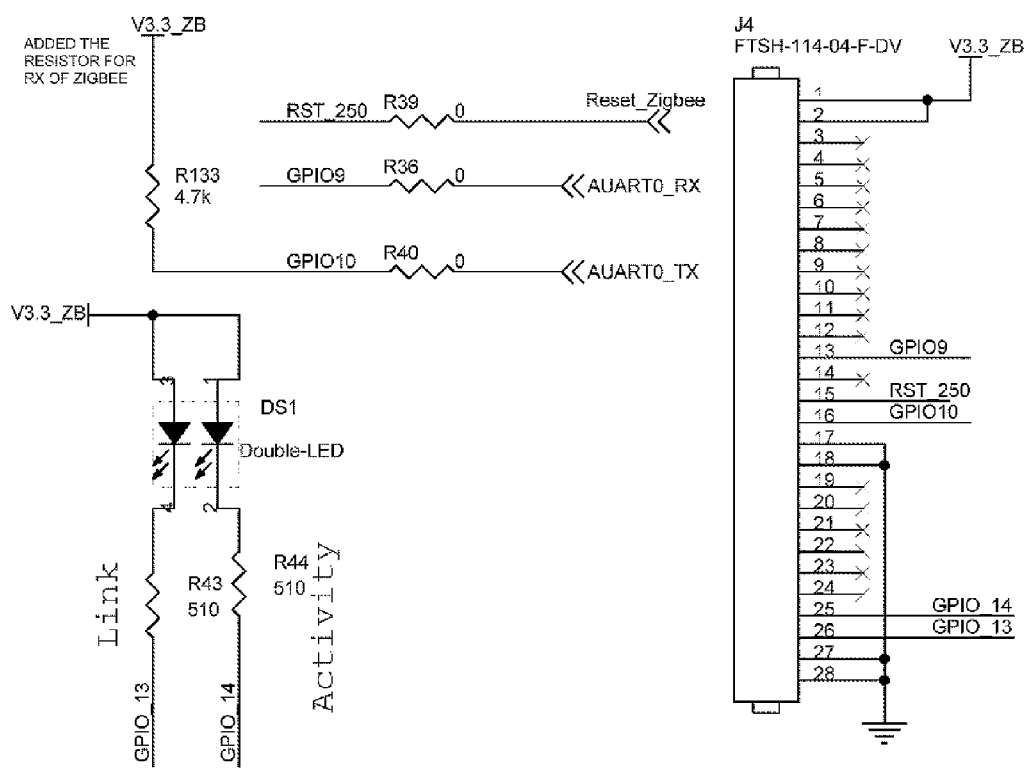

FIG. 38 shows a ZigBee(UART0) circuit along with AUART0.

Figure 39:
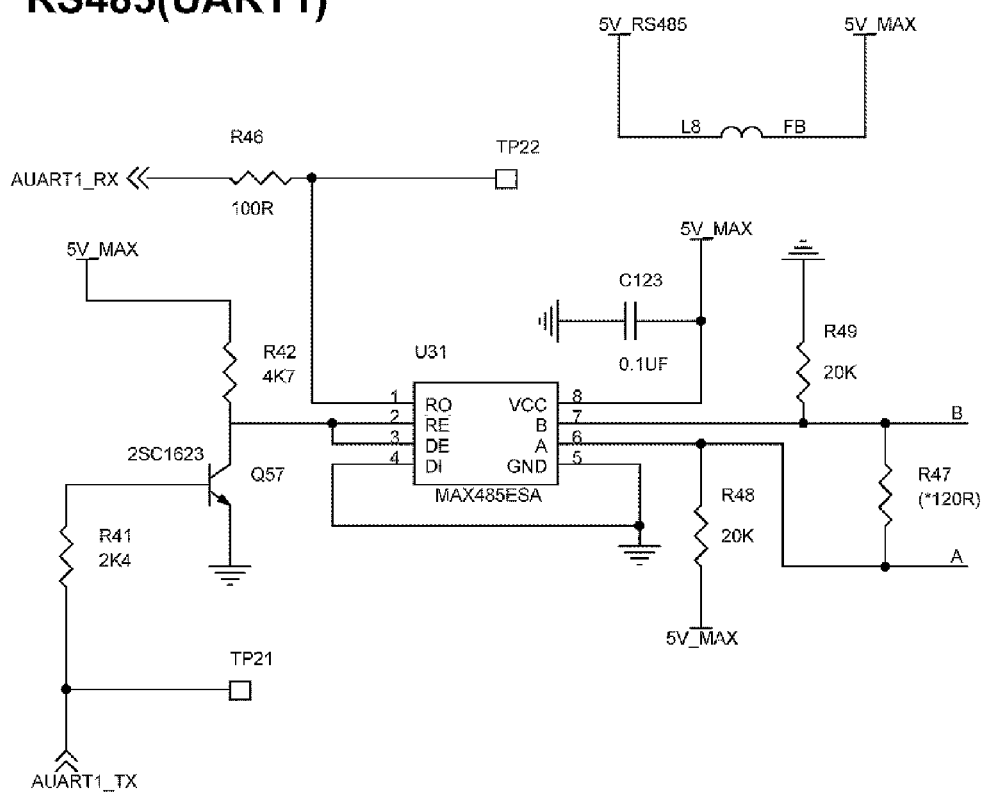

FIG. 39 shows an RS485(UART1) circuit.

Figure 40:
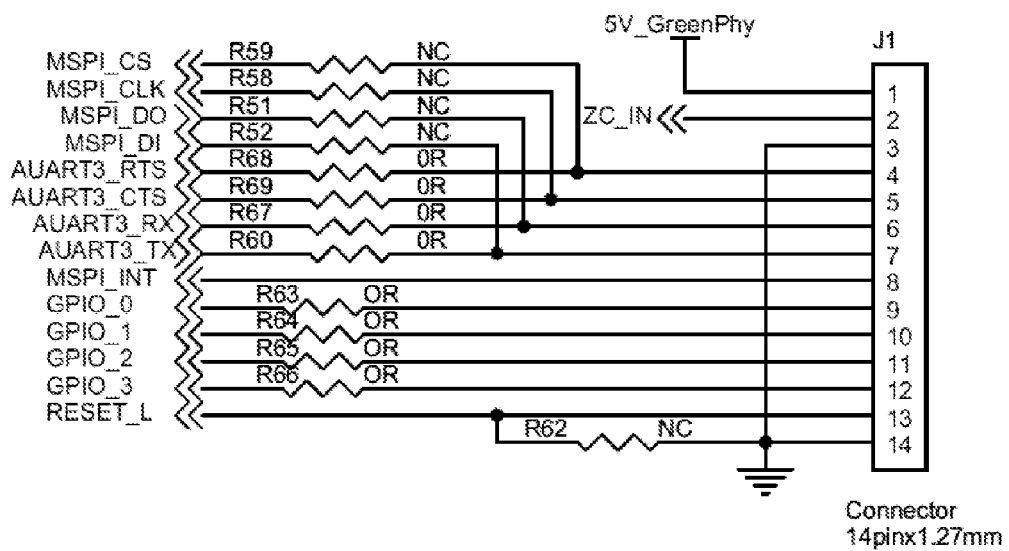

FIG. 40 shows a GreenPhyinterface(UART2) circuit. This circuit is merely an example, which should not unduly limit the scope of the claims herein. One of ordinary skill in the art would recognize many variations, alternatives and modifications. As shown, the example circuit includes a Serial Peripheral Interface Bus (SPI) interface and a Universal Asynchronous Receiver/Transmitter (UART) interface through resistors.

FIG. 41 shows a DEBUG UART TTL circuit and a 3.3V POWER circuit for ZigBee. This circuit is merely an example, which should not unduly limit the scope of the claims herein. One of ordinary skill in the art would recognize many variations, alternatives and modifications. As shown, the example circuit includes a connector to debug Universal Asynchronous Receiver/Transmitter (UART) interface of central processor unit (CPU), and a 3.3V power input to ZigBee module.

Figure 42:
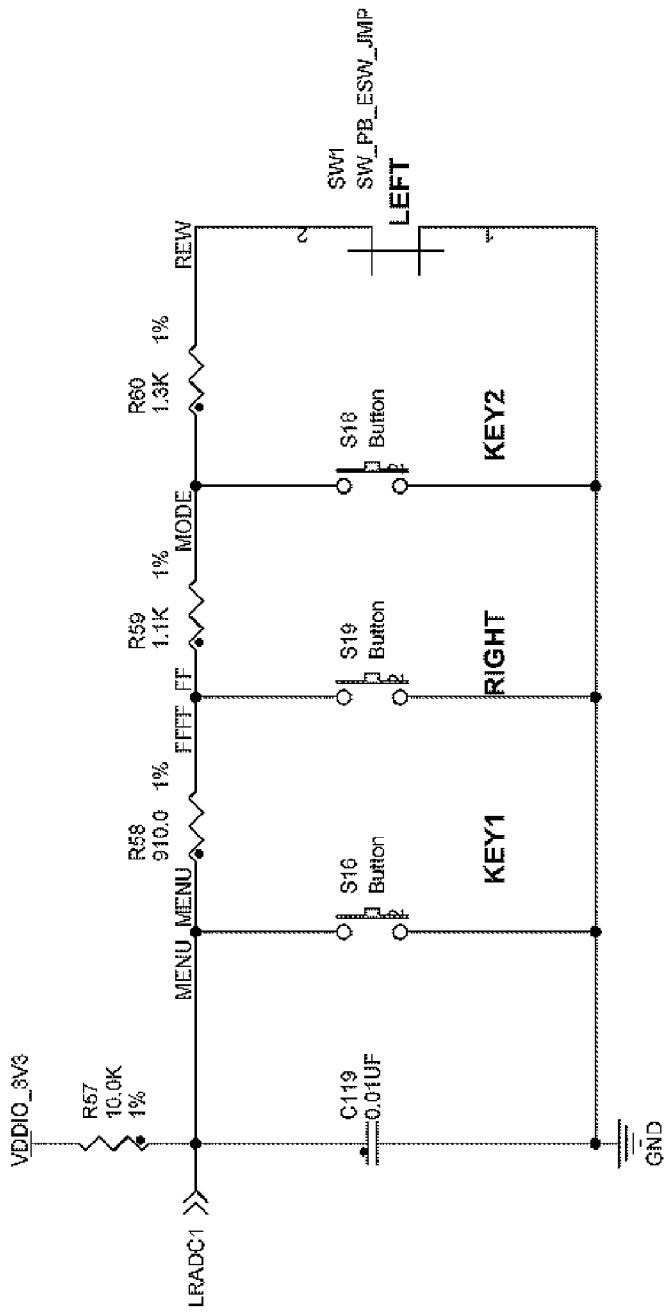
Figure 43:
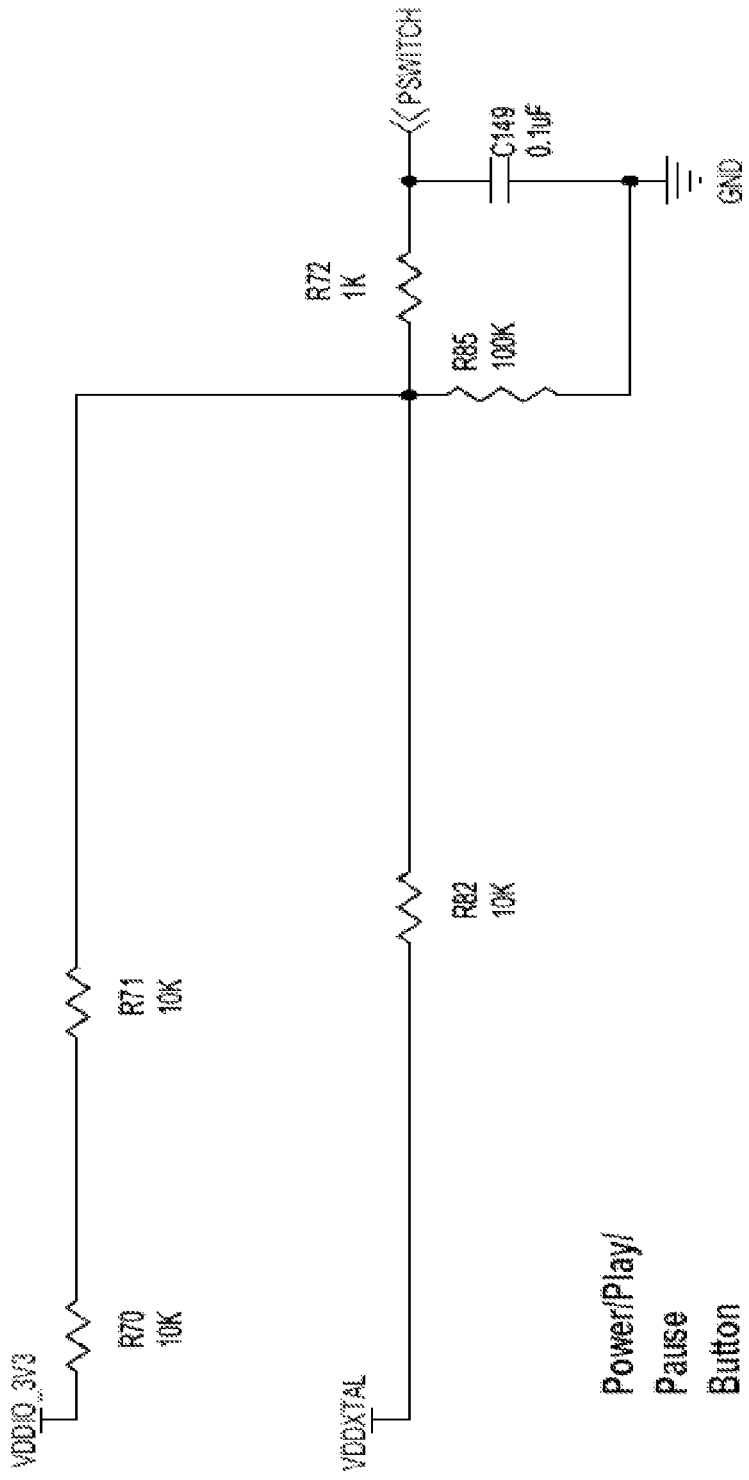

FIG. 42 shows a User Buttons circuit. FIG. 43 shows a POWER/PLAY/PAUSE & MENU/USB Recovery Buttons.

Figure 44:
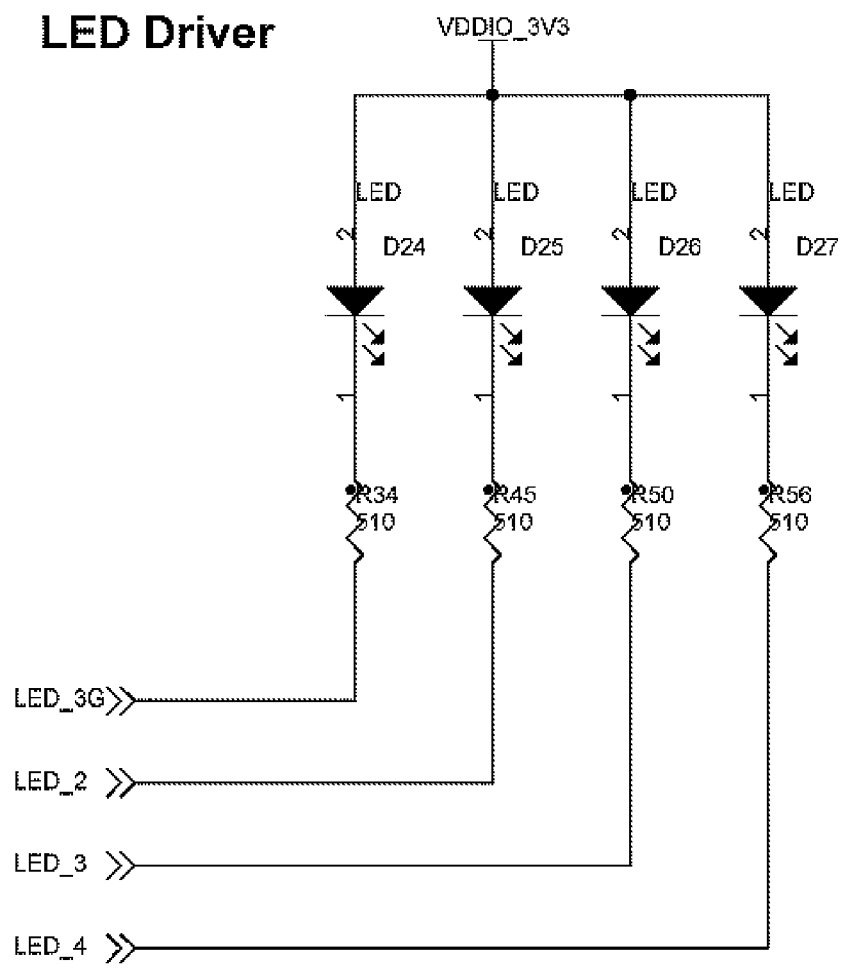

FIG. 44 shows an LED Driver circuit. This circuit is merely an example, which should not unduly limit the scope of the claims herein. One of ordinary skill in the art would recognize many variations, alternatives and modifications. As shown, the example circuit includes Light Emitting Diodes (LED) drivers for cellular (2G/3G/4G LTE) module.

Figure 45:
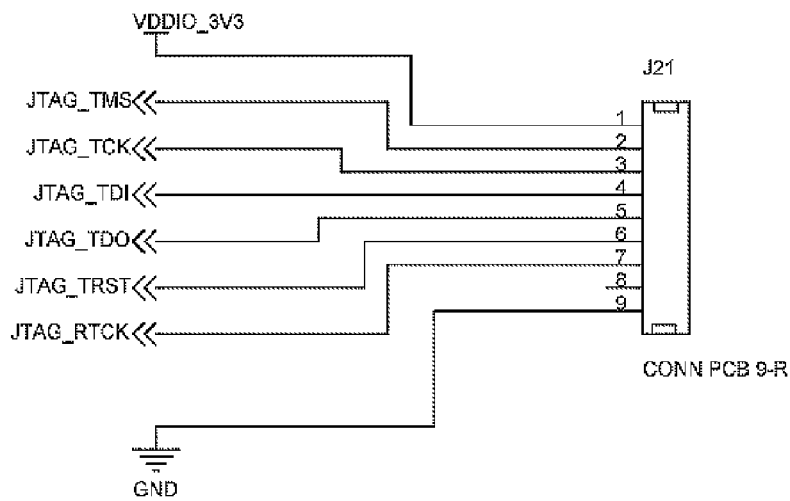

FIG. 45 shows a JTAG circuit, which can be a test point circuit used to support debugging on an i.MX28-based device. This circuit is merely an example, which should not unduly limit the scope of the claims herein. One of ordinary skill in the art would recognize many variations, alternatives and modifications. As shown, the example circuit includes a Joint Test Action Group (JTAG) connector to central processor unit (CPU).

FIGS. 46 to 51 show USB 2.0 Connector circuits.

Figure 47:
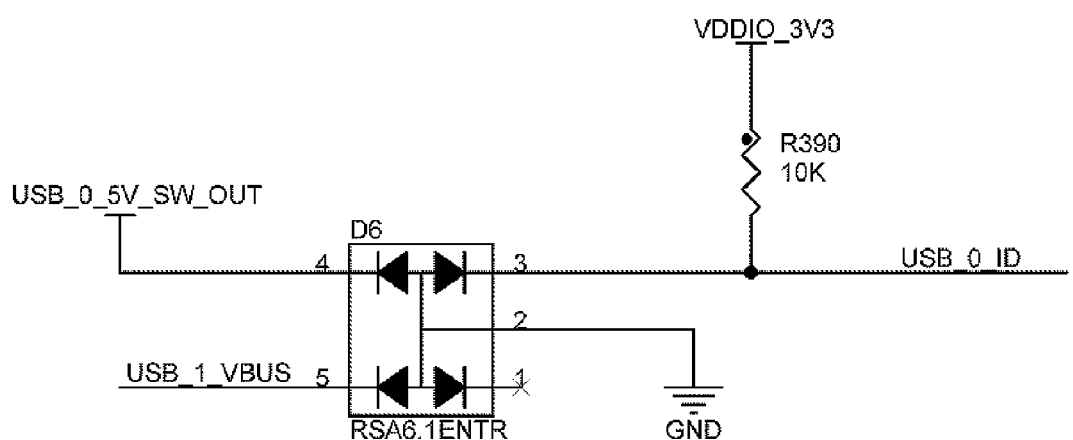

FIGS. 46 and 47 show USB0 circuits for OTG HOST to WIFI. This circuit is merely an example, which should not unduly limit the scope of the claims herein. One of ordinary skill in the art would recognize many variations, alternatives and modifications. As shown, the example circuit includes a connector to download firmware to NAND flash, and a Electrical Static Discharge (ESD) protection for Universal Serial Bus (USB).

Figure 48:
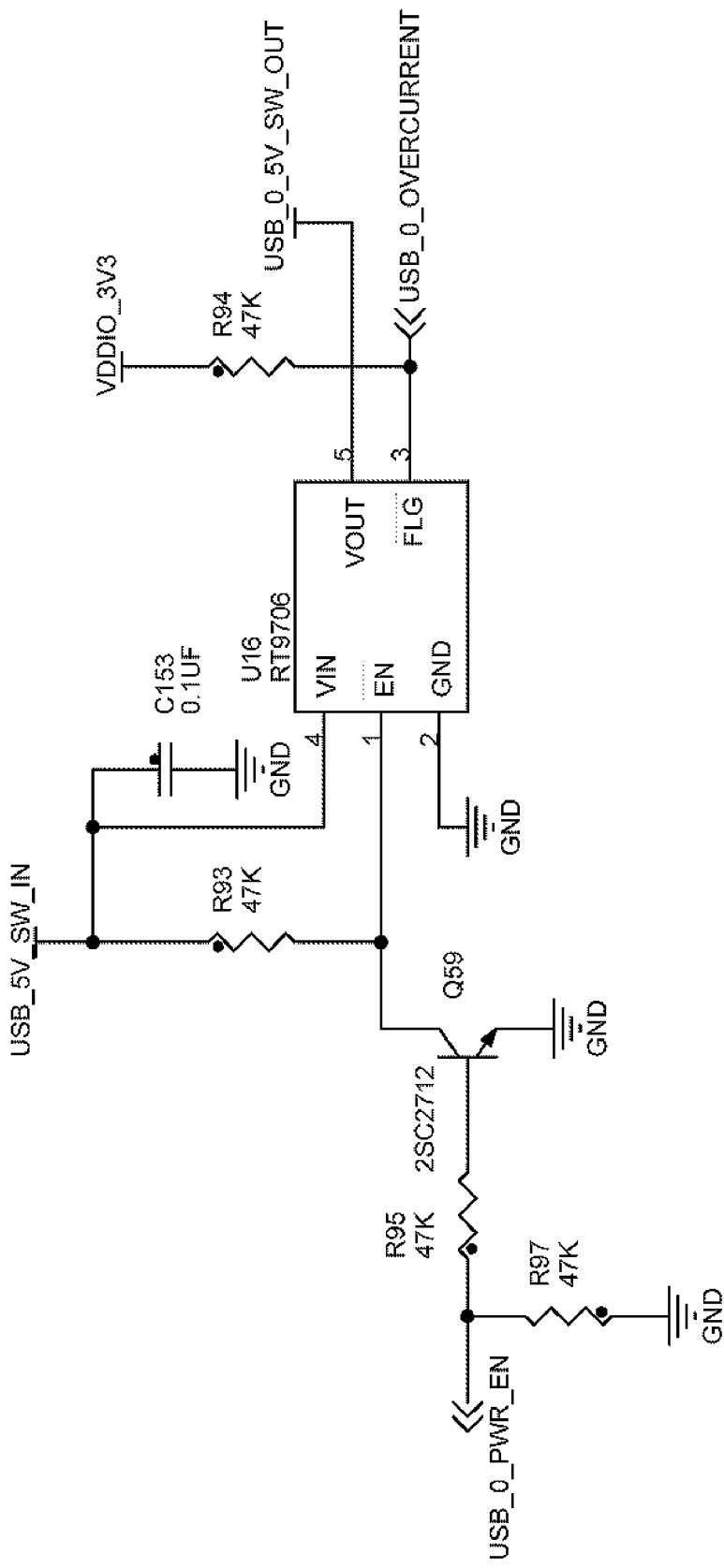

FIG. 48 shows a USB0 5V-500 ma Power and Overcurrent Detect Switch circuit. This circuit is merely an example, which should not unduly limit the scope of the claims herein. One of ordinary skill in the art would recognize many variations, alternatives and modifications. As shown, the example circuit includes a 500 mA power supply to the Universal Serial Bus (USB) connector.

Figure 49:
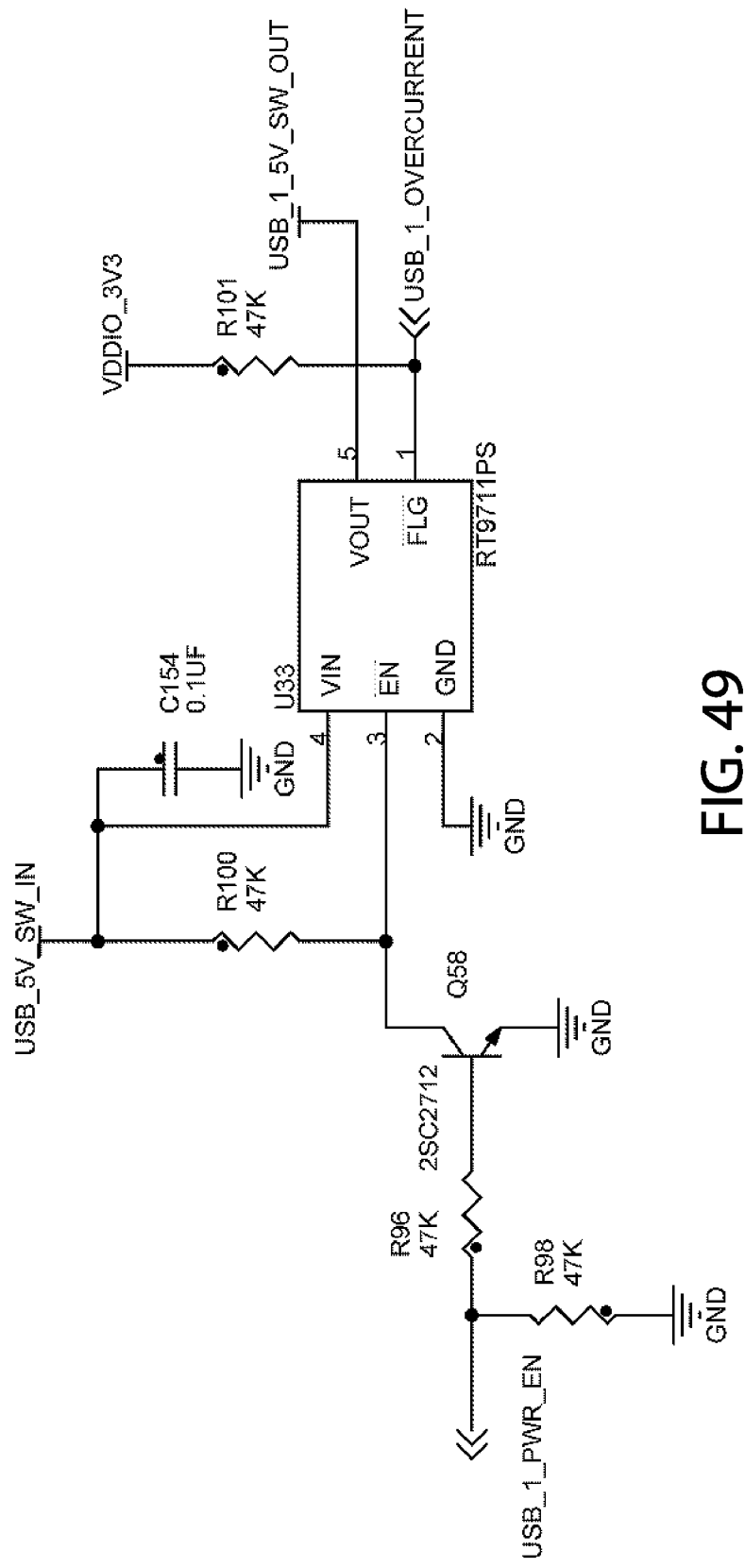

FIG. 49 shows a USB1 5V-1.5 A Power and Overcurrent Detect Switch circuit. This circuit is merely an example, which should not unduly limit the scope of the claims herein. One of ordinary skill in the art would recognize many variations, alternatives and modifications. As shown, the example circuit includes a 1.5 A power supply to the Universal Serial Bus (USB) connector.

Figure 50:
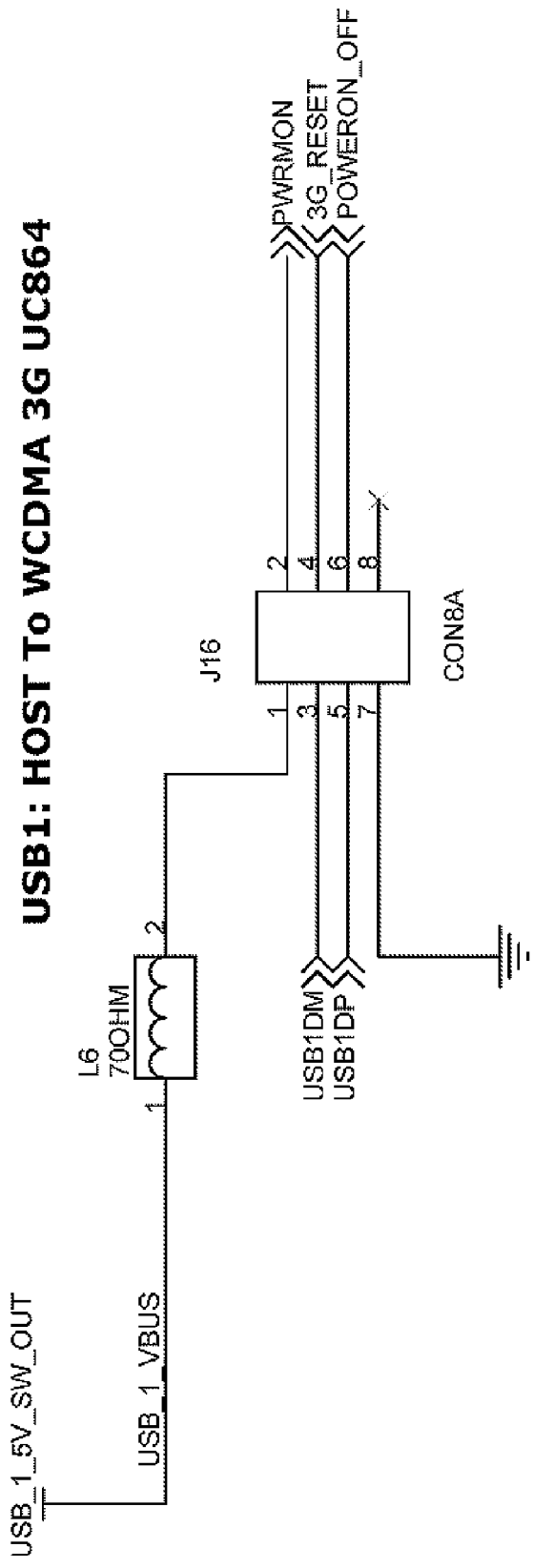

FIG. 50 shows a USB1: HOST To WCDMA 3G UC864 circuit. This circuit is merely an example, which should not unduly limit the scope of the claims herein. One of ordinary skill in the art would recognize many variations, alternatives and modifications. As shown, the example circuit includes a Universal Serial Bus (USB) host connector to cellular (2G/3G/4G LTE) module.

Figure 51:

FIG. 51 shows USB0 Connection Assignments, USB1 Connection Assignments, and a Switch Power Input circuit. These figures are merely examples and should not unduly limit the scope of the claims herein. Those of ordinary skill in the art will recognize other variations, modifications, and alternatives.

Figure 52:
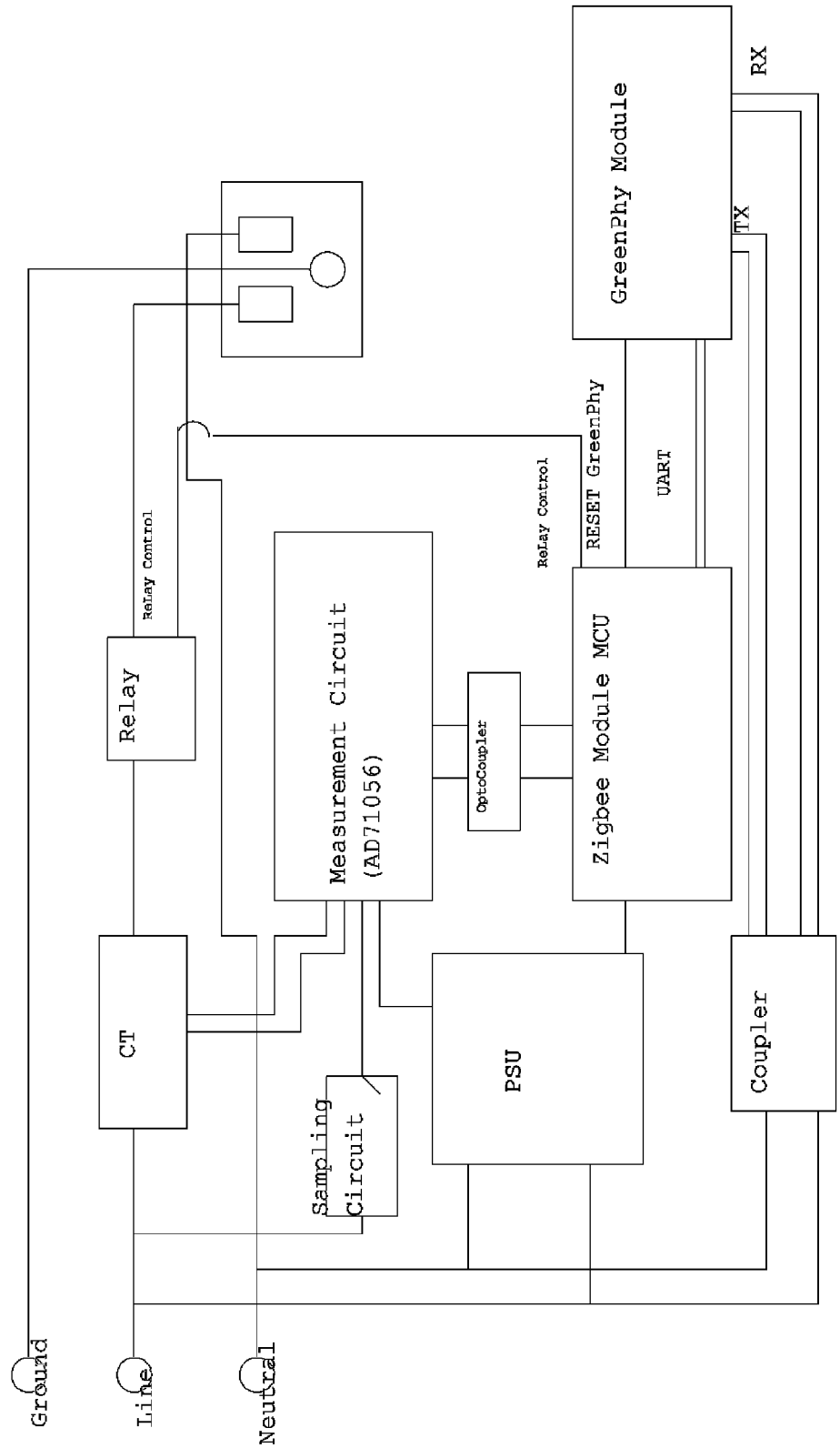
FIG. 52 is a simplified diagram illustrating an appliance module including power-line module and ZigBee module according to an embodiment of the present invention.

FIG. 52 is a simplified diagram illustrating an appliance module including power-line module and ZigBee module according to an embodiment of the present invention. This block diagram is merely an example, which should not unduly limit the scope of the claims herein. One of ordinary skill in the art would recognize many variations, alternatives and modifications. Further details regarding individual components shown in FIG. 52 can be found in the description for FIGS. 53-85.

FIGS. 53 through 85 are simplified diagrams illustrating circuit diagrams and chip level I/Os for components of the data concentrator of FIG. 52 according to embodiments of the present invention. These circuit diagrams show circuit device components according to embodiments of the present invention. In an embodiment, these figures show components of a data concentrator device according to an embodiment of the present invention. As shown, the data concentrator can include a Measurement Circuit (AD71056) module, a ZigBee module MCU, a GreenPhy module, a PSU, a Sampling Circuit module, a Relay Circuit module, a CT circuit module, a Coupler module, and an Optocoupler module. Further details regarding these components can be found below in the descriptions for FIGS. 53-85.

FIGS. 53-57 show power supply related circuits.

Figure 53:
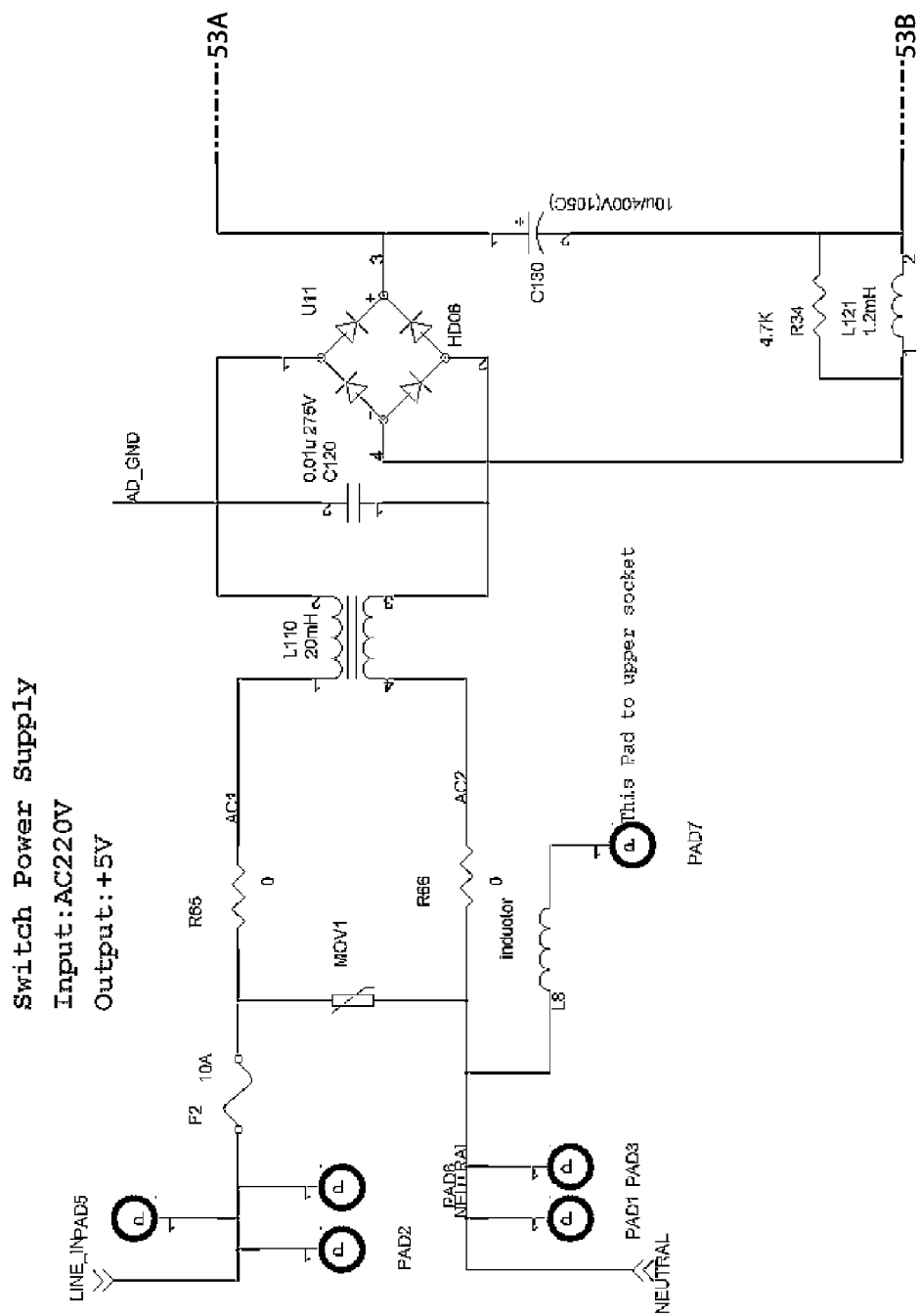
Figure 54:
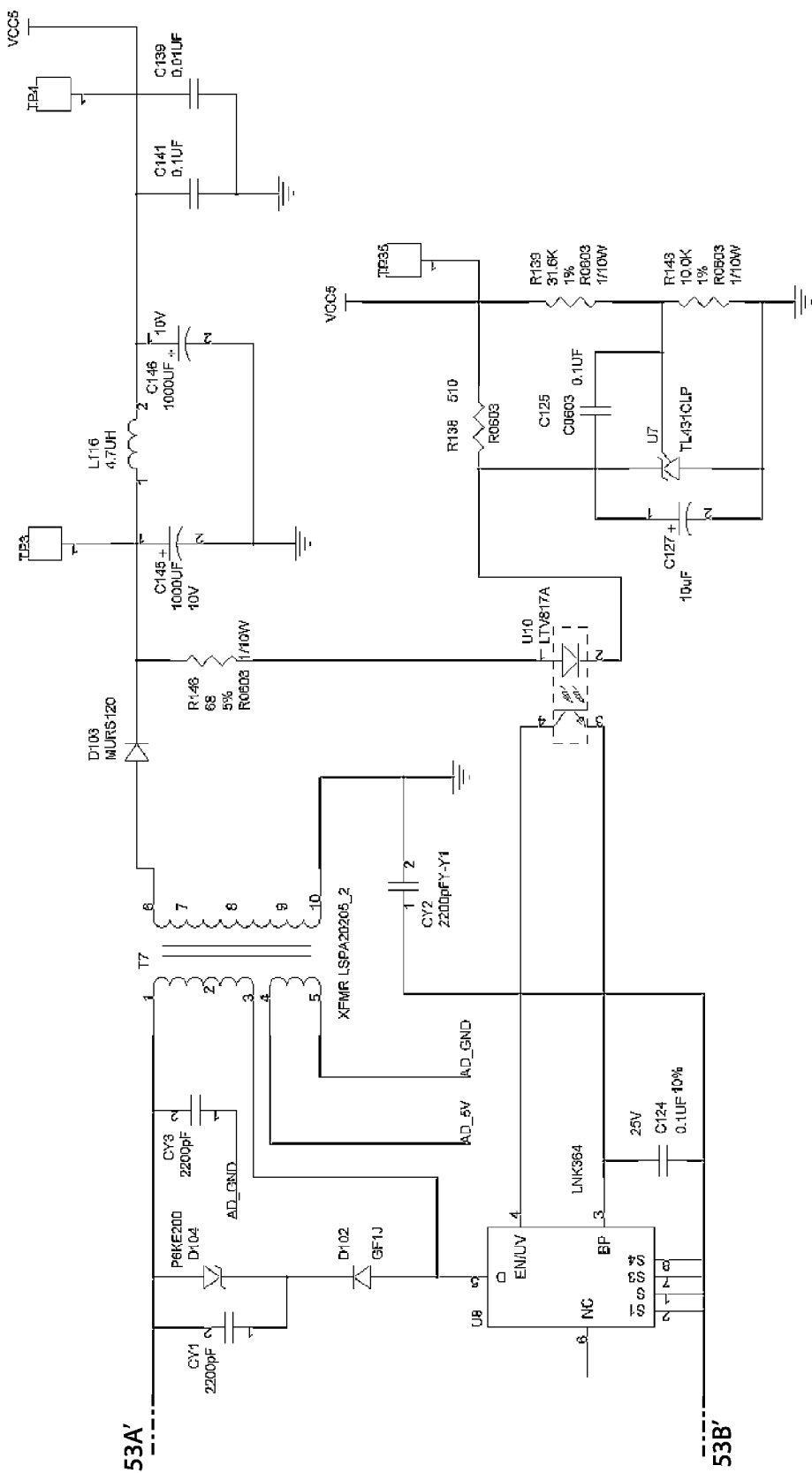

FIGS. 53 and 54 show a Switch Power Supply circuit where node 53A of FIG. 53 connects to node 53A' of FIG. 54 and node 53B of FIG. 53 connects to node 53B' of FIG. 54. This circuit is merely an example, which should not unduly limit the scope of the claims herein. One of ordinary skill in the art would recognize many variations, alternatives and modifications. As shown, the example circuit includes a 220 V AC power input and a 5V DC power output.

Figure 55:
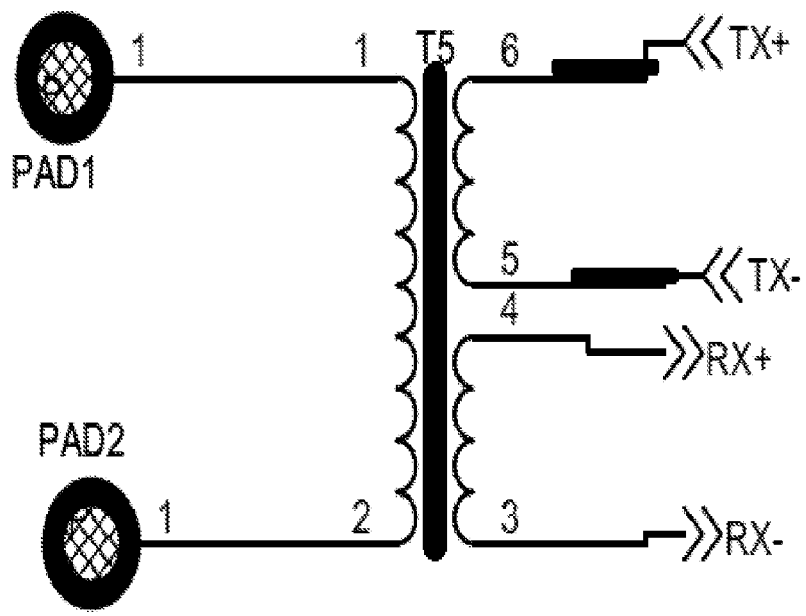

FIG. 55 shows a Green Phy Coupler circuit. This circuit is merely an example, which should not unduly limit the scope of the claims herein. One of ordinary skill in the art would recognize many variations, alternatives and modifications. As shown, the example circuit includes coupler for HomePlug-PowerlineGreenPhy signal to AC wiring.

Figure 56:
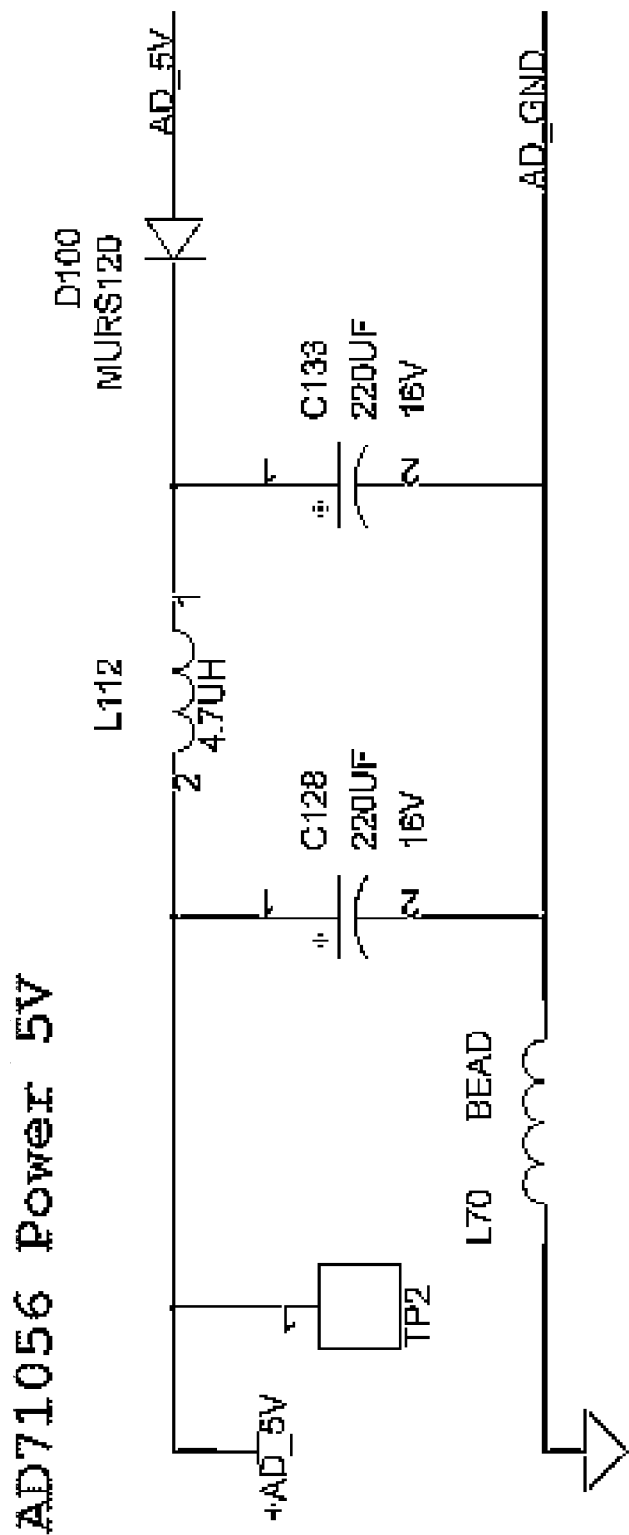

FIG. 56 shows an AD71056 Power 5V circuit. This circuit is merely an example, which should not unduly limit the scope of the claims herein. One of ordinary skill in the art would recognize many variations, alternatives and modifications. As shown, the example circuit includes a 5V power supply for the power measurement chip.

Figure 57:
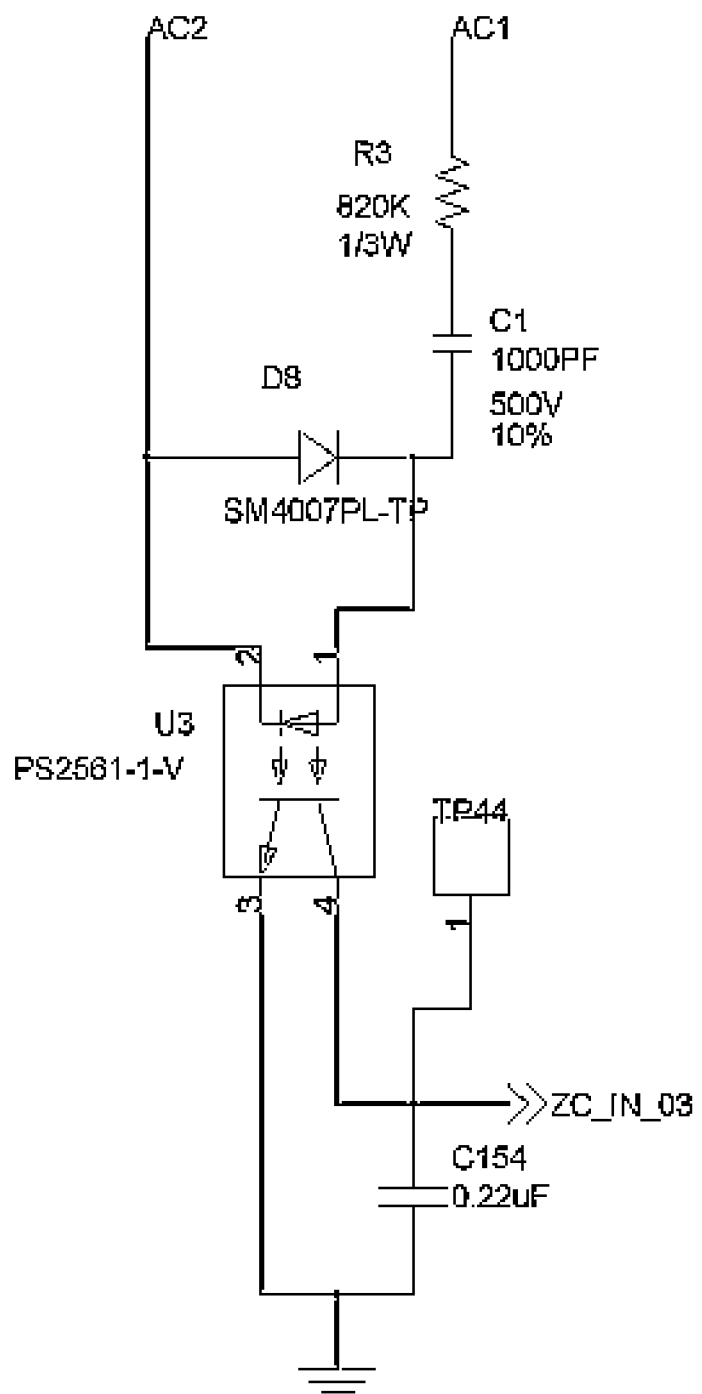

FIG. 57 shows an additional power supply circuit. This circuit is merely an example, which should not unduly limit the scope of the claims herein. One of ordinary skill in the art would recognize many variations, alternatives and modifications. As shown, the example circuit includes a Zero Cross (ZC) signal measurement.

Figure 58:
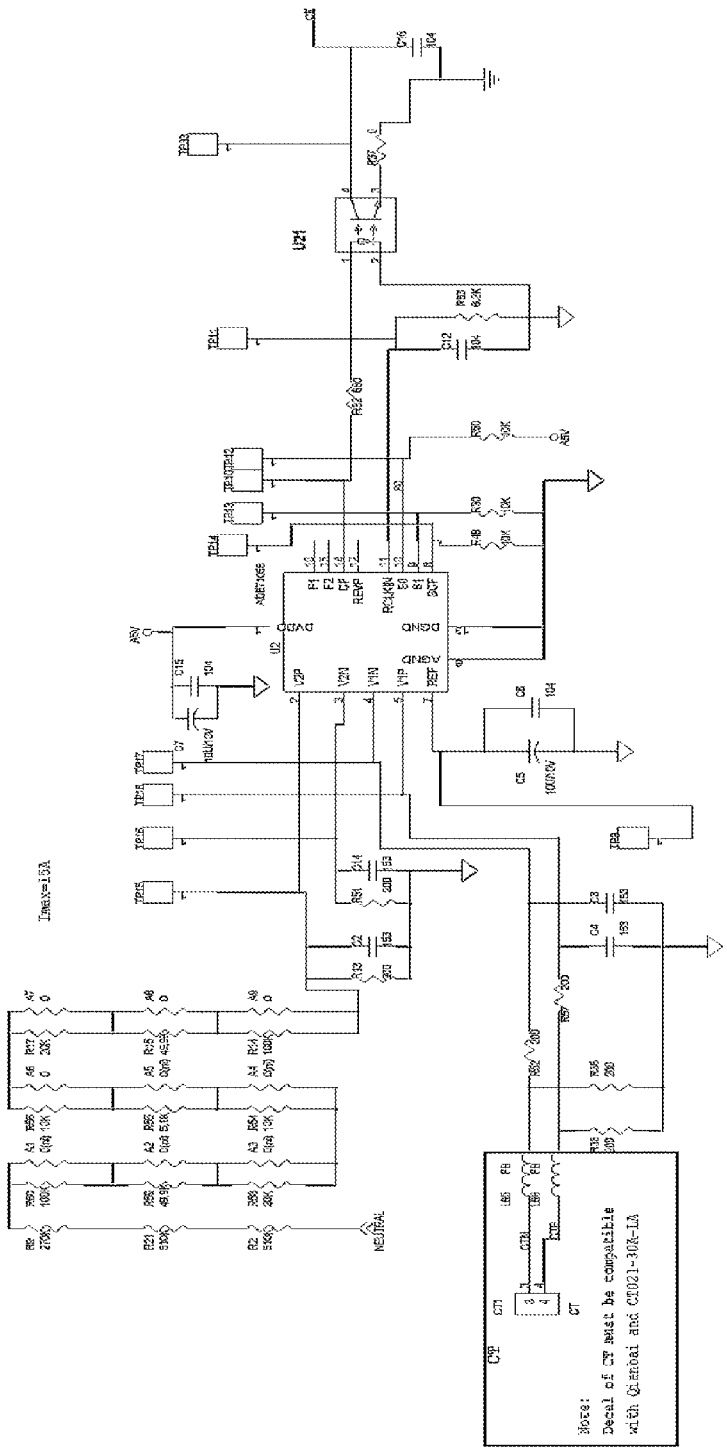

FIGS. 58-61 show circuits and circuit I/Os related to an ADE71056 circuit device. FIG. 58 shows a primary ADE71056 circuit. This circuit is merely an example, which should not unduly limit the scope of the claims herein. One of ordinary skill in the art would recognize many variations, alternatives and modifications. As shown, the example circuit includes an electric power measurement.

Figure 59:
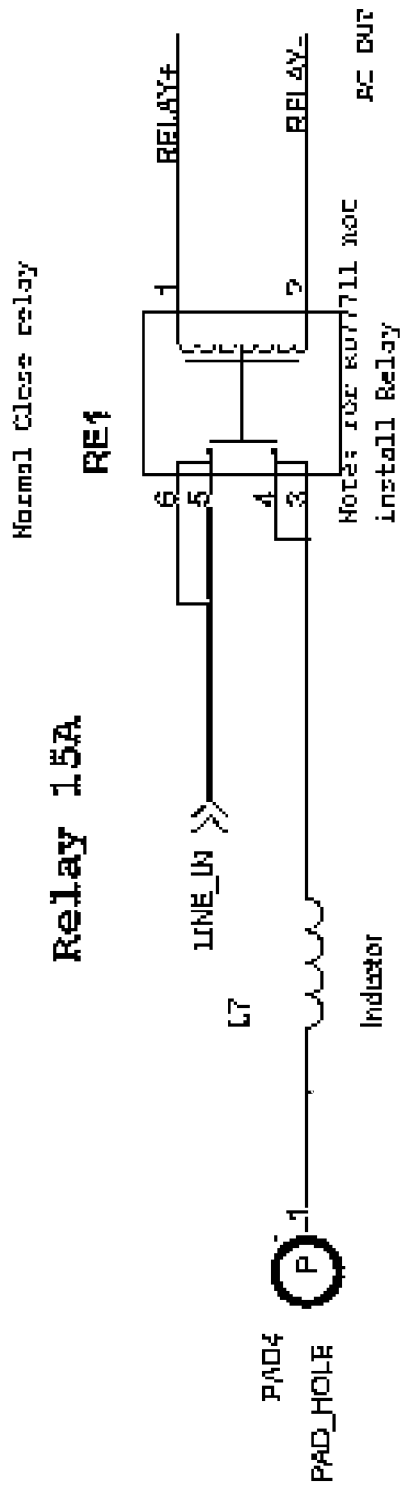

FIG. 59 shows a Relay 15 A circuit. This circuit is merely an example, which should not unduly limit the scope of the claims herein. One of ordinary skill in the art would recognize many variations, alternatives and modifications. As shown, the example circuit includes a 15 A relay for AC out.

Figure 60:
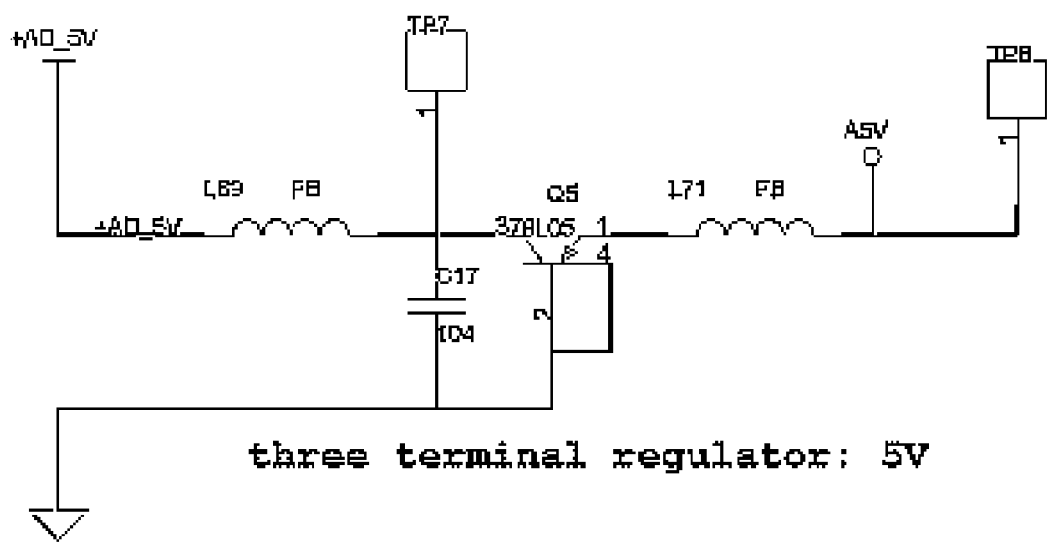

FIG. 60 shows a 5V three terminal regulator circuit. This circuit is merely an example, which should not unduly limit the scope of the claims herein. One of ordinary skill in the art would recognize many variations, alternatives and modifications. As shown, the example circuit includes a 5V regulator for power measurement chip.

Figure 61:
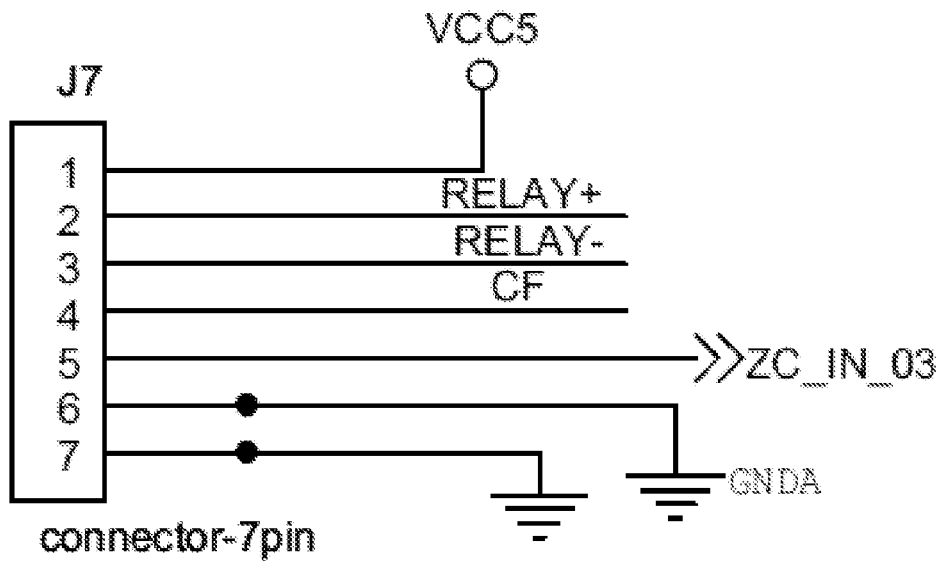

FIG. 61 shows an Interface To UpBoard circuit. This circuit is merely an example, which should not unduly limit the scope of the claims herein. One of ordinary skill in the art would recognize many variations, alternatives and modifications. As shown, the example circuit includes a connector to ZigBee module.

FIGS. 62-75 show circuits and circuit I/Os related to an Interface Board. The DS# circuits relate to LED circuits.

Figure 62:
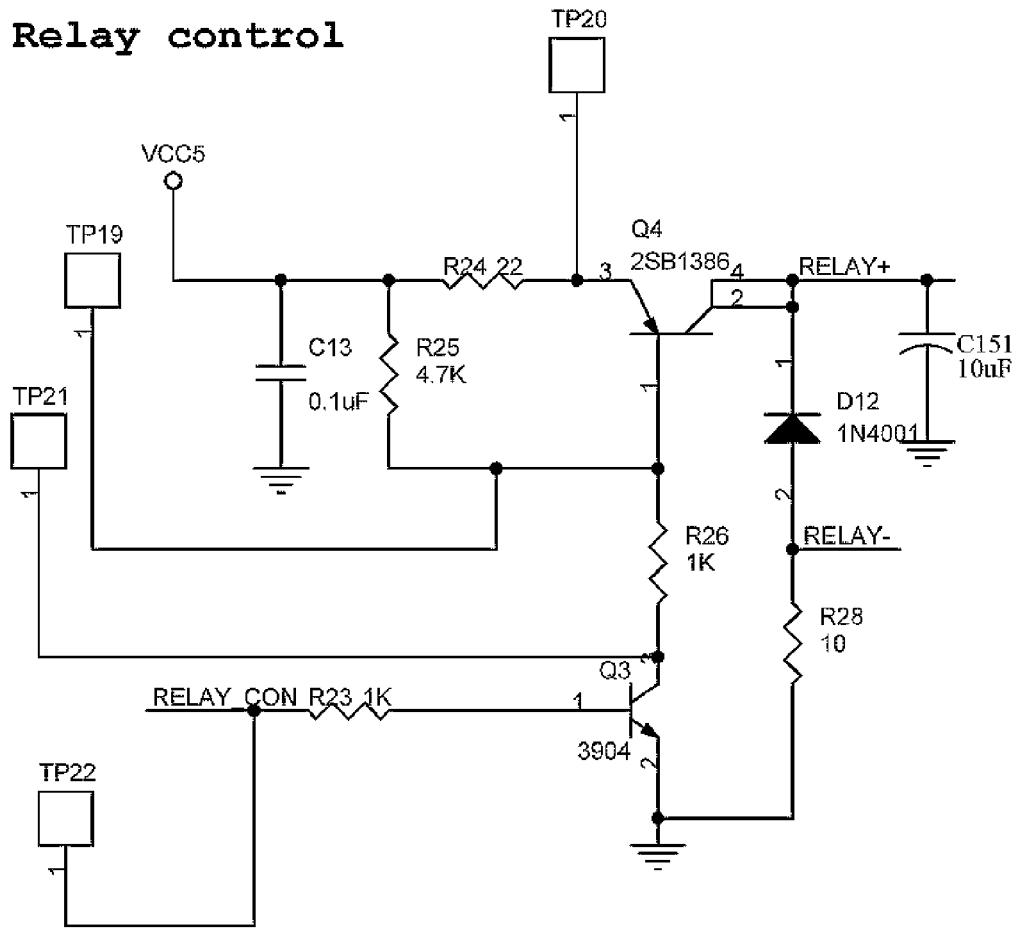

FIG. 62 shows a Relay control circuit. This circuit is merely an example, which should not unduly limit the scope of the claims herein. One of ordinary skill in the art would recognize many variations, alternatives and modifications. As shown, the example circuit is a relay control signal from the ZigBee module.

Figure 63:
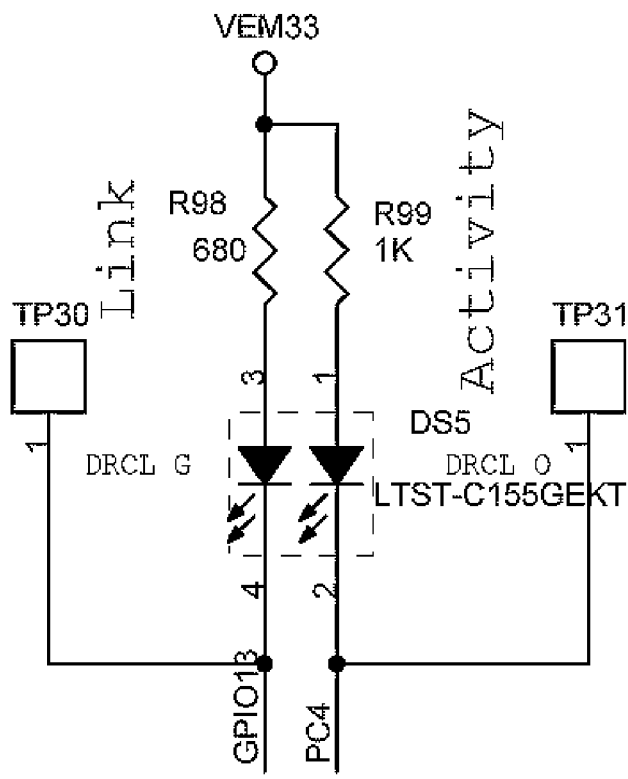

FIG. 63 shows a DS5 circuit. This circuit is merely an example, which should not unduly limit the scope of the claims herein. One of ordinary skill in the art would recognize many variations, alternatives and modifications. As shown, the example circuit includes a Light Emitting Diode (LED) to indicate Demand Response Load Control level.

Figure 64:
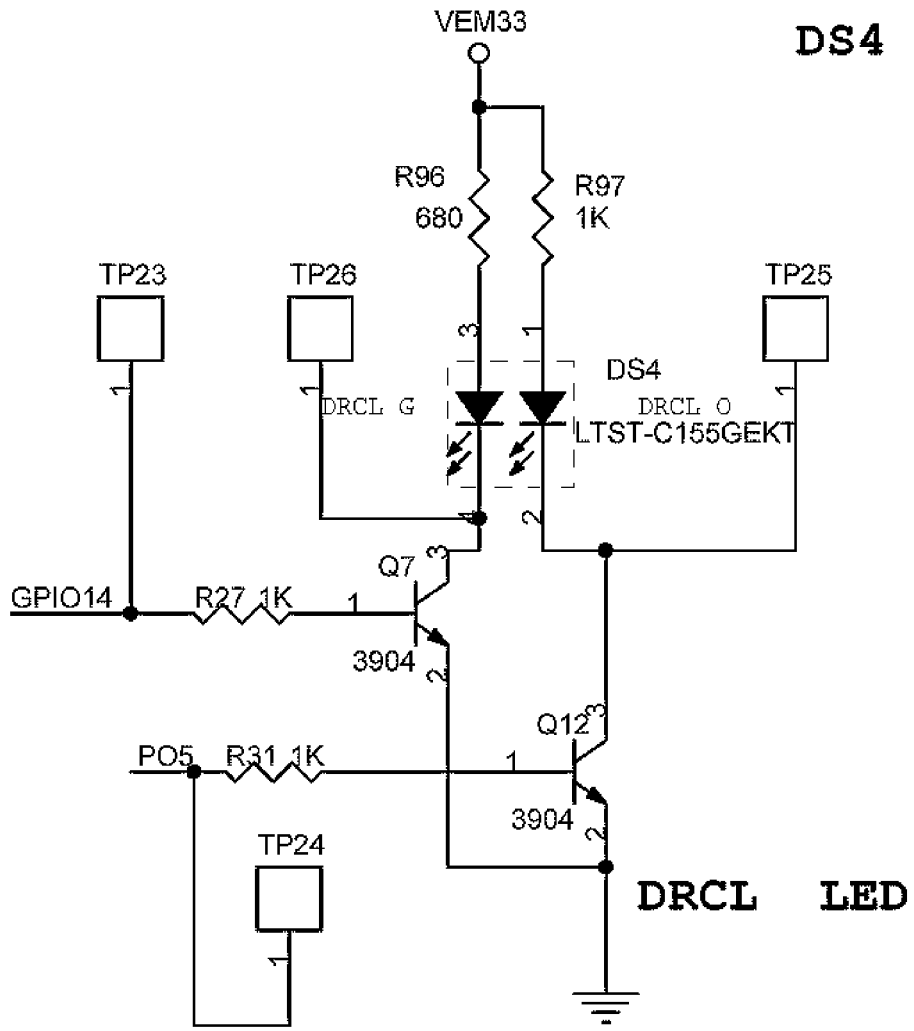

FIG. 64 shows a DS4 circuit. This circuit is merely an example, which should not unduly limit the scope of the claims herein. One of ordinary skill in the art would recognize many variations, alternatives and modifications. As shown, the example circuit includes a Light Emitting Diode (LED) to indicate ZigBee network and power level.

Figure 65:
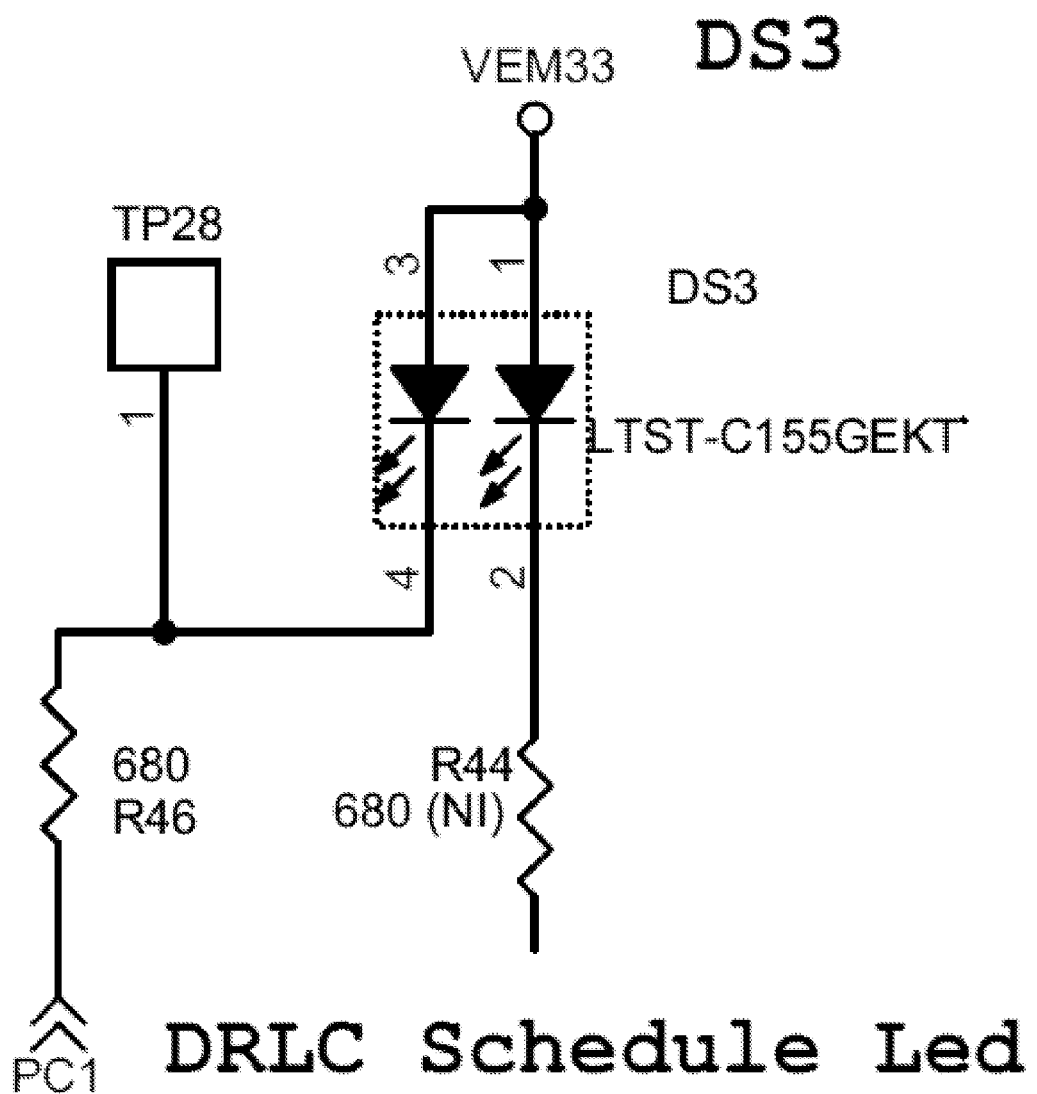

FIG. 65 shows a DS3 circuit. This circuit is merely an example, which should not unduly limit the scope of the claims herein. One of ordinary skill in the art would recognize many variations, alternatives and modifications. As shown, the example circuit includes a Light Emitting Diode to indicate Demand Response Schedule.

Figure 66:
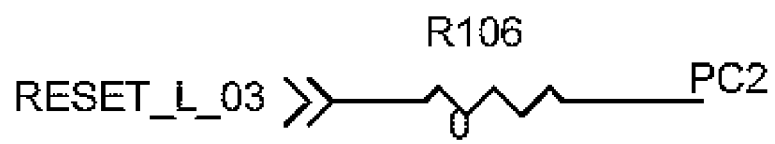

FIG. 66 shows a RESET QCA7000 (GreenPhy) SWITCH ACTIVE LOW circuit. This circuit is merely an example, which should not unduly limit the scope of the claims herein. One of ordinary skill in the art would recognize many variations, alternatives and modifications. As shown, the example circuit includes a Light Emitting Diode (LED) control signal to HomePlugPowerlineGreenPhy module.

Figure 67:
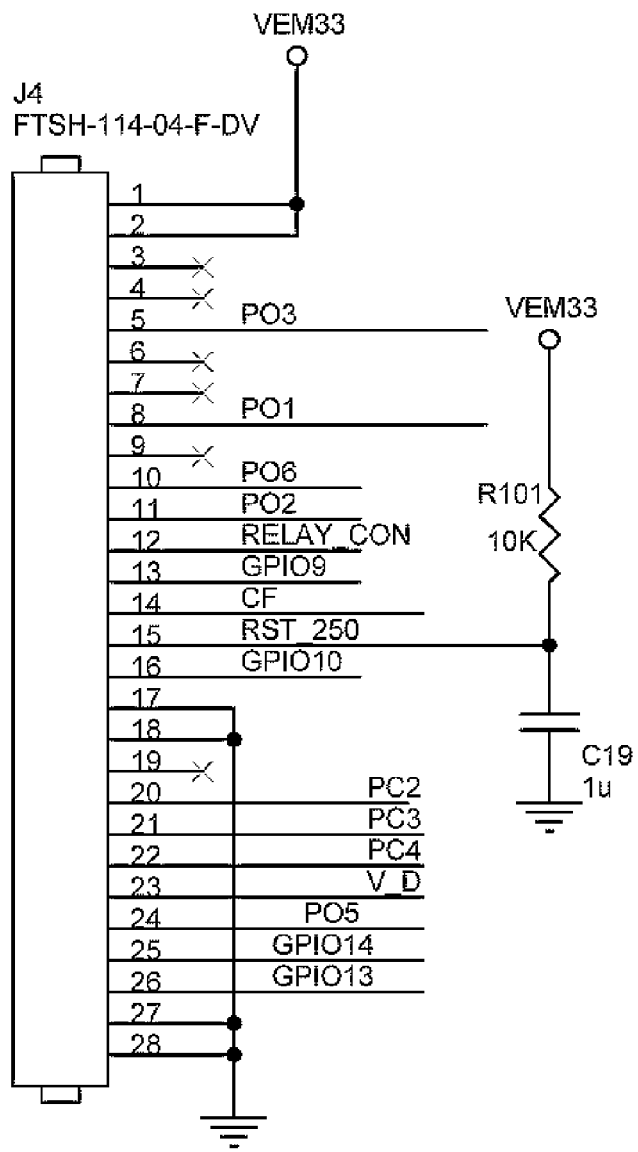

FIG. 67 shows an Interface to ZigBee circuit.

Figure 68:
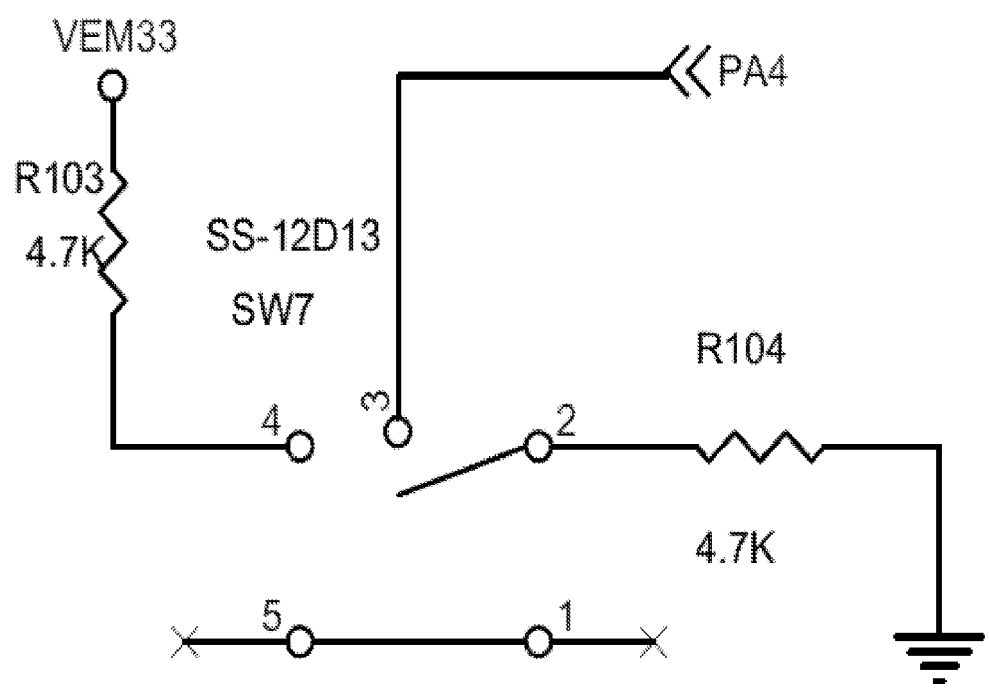

FIG. 68 shows an AC ON/OFF Switch circuit. This circuit is merely an example, which should not unduly limit the scope of the claims herein. One of ordinary skill in the art would recognize many variations, alternatives and modifications. As shown, the example circuit includes an A/C control to turn ON and OFF the AC socket.

Figure 69:
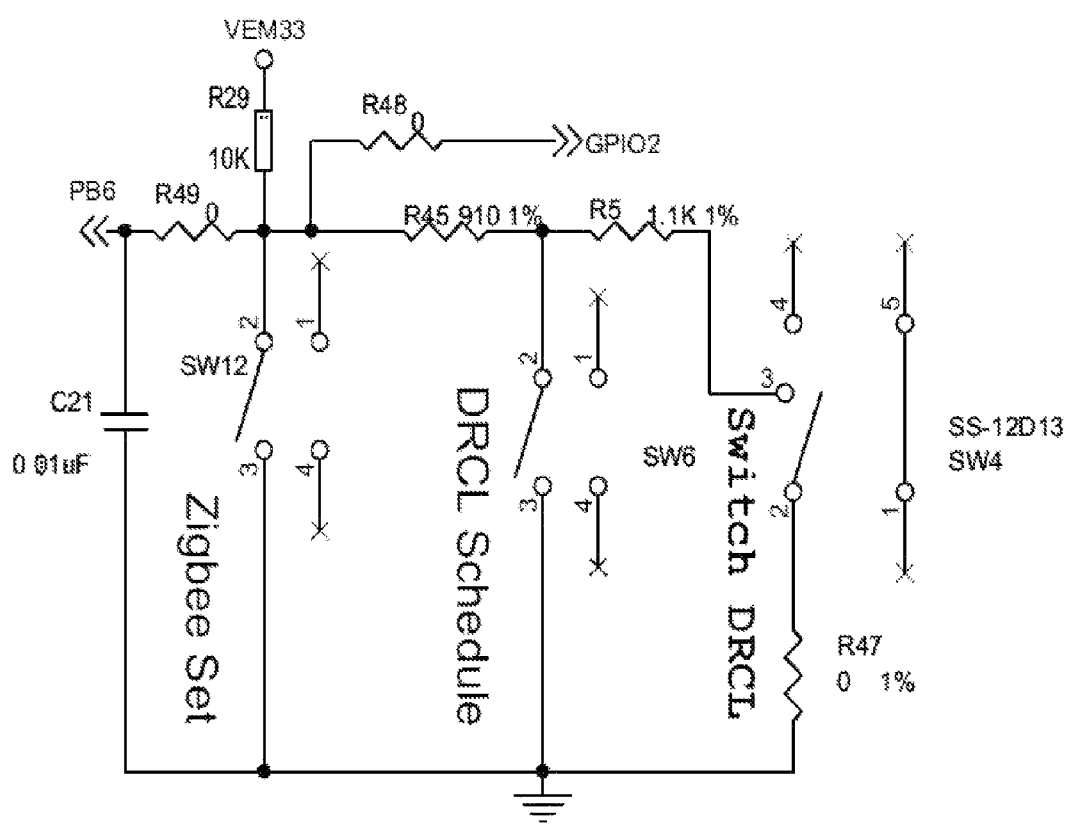

FIG. 69 shows a ZigBee Set circuit. This circuit is merely an example, which should not unduly limit the scope of the claims herein. One of ordinary skill in the art would recognize many variations, alternatives and modifications. As shown, the example circuit includes a factory default button and a network leave button.

Figure 70:
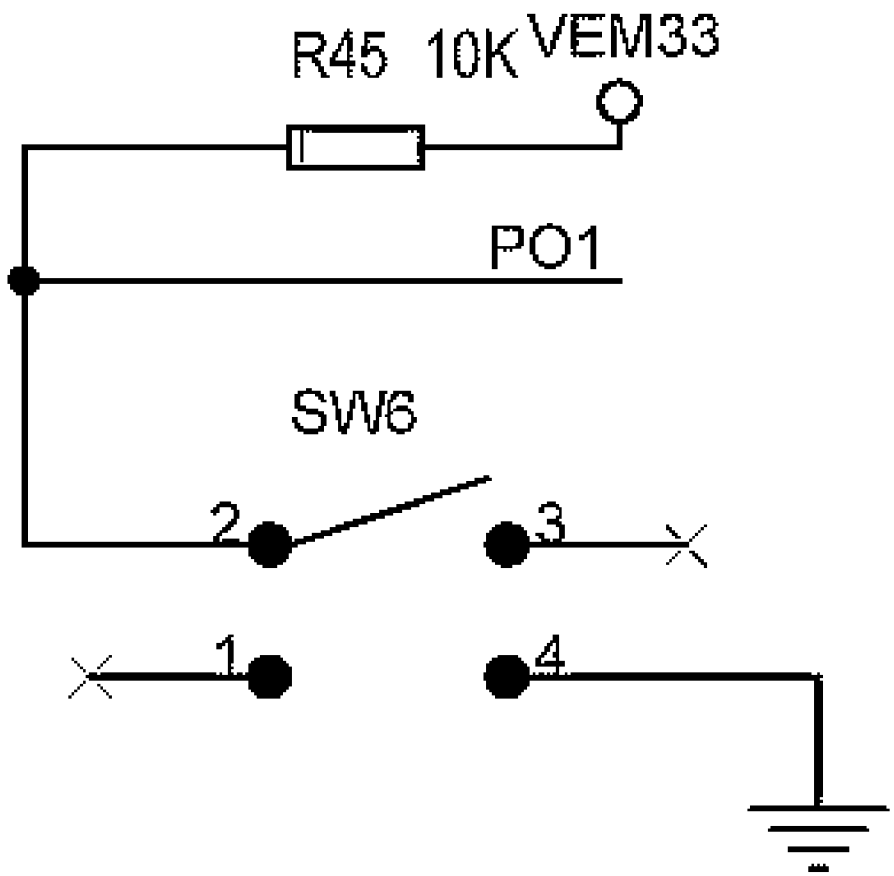

FIG. 70 shows a DRCL Schedule circuit.

Figure 71:
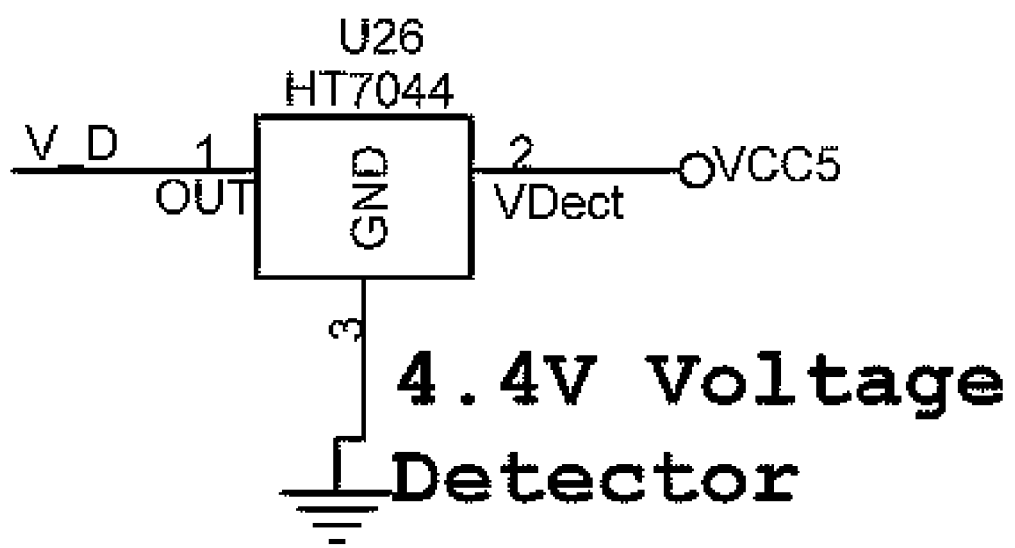

FIG. 71 shows a 4.4V Voltage Detector circuit. This circuit is merely an example, which should not unduly limit the scope of the claims herein. One of ordinary skill in the art would recognize many variations, alternatives and modifications. As shown, the example circuit includes a voltage detection for 5V.

Figure 72:
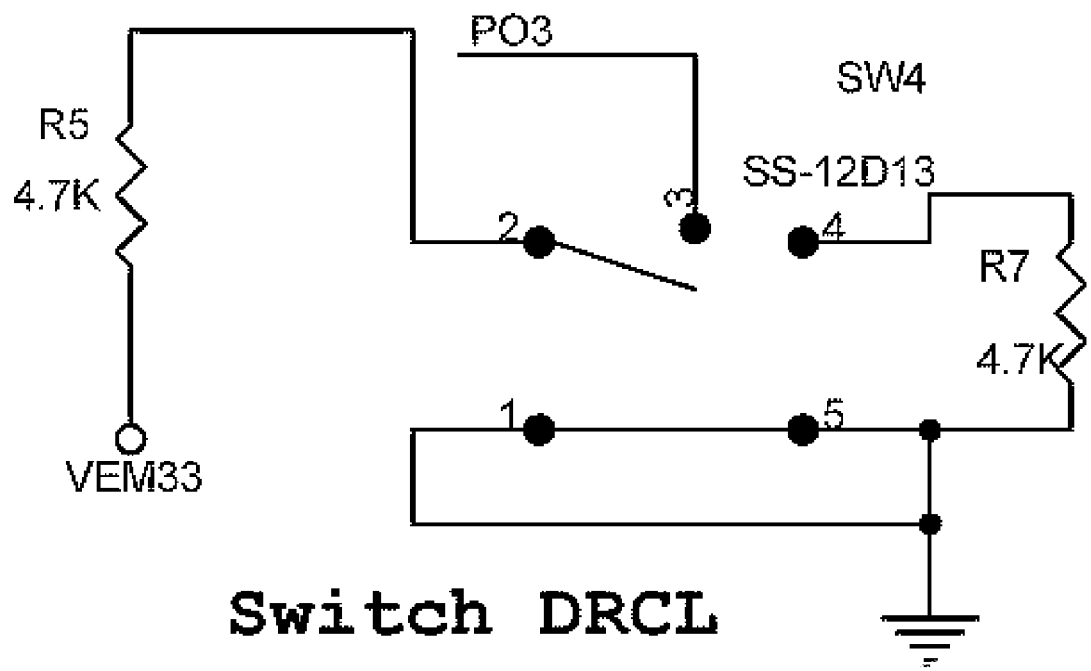

FIG. 72 shows a Switch DRCL circuit. This circuit is merely an example, which should not unduly limit the scope of the claims herein. One of ordinary skill in the art would recognize many variations, alternatives and modifications. As shown, the example circuit includes a demand response load control switch.

Figure 73:
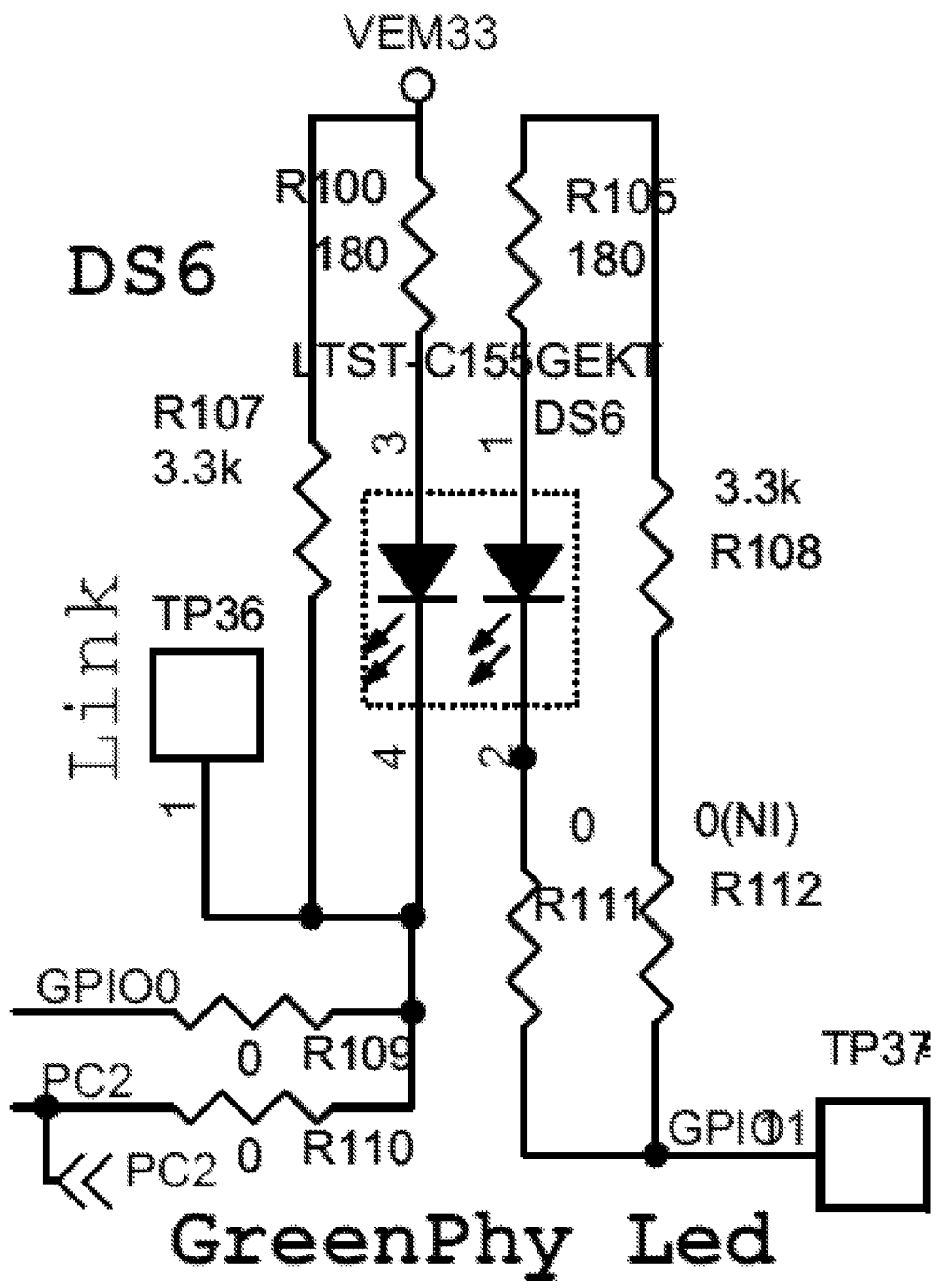

FIG. 73 shows a DS6 circuit. This circuit is merely an example, which should not unduly limit the scope of the claims herein. One of ordinary skill in the art would recognize many variations, alternatives and modifications. As shown, the example circuit is a light emitting diode (LED) for HomePlugPowerlineGreenPhy network status.

Figure 74:
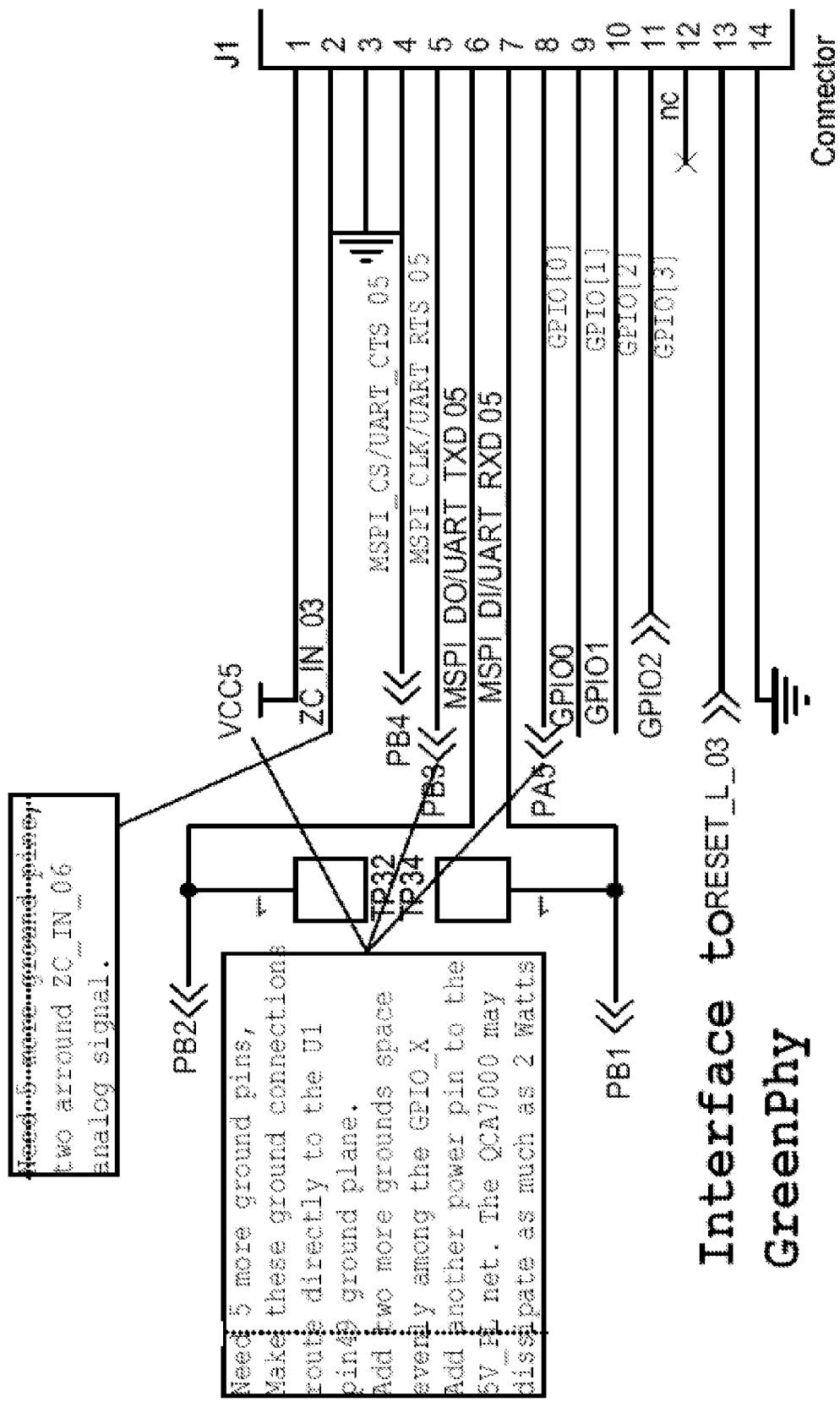

FIG. 74 shows an Interface to GreenPhy circuit. This circuit is merely an example, which should not unduly limit the scope of the claims herein. One of ordinary skill in the art would recognize many variations, alternatives and modifications. As shown, the example circuit includes a ZigBee interface board to HomePlugPowerlineGreenPhy module board.

Figure 75:
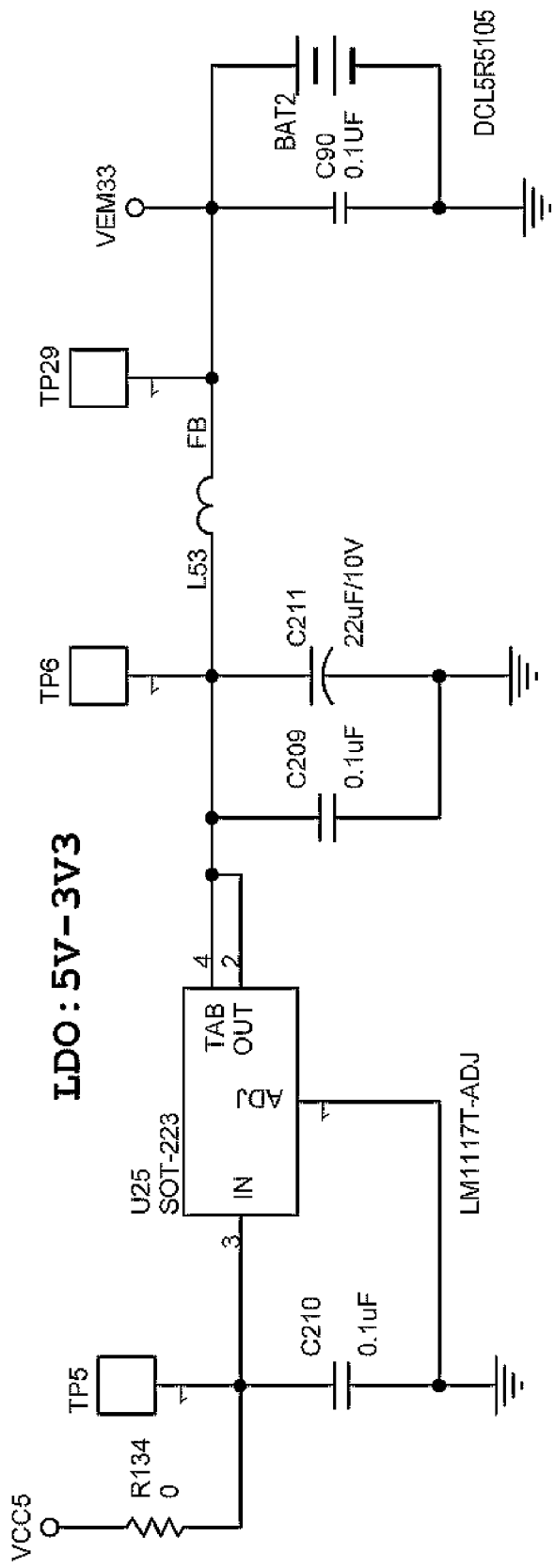

FIG. 75 shows an LDO: 5V-3V3 circuit. This circuit is merely an example, which should not unduly limit the scope of the claims herein. One of ordinary skill in the art would recognize many variations, alternatives and modifications. As shown, the example circuit includes a 5V from main board to 3.3V for ZigBee module.

Figure 76:
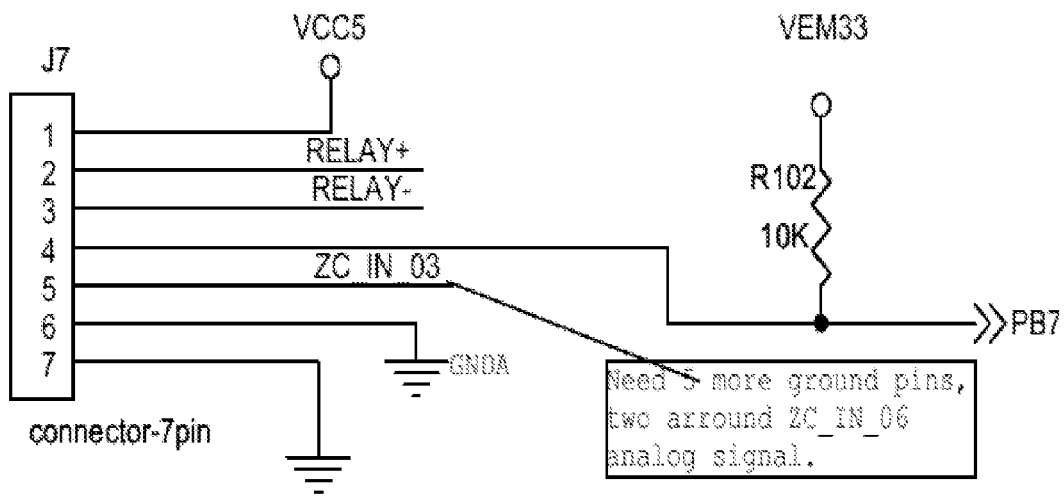

FIG. 76 shows an Interface to main board circuit. This circuit is merely an example, which should not unduly limit the scope of the claims herein. One of ordinary skill in the art would recognize many variations, alternatives and modifications. As shown, the example circuit includes a ZigBee interface board to the main board.

Figure 77:
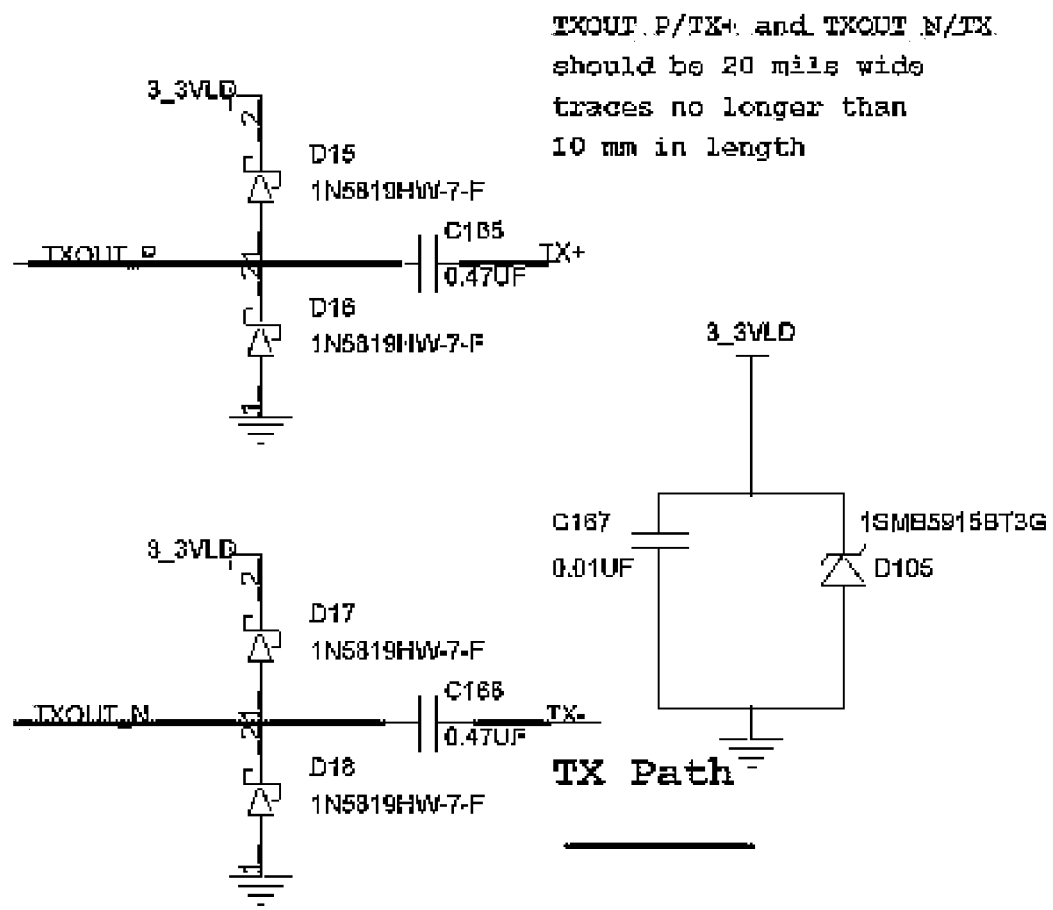

FIGS. 77-85 show circuits and circuit I/Os related to the GreenPhy (GP) Module. FIG. 77 shows several TX Path circuits. This circuit is merely an example, which should not unduly limit the scope of the claims herein. One of ordinary skill in the art would recognize many variations, alternatives and modifications. As shown, the example circuit includes a Electric Static Discharge (ESD) protection diode for the HomePlugPowerlineGreenPhy module.

Figure 78:
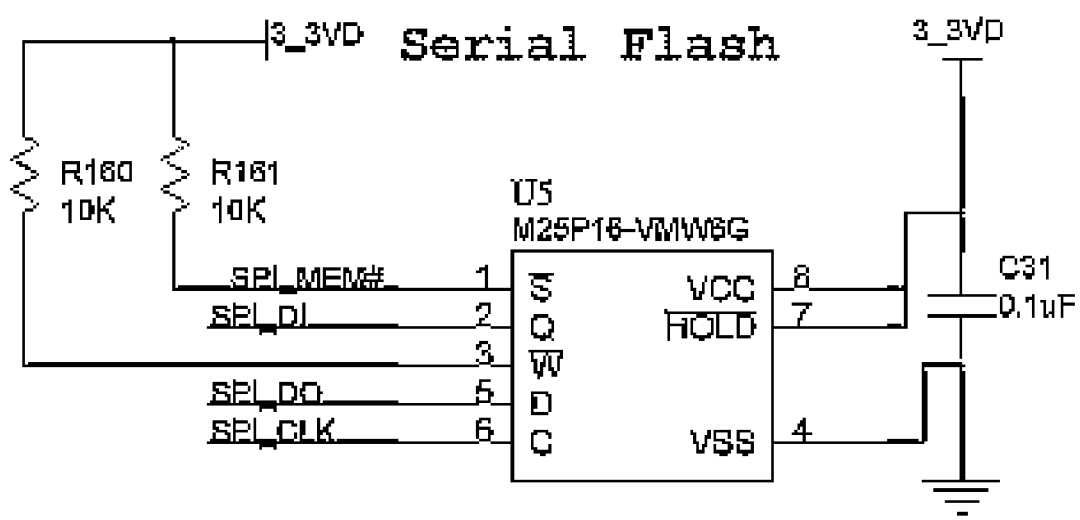

FIG. 78 shows a Serial Flash circuit. This circuit is merely an example, which should not unduly limit the scope of the claims herein. One of ordinary skill in the art would recognize many variations, alternatives and modifications. As shown, the example circuit includes a serial flash for HomePlugPowerlineGreenPhy module.

Figure 79:
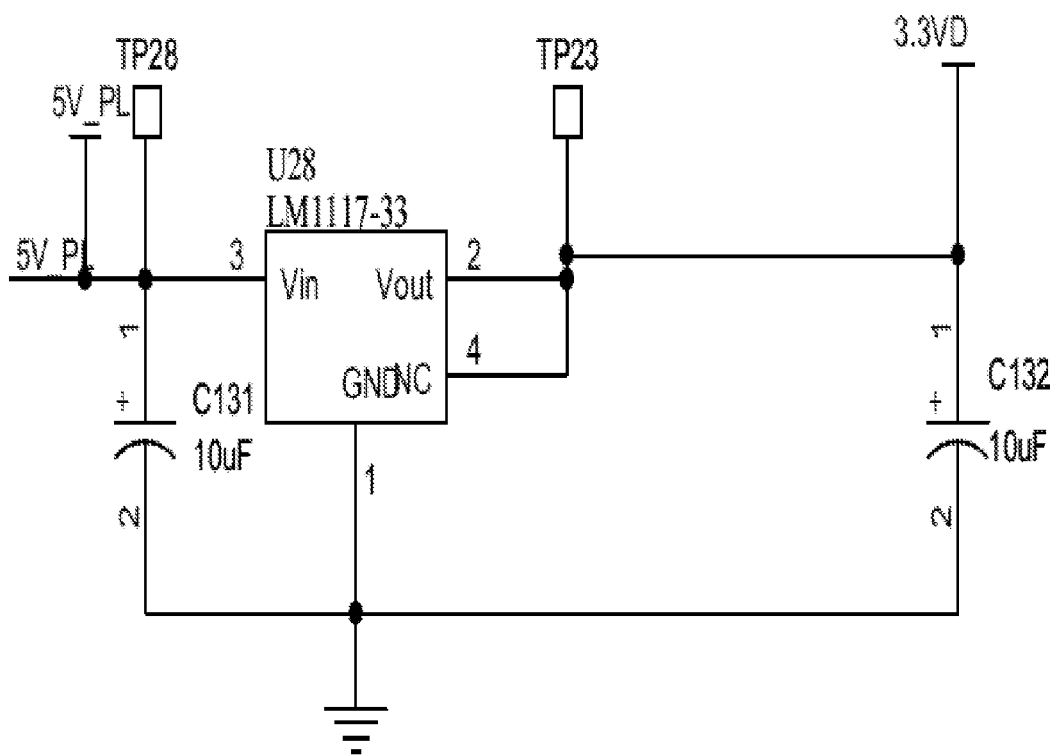

FIG. 79 shows a 3v3 LDO circuit. This circuit is merely an example, which should not unduly limit the scope of the claims herein. One of ordinary skill in the art would recognize many variations, alternatives and modifications. As shown, the example circuit includes a power regulator for 5V to 3.3V.

Figure 80:
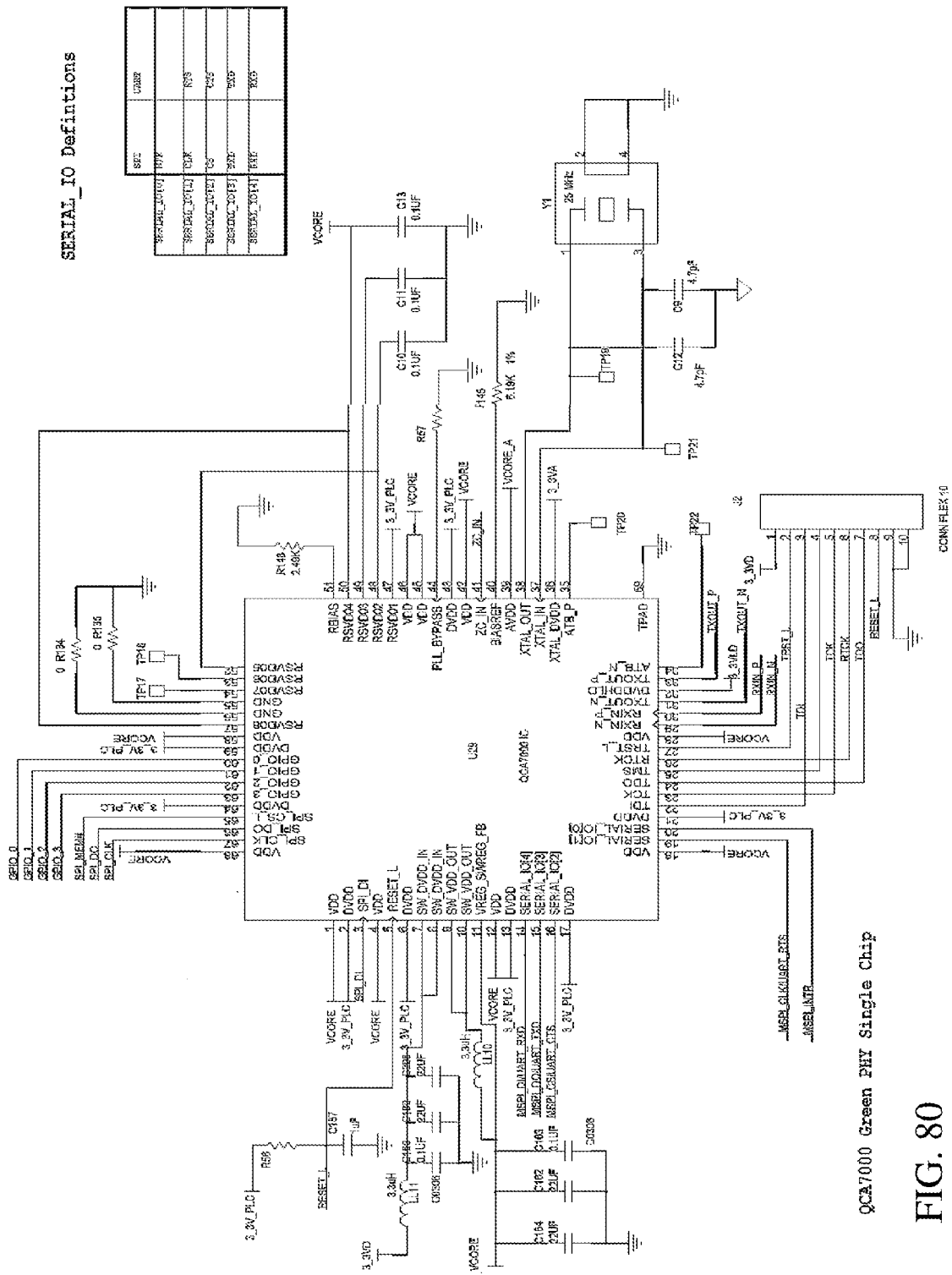

FIG. 80 shows a QCA7000 Green PHY Signal Chip circuit device. This circuit is merely an example, which should not unduly limit the scope of the claims herein. One of ordinary skill in the art would recognize many variations, alternatives and modifications. As shown, the example circuit includes a HomePlugPowerlineGreenphy module and signal driver.

Figure 81:
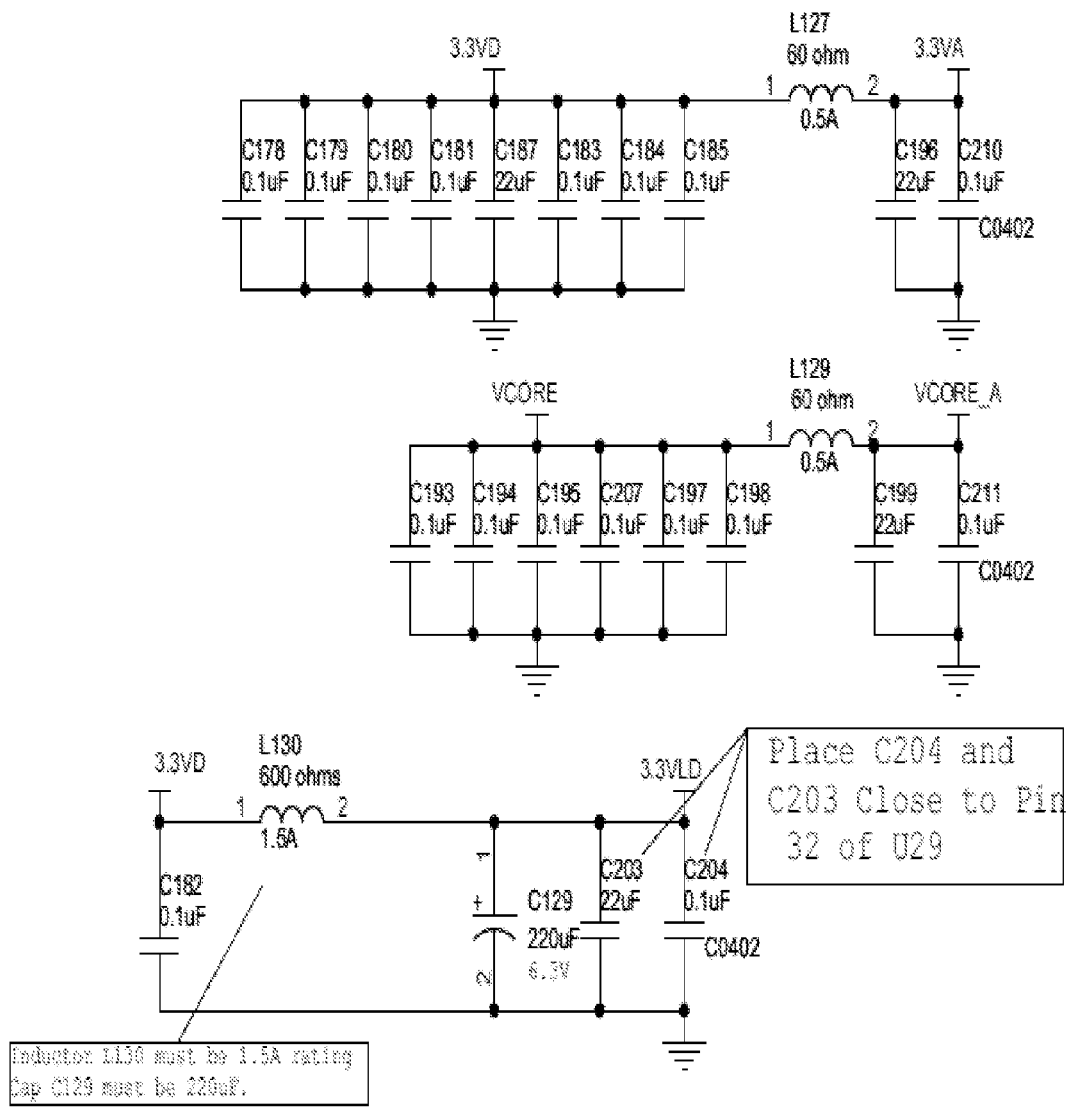

FIG. 81 shows decoupling circuits for the QCA7000 circuit device. This circuit is merely an example, which should not unduly limit the scope of the claims herein. One of ordinary skill in the art would recognize many variations, alternatives and modifications. As shown, the example circuit includes a power decoupling for the HomePlugPowerlineGreenphy module.

Figure 82:
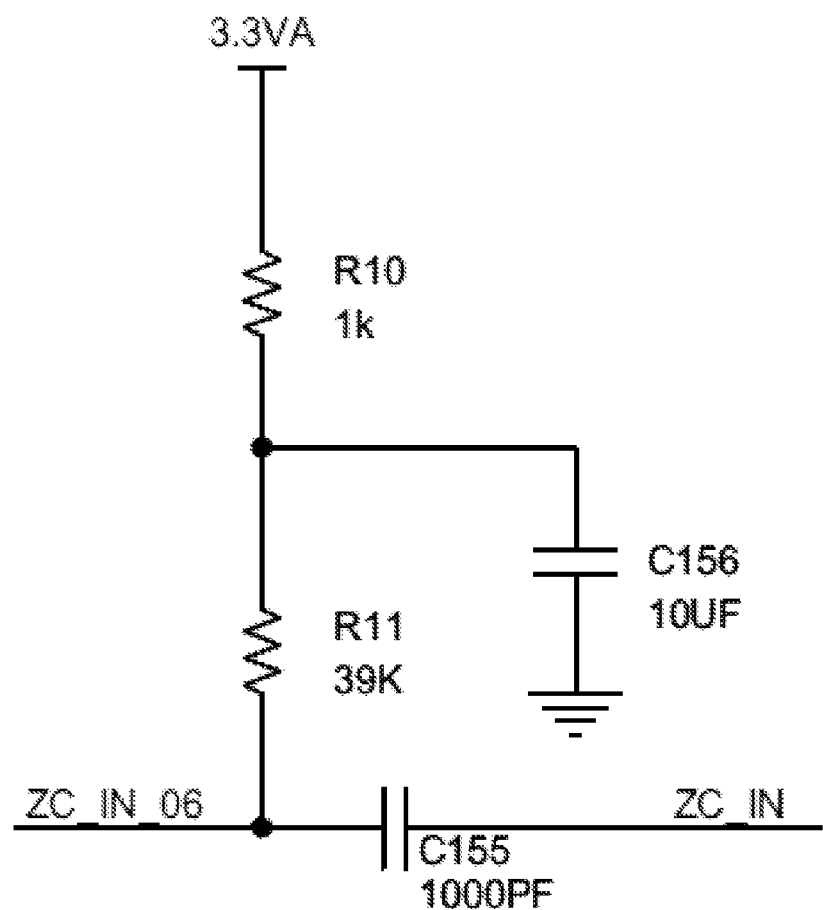
Figure 83:
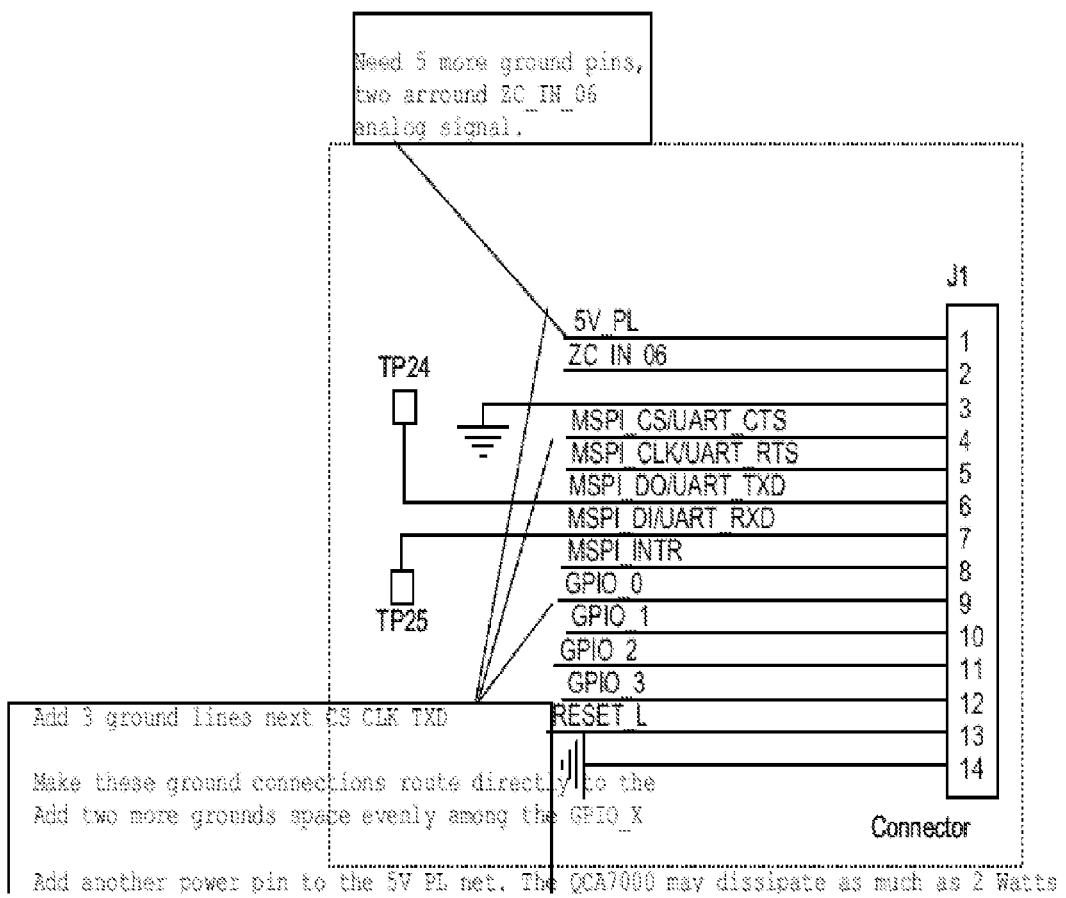

FIGS. 82 and 83 show additional GreenPhy circuits. This circuit is merely an example, which should not unduly limit the scope of the claims herein. One of ordinary skill in the art would recognize many variations, alternatives and modifications. As shown, the example circuit includes zero cross (ZC) signal input to HomePlugPowerlineGreenphy module and a connector between the ZigBee interface board and the HomePlugPowerlineGreenphy module board.

Figure 84:
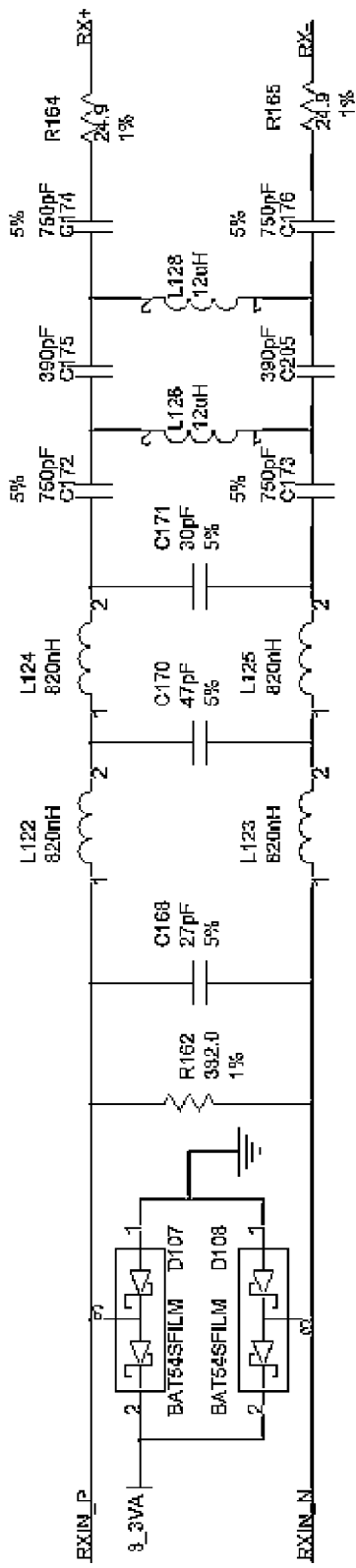

FIG. 84 shows an RX Bandpass Filter circuit. These diagrams are merely examples and should not unduly limit the scope of the claims herein. Those of ordinary skill in the art will recognize other variations, modifications, and alternatives. As shown, the example diagram includes an input from the main board to the HomePlugPowerlineGreenphy module.

FIG. 85 shows HomePlugPowerlineGreenphy module status according to various embodiments of the present invention. This status is merely an example, which should not unduly limit the scope of the claims herein. One of ordinary skill in the art would recognize many variations, alternatives and modifications. As shown, the example status includes two light emitting diodes (LED).

FIGS. 86-95 are simplified diagrams of power meter devices according to various embodiments of the present invention.

Figure 86:
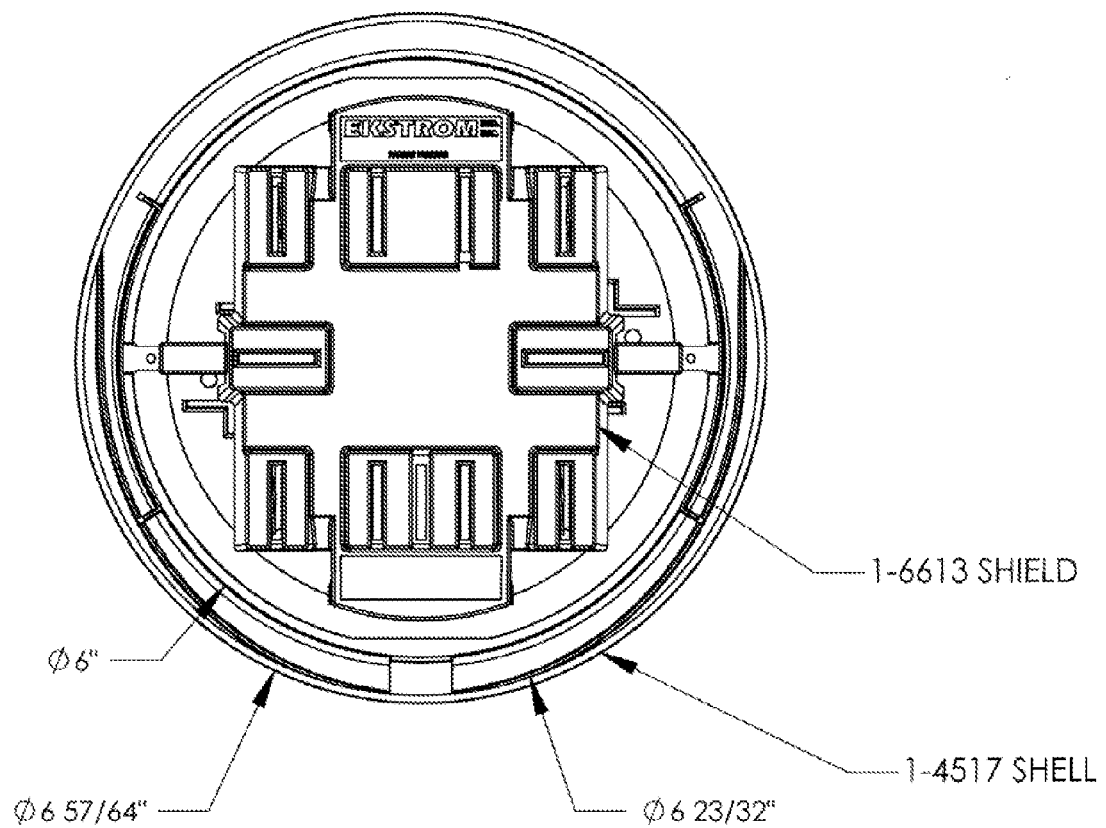
FIGS. 86-95 are simplified diagrams of power meter devices according to various embodiments of the present invention.

FIG. 86 shows a front view of an LP-4J metering device with a shield.

Figure 87:
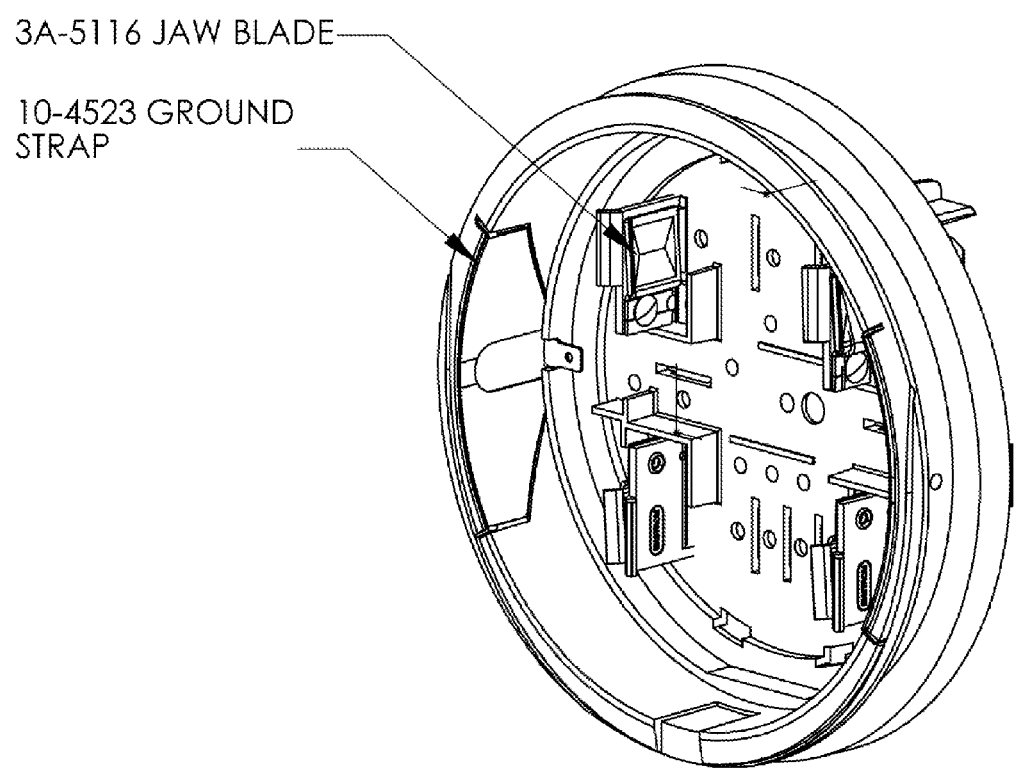

FIG. 87 shows a perspective view of the LP-4J device of FIG. 86 without a shield with a jaw blade.

Figure 88:
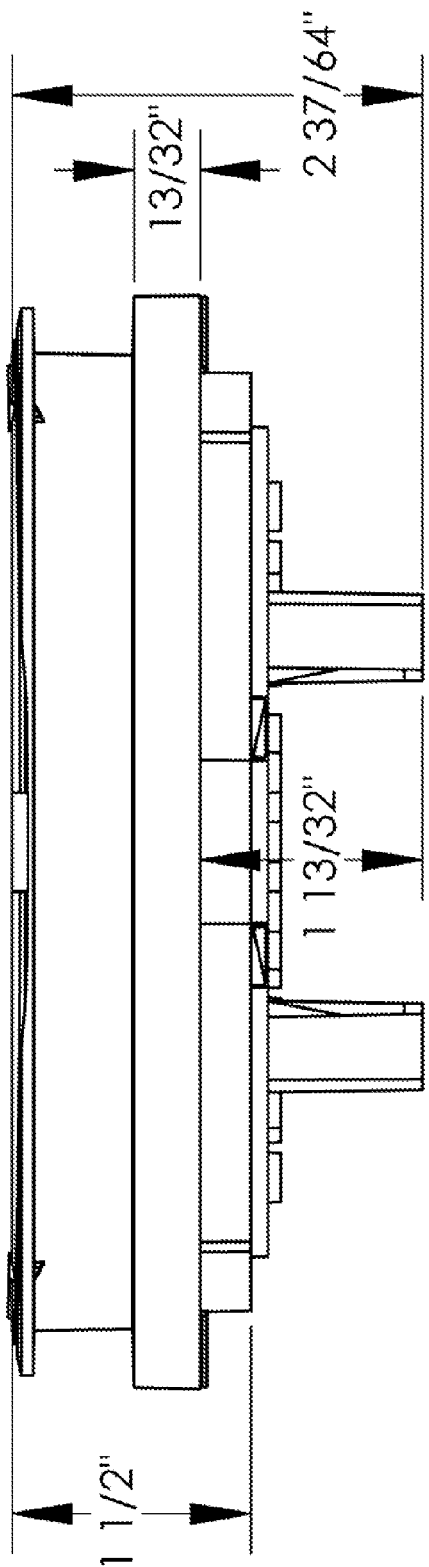

FIG. 88 shows a side view of the LP-4J device of FIG. 86.

Figure 89:
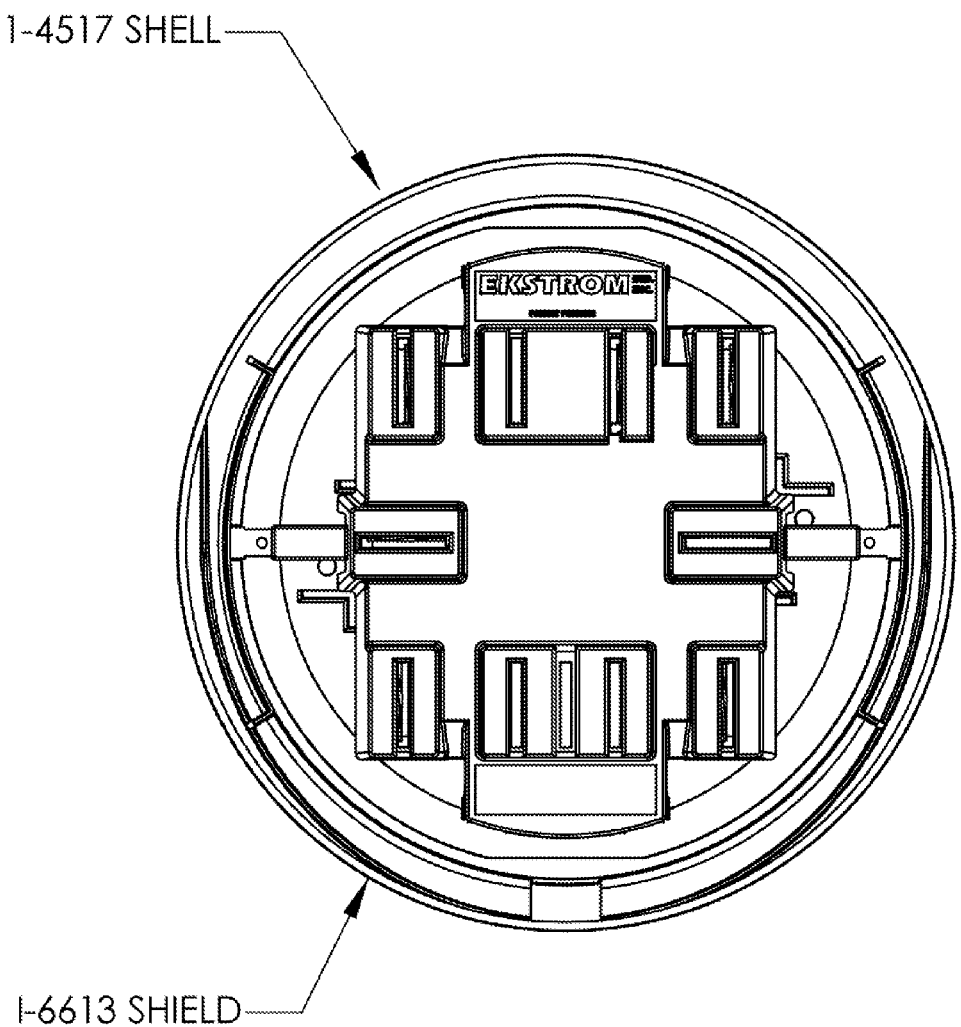

FIG. 89 shows a front view of a LP-5J metering device with a shield.

Figure 90:
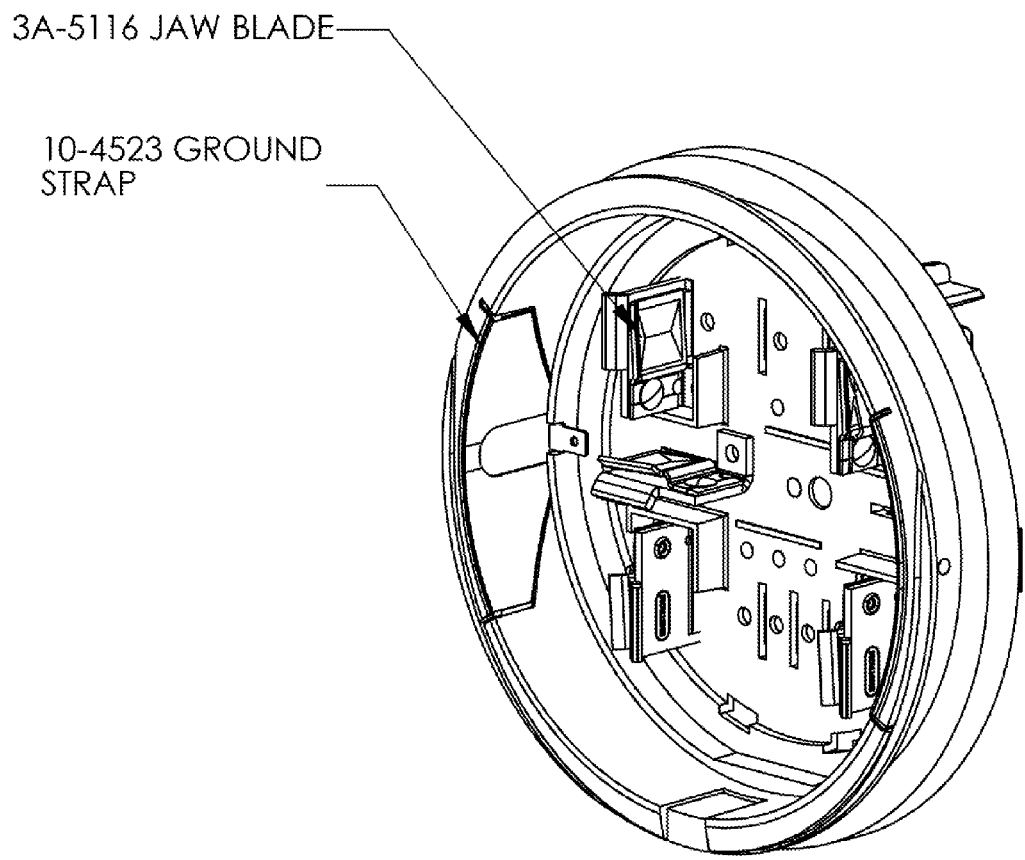

FIG. 90 shows a perspective view of the LP-5J device of FIG. 89 without the shield and with a jaw blade.

Figure 91:
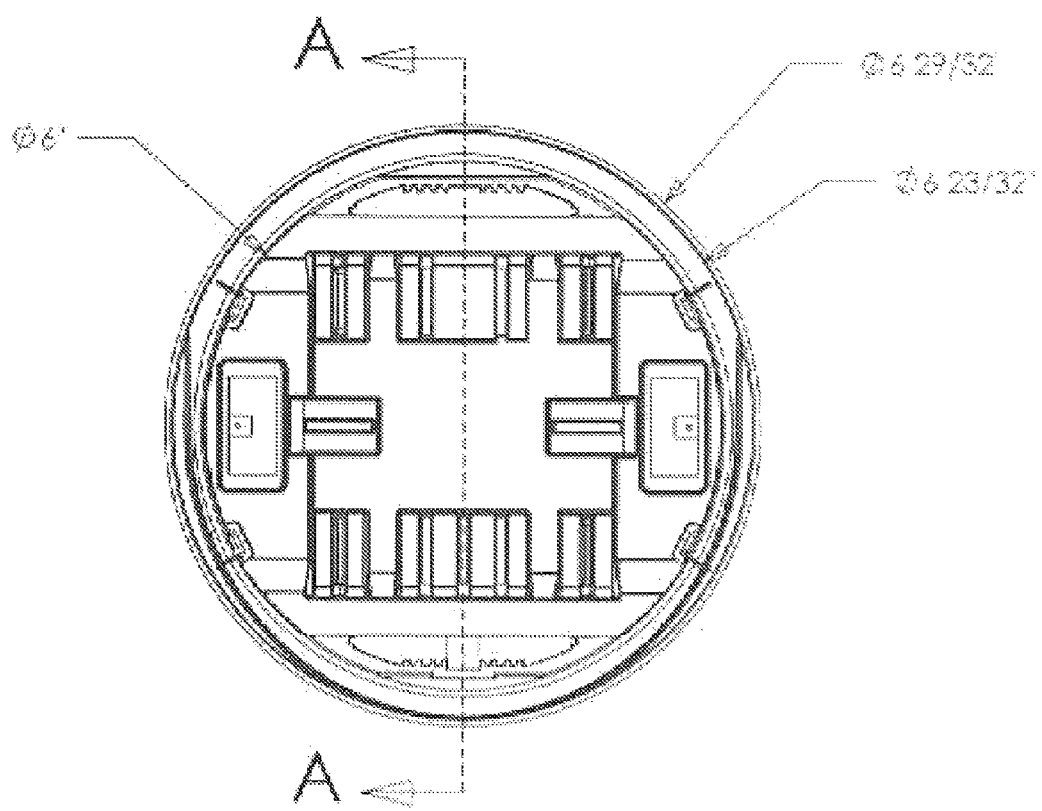

FIG. 91 shows a front view of an EK Series Adapter device with a reference marker for a cross-sectional view.

Figure 92:
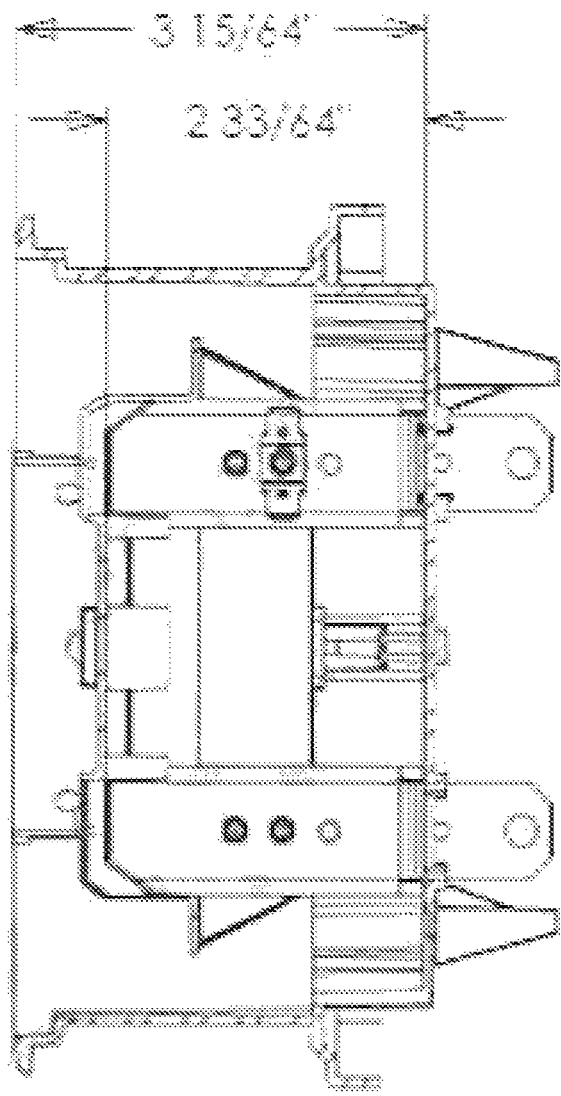

FIG. 92 shows a cross-sectional view of the EK Series Adapter device cut along the reference marker shown previously in FIG. 91.

Figure 93:
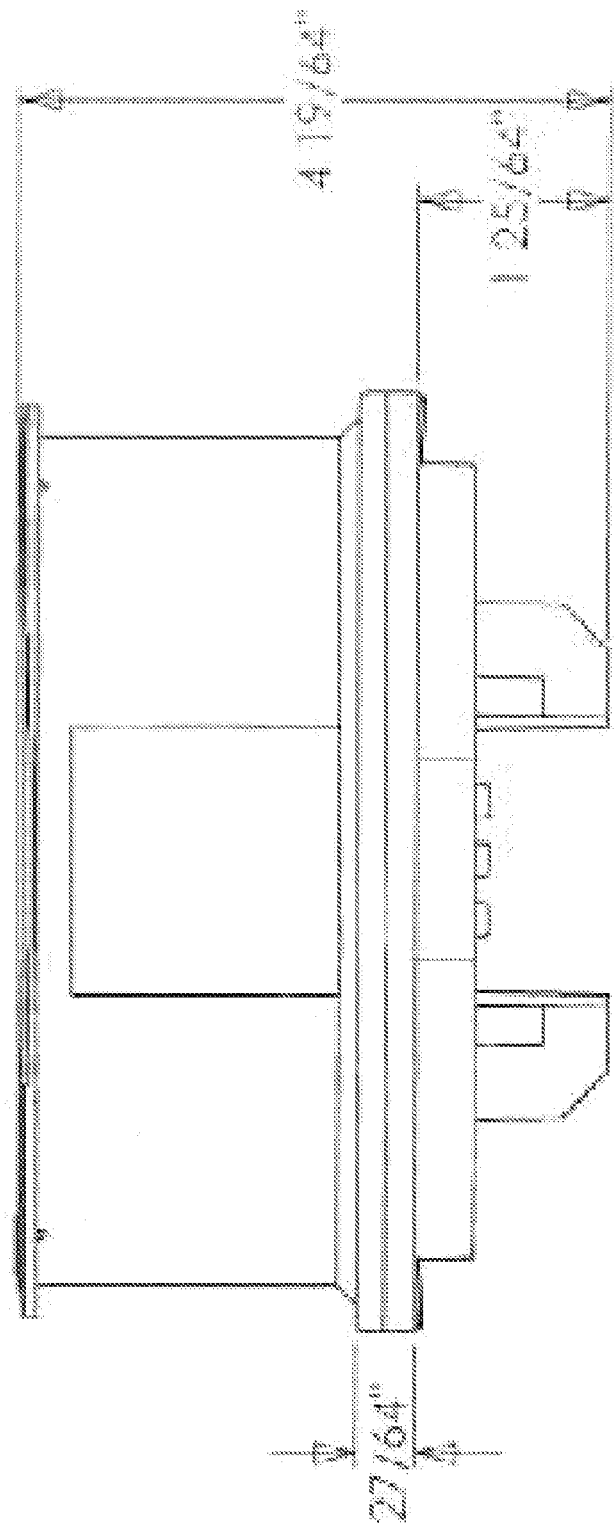

FIG. 93 shows a side view of the EK Series Adapter device of FIG. 91.

Figure 94:
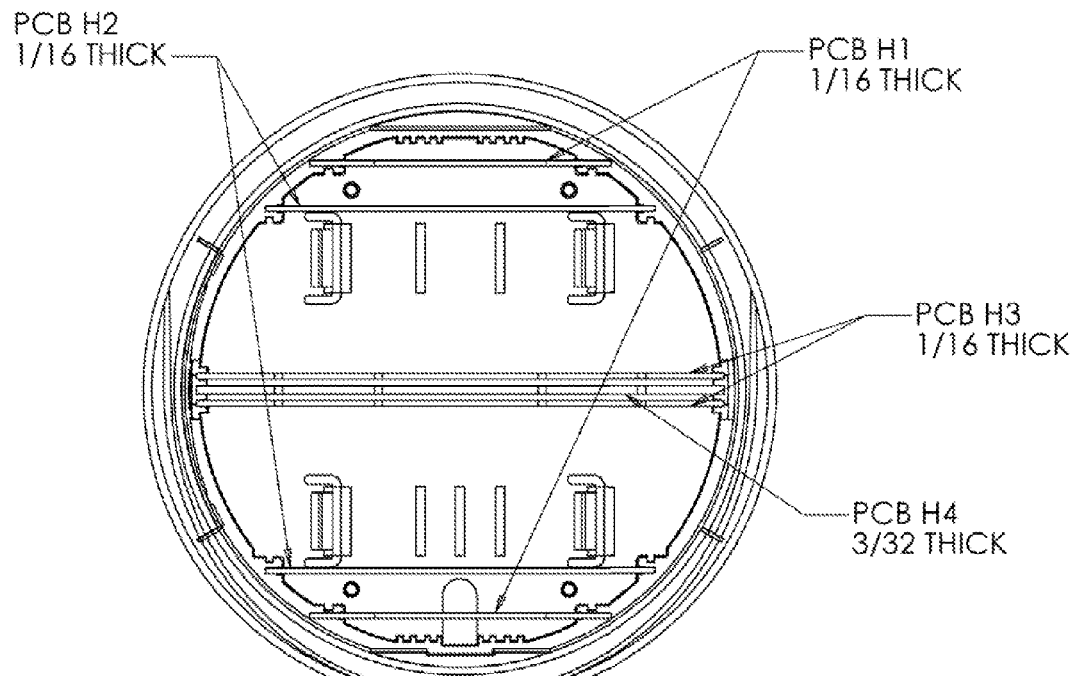

FIG. 94 shows a front view of an EK-4J device without a shield.

Figure 95:
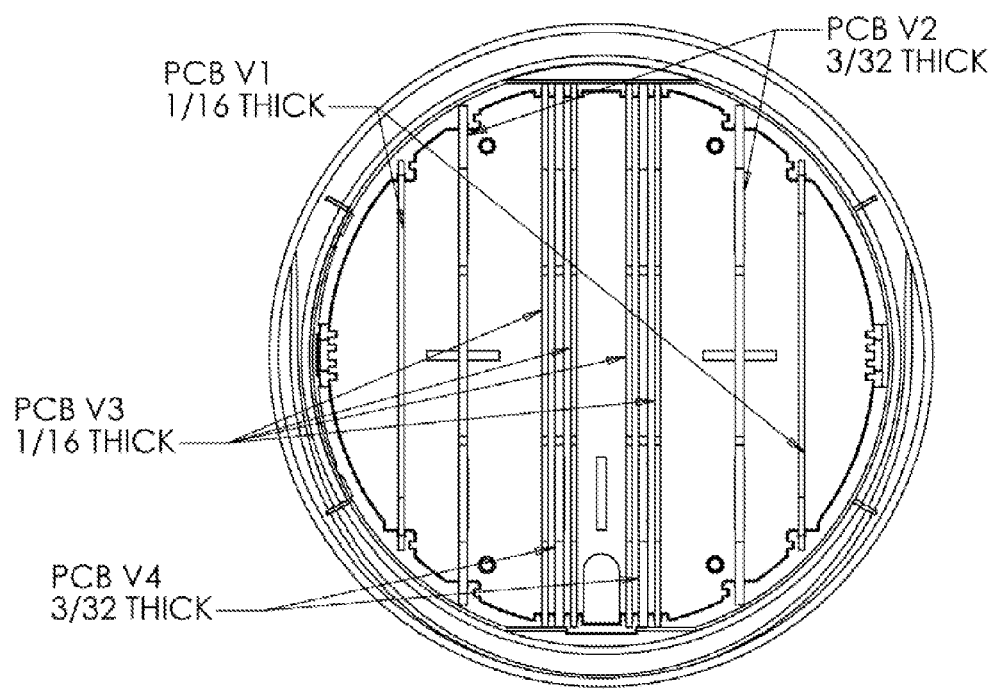

FIG. 95 shows a front view of an EK Series device shown without the jaws or the shield. These diagrams are merely examples and should not unduly limit the scope of the claims herein. Those of ordinary skill in the art will recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A power meter data collection system for monitoring power information from a plurality of power meter devices configured on a meter bank, the system comprising:
   a collar housing member comprising a base region and an annular spacer member configured to the base region;
   an incoming power connector disposed on the base region, the incoming power connector being coupled to a pair of first power lines;
   an outgoing power connector disposed on the base region, the outgoing power connector being coupled to a pair of second power lines;
   a remote data concentrator device configured in the collar housing member, the remote data concentrator device comprising a power line communication device, a central processing device, and a first ZigBee transceiver, the first ZigBee transceiver being configured to communicate between anyone of the other plurality of power meter devices numbered from 1 through N, where N is an integer greater than 2, each of the other power meter devices comprising a second ZigBee transceiver device, and the remote data concentrator device being configured to exchange information between the remote data concentrator device and anyone of the other power meter devices and to aggregate information associated with each of the power meter devices;
   a memory device coupled to each ZigBee transceiver for storing ZigBee setup information for each ZigBee transceiver;
   whereupon the plurality of power meter devices including the remote data concentrator device are configured on the meter bank to communicate with the remote data concentrator device.

2. The system of claim 1 wherein each of the ZigBee transceivers are configured in computer code to a permit a joining state and a deny joining state; wherein the meter bank is provided on a building structure.

3. The system of claim 1 wherein the memory device comprises a Flash memory.

4. The system of claim 3 wherein the ZigBee network setting information comprises a channel identification information, a PAN identification information, and an optionally extensional PAN identification information.

5. The system of claim 1 wherein the remote data concentrator device is coupled to the power meter devices numbered from 1 through N in a serial manner from the power meter device numbered 1 to the power meter device numbered N, and then back to the power meter device numbered 1 to the power meter device number N in a continuous process loop.

6. The system of claim 1 wherein the power meter bank is provided in a spatial region of two meters square or less.

7. The system of claim 1 wherein the remote data collection device is provided within a spatial vicinity of the power meter bank, the spatial vicinity being within about two meters and less of the power meter bank.

8. The system of claim 1 further comprising a network device configured with a power line network, wherein the power line communication device is configured to exchange information between the ZigBee transceivers and the network device through the power line network.

9. The system of claim 1 wherein each of the power meter devices acts as a host device.

10. The system of claim 1 further comprising a utility server configured with a power line network coupled to a world wide network of computers, wherein the remote data concentrator device is coupled to the utility server via the power line network and coupled to the world wide network of computers.

11. The system of claim 1 wherein the remote data concentrator device is coupled to a wireless network coupled to the Internet.

12. The system of claim 1 wherein each memory device includes one or more meter tables, wherein the remote data concentrator device and each of the power meter devices are configured to perform the following operations:
   read a meter table from a memory on the remote data concentrator device to determine a network connection information;
   set a ZigBee joining information for the power meter device;
   connect the remote data collection device to the power meter device; synchronize a time information between the remote data concentrator device and the power meter device;
   check information event for the power meter device;
   read and store metering data from the power meter device; and
   disconnect from the power meter device.

13. A power meter data collection system for monitoring power information, the system comprising:
   a collar housing member comprising a base region and an annular spacer member configured to the base region;
   an incoming power connector disposed on the base region, the incoming power connector being coupled to a pair of first power lines;
   an outgoing power connector disposed on the base region, the outgoing power connector being coupled to a pair of second power lines;
   a remote data concentrator device configured in the collar housing member, the remote data concentrator device comprising a power line communication device, a central processing device, and a first WiFi transceiver, the first WiFi transceiver being configured to communicate between anyone of a plurality of power meter devices numbered from 1 through N, where N is an integer greater than 2, each of the power meter devices numbered from 1 through N comprising a second WiFi transceiver device, and to exchange information between the remote data concentrator device and anyone of the power meter devices numbered from 1 through N, and to concentrate information associated with each of the power meter devices;
   a memory device coupled to each WiFi transceiver for storing WiFi setup information for each WiFi transceiver; and whereupon the plurality of power meter devices are configured on a meter bank with the remote data concentrator device.

14. The system of claim 13 wherein the memory device comprises a Flash memory.

15. The system of claim 14 wherein the WiFi network setting information comprises a channel identification information, and an SSID information, and network key information.

16. The system of claim 13 wherein the remote data concentrator device is coupled to each of the power meter devices numbered from 1 through N in a serial manner from the power meter device numbered 1 to the power meter device numbered N, and then back to the power meter device numbered 1 to the power meter device number N in a continuous process loop.

17. The system of claim 1 further comprising a network device configured with a power line network, wherein the power line communication device is configured to exchange information between the WiFi transceivers and the network device through the power line network.

18. The system of claim 13 further comprising a cellular wireless receiving/transmission device coupled to central processing device in the remote date concentrator device.

19. The system of claim 18 wherein the cellular wireless receiving/transmission device is coupled to a world wide network of computers.

20. The method of claim 19 further comprising a server device coupled to the cellular wireless receiving/transmission device.

* * * * *